US012779888B2

(12) United States Patent
Hirano et al.

(10) Patent No.: US 12,779,888 B2
(45) Date of Patent: Nov. 3, 2026

(54) ON-PRESS DEVELOPMENT TYPE LITHOGRAPHIC PRINTING PLATE PRECURSOR, METHOD OF PREPARING LITHOGRAPHIC PRINTING PLATE, LITHOGRAPHIC PRINTING METHOD, AND COMPOUND

(71) Applicant: FUJIFILM CORPORATION, Tokyo (JP)

(72) Inventors: Natsumi Hirano, Shizuoka (JP); Akira Sakaguchi, Shizuoka (JP); Kazuaki Enomoto, Shizuoka (JP); Naoyuki Hanaki, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 71 days.

(21) Appl. No.: 18/616,247

(22) Filed: Mar. 26, 2024

(65) Prior Publication Data

US 2024/0326503 A1 Oct. 3, 2024

(30) Foreign Application Priority Data

Mar. 30, 2023 (JP) ................................. 2023-056537

(51) Int. Cl.
*B41M 1/06* (2006.01)
*B41C 1/10* (2006.01)
*B41N 1/12* (2006.01)

(52) U.S. Cl.
CPC ............. *B41M 1/06* (2013.01); *B41C 1/1016* (2013.01); *B41N 1/12* (2013.01); *B41C 2201/12* (2013.01);
(Continued)

(58) Field of Classification Search
None
See application file for complete search history.

(56) References Cited

U.S. PATENT DOCUMENTS 3,491,111 A 1/1970 Chao-Han
4,322,352 A 3/1982 Crounse et al.
(Continued)

FOREIGN PATENT DOCUMENTS

CN 115491924 A * 12/2022 ............ D21H 19/42
DE 2742909 A1 3/1978
(Continued)

OTHER PUBLICATIONS

Extended European Search Report dated Jul. 22, 2024, issued in corresponding EP Patent Application No. 24167160.1.

*Primary Examiner* — Joshua D Zimmerman
(74) *Attorney, Agent, or Firm* — SOLARIS Intellectual Property Group, PLLC

(57) ABSTRACT

An on-press development type lithographic printing plate precursor including a support, and an image-recording layer on the support, in which the image-recording layer contains an infrared absorber, a polymerization initiator, a polymerizable compound, and one or more compounds selected from the group consisting of a compound represented by Formula (1) and a compound represented by Formula (2) (in Formula (1) and (2), $Ra_1$ and $Ra_2$ represent an alkyl group, $Rb_1$ and $Rb_3$ represent an alkyl group, $Rb_2$ and $Rb_4$ represent an alkyl group, and EDG's each independently represent a hydrogen atom or an electron-donating group, provided that at least one of the four EDG's in Formula (1) represents an electron-donating group).

18 Claims, 2 Drawing Sheets

(52) U.S. Cl.
CPC ...... *B41C 2210/04* (2013.01); *B41C 2210/08* (2013.01); *B41C 2210/22* (2013.01)

(56) References Cited

U.S. PATENT DOCUMENTS

| | | | | |
|---|---|---|---|---|
| 2005/0106501 | A1* | 5/2005 | Van Aert | B41C 1/1041 430/270.1 |
| 2018/0162979 | A1* | 6/2018 | Sato | C08F 265/06 |
| 2021/0078350 | A1 | 3/2021 | Viehmann et al. | |
| 2023/0120465 | A1* | 4/2023 | Aizu | G03F 7/029 101/463.1 |
| 2023/0150254 | A1 | 5/2023 | Namba et al. | |
| 2024/0262098 | A1 | 8/2024 | Sakaguchi | |

FOREIGN PATENT DOCUMENTS

| | | | | |
|---|---|---|---|---|
| GB | 1590913 | A | 6/1981 | |
| WO | 2008/124412 | A1 | 10/2008 | |
| WO | WO-2021256341 | A1 * | 12/2021 | B41C 1/1008 |
| WO | 2022/019217 | A1 | 1/2022 | |
| WO | 2023/032682 | A1 | 3/2023 | |

* cited by examiner

ON-PRESS DEVELOPMENT TYPE LITHOGRAPHIC PRINTING PLATE PRECURSOR, METHOD OF PREPARING LITHOGRAPHIC PRINTING PLATE, LITHOGRAPHIC PRINTING METHOD, AND COMPOUND

CROSS-REFERENCE TO RELATED APPLICATIONS

This application claims priority under 35 USC 119 from Japanese Patent Application No. 2023-056537, filed on Mar. 30, 2023. The above application is hereby expressly incorporated by reference, in its entirety, into the present application.

BACKGROUND OF THE INVENTION

1. Field of the Invention

The present disclosure relates to an on-press development type lithographic printing plate precursor, a method of preparing a lithographic printing plate, a lithographic printing method, and a compound.

2. Description of the Related Art

In general, a lithographic printing plate is composed of lipophilic image areas that receive ink during a printing process and hydrophilic non-image areas that receive a dampening water. Lithographic printing is a printing method that utilizes the property that water and oil-based ink repel each other to cause differences in ink attachment behavior on a surface of the lithographic printing plate by using lipophilic image areas on the lithographic printing plate as an ink-receiving area and using hydrophilic non-image areas on the lithographic printing plate as dampening water-receiving areas (non-ink-receiving areas), thereby depositing the ink only to the image areas, and then transferring the ink to a printing material, such as paper.

In the related art, in order to prepare this lithographic printing plate, a lithographic printing plate precursor (PS plate) has been widely used which is obtained by providing a lipophilic photosensitive resin layer (image-recording layer) on a hydrophilic support. Usually, a lithographic printing plate is obtained by a plate making method of exposing a lithographic printing plate precursor through an original picture such as a lith film, then keeping a portion of an image-recording layer that will be an image area while removing other unnecessary portions of the image-recording layer by dissolving such portions in an alkaline developer or an organic solvent, and forming a non-image area by exposing a surface of the hydrophilic support.

In response to the intensifying interest in the global environment, an environmental issue of waste liquid generated by wet treatments such as a development treatment has gathered more attention.

Regarding the environmental issue described above, an attempt is made to simplify development or plate making or to remove treatments. As one of simple preparation methods, a method called "on-press development" is being carried out. That is, the on-press development is a method of exposing a lithographic printing plate precursor, then immediately mounting the precursor on a printer without performing development of the related art, and removing an unnecessary portion of the image-recording layer at an initial stage of the ordinary printing step. In the present disclosure, a lithographic printing plate precursor that can be used for such on-press development is called "on-press development type lithographic printing plate precursor".

Examples of the lithographic printing plate precursors in the related art include those described in WO2022/019217A or US2021/0078350A.

WO2022/019217A discloses an on-press development type lithographic printing plate precursor including a leuco coloring in an image-recording layer from the viewpoint of color formability and visibility of an exposed portion.

US2021/0078350A discloses a lithographic printing plate precursor including a lithographic printing plate precursor including a leuco dye having a specific structure as a color developing compound in an image-recording layer.

SUMMARY OF THE INVENTION

An object to be achieved by an embodiment of the present disclosure is to provide an on-press development type lithographic printing plate precursor with which a lithographic printing plate having excellent color formability and suppressed streak-like unevenness can be obtained.

An object of another embodiment of the present disclosure is to provide a method of preparing a lithographic printing plate and a lithographic printing method in which the on-press development type lithographic printing plate precursor is used.

An object to be achieved by still another embodiment of the present disclosure is to provide a novel compound useful as a color forming substance precursor.

Means for solving the above issues include the following aspects.

<1>

An on-press development type lithographic printing plate precursor comprising:

a support; and an image-recording layer on the support, in which the image-recording layer contains an infrared absorber, a polymerization initiator, a polymerizable compound, and one or more compounds selected from the group consisting of a compound represented by Formula (1) and a compound represented by Formula (2).

Formula (1)

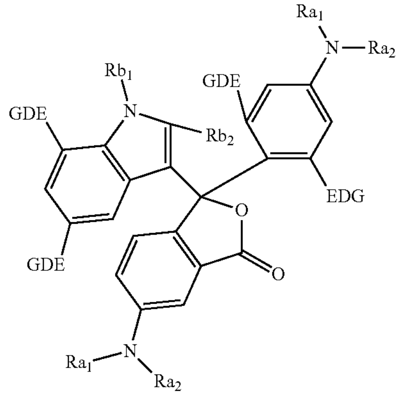

-continued

Formula (2)

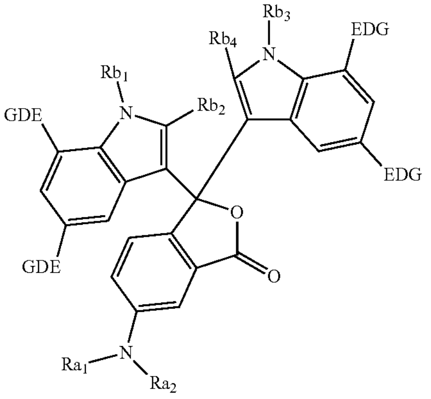

In Formula (1) and (2), $Ra_1$ and $Ra_2$ each independently represent a hydrogen atom or a substituted or unsubstituted alkyl group, $Ra_1$ and $Ra_2$ may be linked to each other to form a ring structure, $Rb_1$ and $Rb_3$ each independently represent a substituted or unsubstituted alkyl group, $Rb_2$ and $Rb_4$ each independently represent a hydrogen atom or a substituted or unsubstituted alkyl group, and EDG's each independently represent a hydrogen atom or an electron-donating group. Provided that at least one of the four EDG's in Formula (1) represents an electron-donating group.

<2>

The on-press development type lithographic printing plate precursor according to <1>, in which the compound represented by Formula (1) is a compound represented by Formula (1a).

Formula (1a)

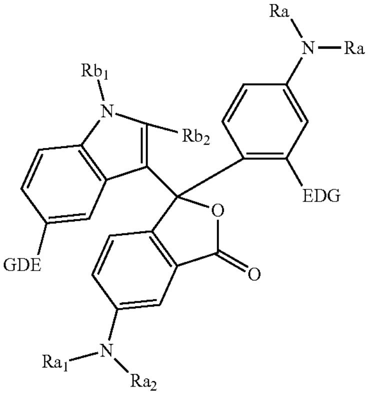

In Formula (1a), $Ra_1$ and $Ra_2$ each independently represent a hydrogen atom or a substituted or unsubstituted alkyl group, $Ra_1$ and $Ra_2$ may be linked to each other to form a ring structure, $Rb_1$ represents a substituted or unsubstituted alkyl group, $Rb_2$ represents a hydrogen atom or a substituted or unsubstituted alkyl group, and EDG's each independently represent a hydrogen atom or an electron-donating group. Provided that at least one of the two EDG's in Formula (1a) represents an electron-donating group.

<3>

The on-press development type lithographic printing plate precursor according to <1> or <2>, in which the electron-donating group in Formula (1) and Formula (2) is a methoxy group.

<4>

The on-press development type lithographic printing plate precursor according to any one of <1> to <3>, in which the compound represented by Formula (1) is a compound represented by Formula (1b).

Formula (1b)

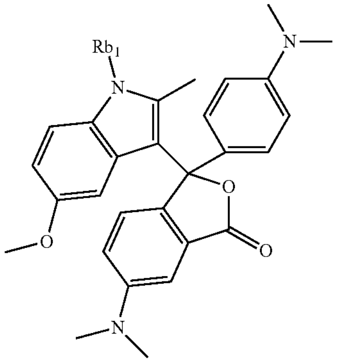

In Formula (1b), $Rb_1$ represents a substituted or unsubstituted alkyl group.

<5>

The on-press development type lithographic printing plate precursor according to any one of <1> to <4>, in which the compound represented by Formula (2) is a compound represented by Formula (2a).

Formula (2a)

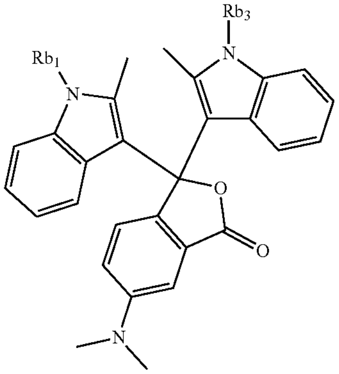

In Formula (2a), $Rb_1$ and $Rb_3$ each independently represent a substituted or unsubstituted alkyl group having 2 or more carbon atoms.

<6>

The on-press development type lithographic printing plate precursor according to any one of <1> to <5>, in which the polymerization initiator includes a compound A represented by Formula (Ia) and one or more compounds B selected from the group consisting of a compound represented by Formula (Ib) and a compound represented by Formula (Ic).

Formula (Ia)

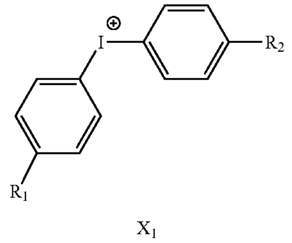

Formula (Ib)

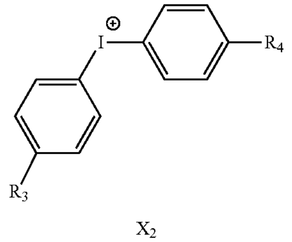

Formula (Ic)

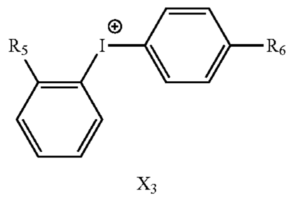

In Formula (Ia) to (Ic), $R_1$, $R_2$, $R_3$, $R_4$, $R_5$, and $R_6$ are each independently a substituted or unsubstituted alkyl group having 2 to 9 carbon atoms or a substituted or unsubstituted alkoxy group having 2 to 9 carbon atoms, at least one selected from the group consisting of $R_3$ and $R_4$ is different from $R_1$ or $R_2$, a difference between a total number of carbon atoms in $R_1$ and $R_2$ and a total number of carbon atoms in $R_3$ and $R_4$ is 0 to 4, a difference between the total number of carbon atoms in $R_1$ and $R_2$ and a total number of carbon atoms in $R_5$ and $R_6$ is 0 to 4, and $X_1$, $X_2$, and $X_3$ are each independently a counter anion.

<7>

The on-press development type lithographic printing plate precursor according to any one of <1> to <6>, in which the infrared absorber includes a compound represented by Formula (X).

Formula (X)

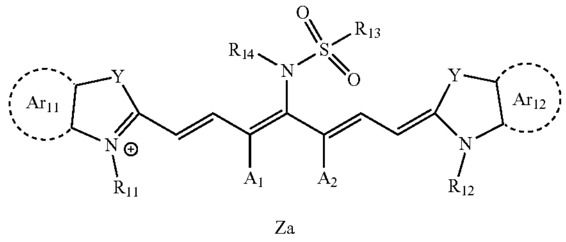

In Formula (X), $Ar_{11}$ and $Ar_{12}$ each independently represent an atomic group necessary for forming a substituted or unsubstituted aromatic ring or for forming a substituted or unsubstituted heteroaromatic ring, $R_{11}$ and $R_{12}$ each independently represent a substituted or unsubstituted alkyl group, $R_{13}$ represents a substituted or unsubstituted alkyl group, a substituted or unsubstituted aryl group, or a substituted or unsubstituted heteroaryl group, $R_{14}$ represents a hydrogen atom, a substituted or unsubstituted alkyl group, a substituted or unsubstituted aryl group, or a substituted or unsubstituted heteroaryl group, Y's each independently represent an oxygen atom, a sulfur atom, or a dialkylmethylene group represented by >$C(R_{15}R_{16})$, $R_{15}$ and $R_{16}$ each independently represent a substituted or unsubstituted alkyl group having 1 to 4 carbon atoms, $A_1$ and $A_2$ each independently represent a substituted or unsubstituted alkyl group or represent an atomic group including 2 or 3 carbon atoms necessary for forming a substituted or unsubstituted 5- or 6-membered non-aromatic carbon ring by linking to each other, and Za represents a counter ion that neutralizes an electric charge.

<8>

The on-press development type lithographic printing plate precursor according to any one of <1> to <7>, in which the image-recording layer further contains one or more compounds selected from the group consisting of a compound represented by Formula (Le-10) and a compound represented by Formula (Z-4).

(Le-10)

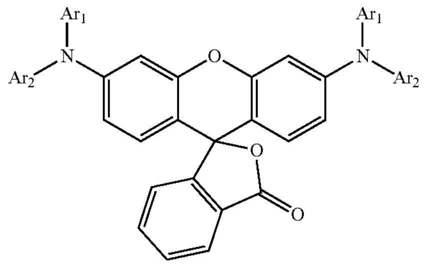

In Formula (Le-10), $Ar_1$'s each independently represent an aryl group or a heteroaryl group, and $Ar_2$'s each independently represent an aryl group having a substituent on at least one ortho position or a heteroaryl group having a substituent on at least one ortho position.

(Z-4)

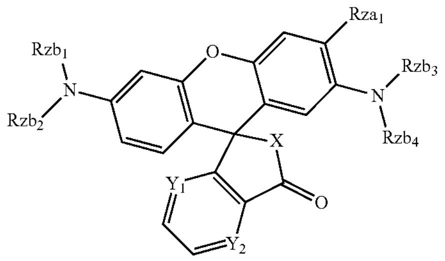

In Formula (Z-4), $Rza_1$ represents a hydrogen atom, an alkyl group, or an alkoxy group, $Rzb_1$ to $Rzb_4$ each independently represent a hydrogen atom, an alkyl group, or an aryl group, $Rzb_1$ and $Rzb_2$ may be linked to each other to form a ring structure, $Rzb_3$ and $Rzb_4$ may be linked to each other to form a ring structure, X represents O or NR, R represents a hydrogen atom, an alkyl group, an aryl group, or a heteroaryl group, and $Y_1$ and $Y_2$ each independently represent CH or N.

<9>

The on-press development type lithographic printing plate precursor according to any one of <1> to <8>, in which the image-recording layer further contains a compound represented by Formula (Ph).

(Ph)

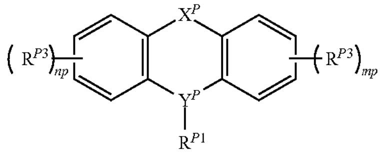

In Formula (Ph), $X^P$ represents O, S, or NH, $Y^P$ represents N or CH, $R^{P1}$ represents a hydrogen atom or an alkyl group, $R^{P2}$ and $R^{P3}$ each independently represent a halogen atom, an alkylthio group, an arylthio group, an alkoxy group, an aryloxy group, an alkyl group, an aryl group, an acylthio group, or an acyl group, and mp and np each independently represent an integer of 0 to 4.

<10>

The on-press development type lithographic printing plate precursor according to any one of <1> to <9>, in which the image-recording layer further contains a polymer having a structural unit represented by Formula (I).

(I)

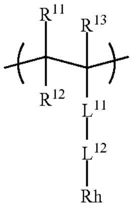

In Formula (I), $R^{11}$ and $R^{12}$ each independently represent a hydrogen atom or an alkyl group, $R^{13}$ represents a hydrogen atom or a monovalent substituent, $L^{11}$ and $L^{12}$ each independently represent a single bond or a divalent linking group, and Rh represents a substituent including two or more silicon atoms.

<11>

The on-press development type lithographic printing plate precursor according to any one of <1> to <10>, in which the polymerizable compound includes a polymerizable compound having functionalities of 7 or more.

<12>

The on-press development type lithographic printing plate precursor according to any one of <1> to <11>, in which the image-recording layer further contains an oil agent.

<13>

The on-press development type lithographic printing plate precursor according to any one of <1> to <12>, in which the support has an aluminum plate and an anodic oxide film of aluminum disposed on the aluminum plate, the anodic oxide film is positioned closer to the image-recording layer than the aluminum plate is, the anodic oxide film has micropores extending in a depth direction from a surface of the anodic oxide film on the image-recording layer side, and an average diameter of the micropores within the surface of the anodic oxide film is more than 10 nm and 100 nm or less.

<14>

The on-press development type lithographic printing plate precursor according to <13>, in which the micropores are each composed of a large diameter portion that extends to a position at a depth of 10 nm to 1,000 nm from the surface of the anodic oxide film and a small diameter portion that is in communication with a bottom portion of the large diameter portion and extends to a position at a depth of 20 nm to 2,000 nm from a communicate position, an average diameter of the large diameter portion within the surface of the anodic oxide film is 15 nm to 100 nm, and an average diameter of the small diameter portion at the communicate position is 13 nm or less.

<15>

A method of preparing a lithographic printing plate, comprising:

imagewise exposing the on-press development type lithographic printing plate precursor according to any one of <1> to <14>; and supplying at least one selected from the group consisting of a printing ink and dampening water to the exposed precursor on a printer to remove an image-recording layer in a non-image area.

<16>

A lithographic printing method comprising:

imagewise exposing the on-press development type lithographic printing plate precursor according to any one of <1> to <12>;

supplying at least one selected from the group consisting of a printing ink and dampening water to the exposed precursor on a printer to remove an image-recording layer in a non-image area and to prepare a lithographic printing plate; and performing printing using the obtained lithographic printing plate.

<17>

A compound represented by Formula (1b).

Formula (1b)

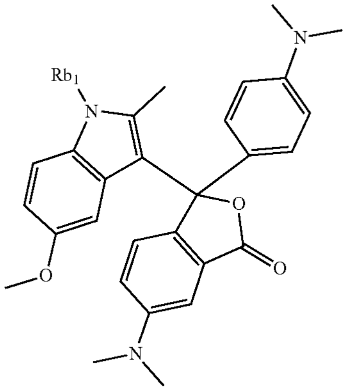

In Formula (1b), $Rb_1$ represents a substituted or unsubstituted alkyl group.

<18>

A compound represented by Formula (2a).

Formula (2a)

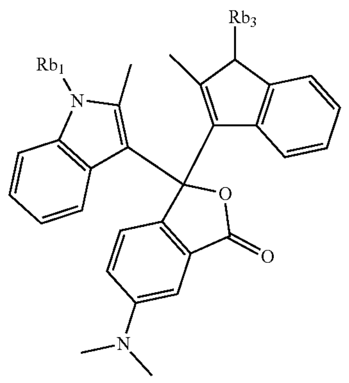

In Formula (2a), $Rb_1$ and $Rb_3$ each independently represent a substituted or unsubstituted alkyl group having 2 or more carbon atoms.

According to one embodiment of the present disclosure, it is possible to provide an on-press development type lithographic printing plate precursor with which a lithographic printing plate having excellent color formability and suppressed streak-like unevenness can be obtained.

In addition, according to another embodiment of the present disclosure, it is possible to provide a method of preparing a lithographic printing plate and a lithographic printing method in which the on-press development type lithographic printing plate precursor is used.

Furthermore, according to still another embodiment of the present disclosure, it is possible to provide a novel compound useful as a color forming substance precursor.

DESCRIPTION OF THE PREFERRED EMBODIMENTS

Figure 1:
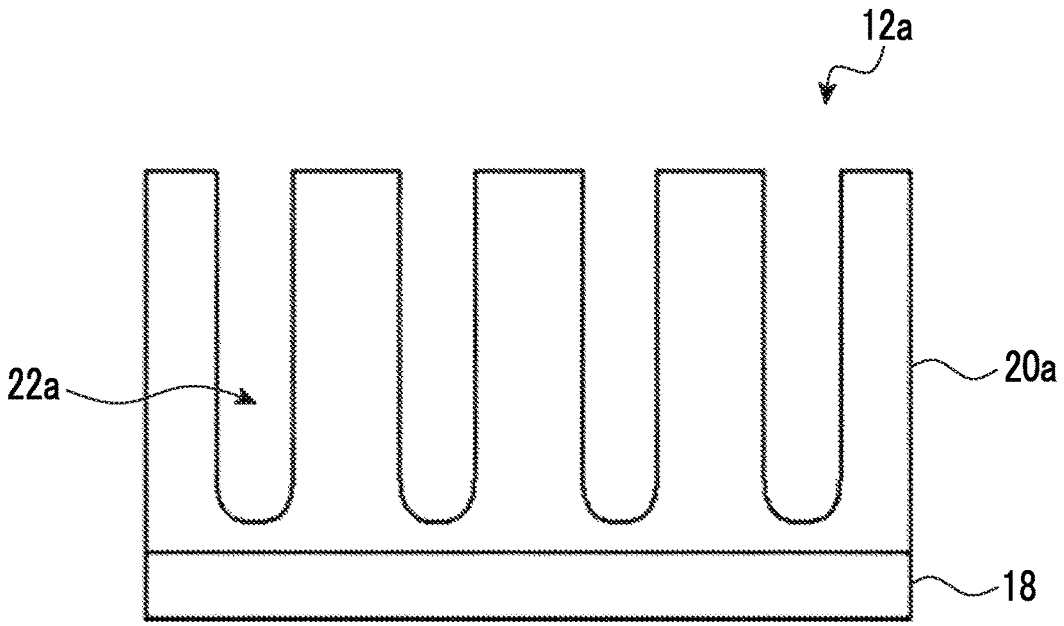
FIG. 1 is a schematic cross-sectional view of an embodiment of a support.

Hereinafter, the contents of the present disclosure will be described in detail. The description of configuration requirements below is made based on representative embodiments of the present disclosure in some cases, but the present disclosure is not limited to such embodiments.

In the present specification, a numerical range expressed using "to" includes numerical values listed before and after "to" as the lower limit value and the upper limit value.

In addition, in the present specification, in a case where there is no description regarding whether a group (atomic group) is substituted or unsubstituted, such a group includes both a group having no substituent and a group having a substituent. For example, "alkyl group" includes not only an alkyl group having no substituent (unsubstituted alkyl group) but also an alkyl group having a substituent (substituted alkyl group).

In the present specification, "(meth)acryl" is a term used to explain a concept including both the acryl and methacryl, and "(meth)acryloyl" is a term used to explain a concept including both the acryloyl and methacryloyl.

In addition, the term "step" in the present specification means not only an independent step but also a step that cannot be clearly differentiated from other steps as long as the intended goal of the step is achieved.

In the present disclosure, "% by mass" has the same definition as "% by weight", and "part by mass" has the same definition as "part by weight".

In the present disclosure, unless otherwise specified, as each component contained in a composition or each structural unit contained in a polymer, one component or one structural unit may be used alone, or two or more components or two or more structural units may be used in combination.

Furthermore, in the present disclosure, in a case where there is a plurality of substances corresponding to each component in a composition, or in a case where there is a plurality of structural units corresponding to each structural unit in a polymer, unless otherwise specified, the amount of each component in the composition or the amount of each structural unit in the polymer means the total amount of the plurality of corresponding substances present in the composition or the total amount of the plurality of corresponding structural units present in the polymer.

Furthermore, in the present disclosure, a combination of two or more preferred aspects is a more preferred aspect.

In addition, in the present disclosure, unless otherwise specified, each of the weight-average molecular weight (Mw) and number-average molecular weight (Mn) is a molecular weight that is detected using a gel permeation chromatography (GPC) analysis device using TSKgel GMHxL, TSKgel G4000HxL, and TSKgel G2000HxL (trade names, manufactured by Tosoh Corporation) as columns, tetrahydrofuran (THF) as a solvent, and a differential refractometer, and expressed in terms of polystyrene as a standard substance.

In the present disclosure, the term "lithographic printing plate precursor" refers not only to a lithographic printing plate precursor but also to a key plate precursor. In addition, the term "lithographic printing plate" refers not only to a lithographic printing plate prepared by performing operations such as exposure and development as necessary on a lithographic printing plate precursor but also to a key plate. The key plate precursor is not necessarily subjected to the operations such as exposure and development. The key plate refers to a lithographic printing plate precursor to be mounted on a plate cylinder that is not used, in a case where monochromatic or dichromatic printing is carried out on a part of paper during, for example, color newspaper printing.

In the present disclosure, "*" in a chemical structural formula represents a bonding position with other structures.

Hereinafter, the present disclosure will be described in detail.

On-Press Development Type Lithographic Printing Plate Precursor

An on-press development type lithographic printing plate precursor (simply referred to as a "lithographic printing plate precursor" in the present disclosure) according to the present disclosure includes a support and an image-recording layer on the support, in which the image-recording layer contains an infrared absorber, a polymerization initiator, a polymerizable compound, and one or more kinds of compounds selected from the group consisting of a compound represented by Formula (1) and a compound represented by Formula (2).

Hereinafter, the "compound represented by Formula (1) and the compound represented by Formula (2)" are collectively referred to as a "specific compound".

The on-press development type lithographic printing plate precursor according to the present disclosure is a negative tone lithographic printing plate precursor in which an exposed portion is polymerized by exposure to infrared rays.

The present inventors have found that it is difficult to obtain a lithographic printing plate having excellent color formability and suppressed streak-like unevenness in the lithographic printing plate obtained by using the lithographic printing plate precursor of the related art described in WO2022/019217A or US2021/0078350A.

Therefore, as a result of intensive studies conducted by the present inventors, it was found that a lithographic printing plate in which color formability is excellent and streak-like unevenness is suppressed can be obtained by including an image-recording layer having the above-described composition.

The detailed mechanism that brings about the aforementioned effect is unclear, but is assumed to be as below.

In recent years, for exposure performed on the lithographic printing plate precursor, sometimes an exposure machine equipped with an exposure head adopting the grating light valve (GLV) technique is used.

In a case where exposure is performed with this exposure machine, a halftone dot image becomes thicker in the scanning direction and is observed as streak-like unevenness. This streak-like unevenness is sometimes called swath unevenness.

The compound represented by Formula (1) and the compound represented by Formula (2) (specific compound) are compounds having a high electron donating property and having a substitution pattern and have a large difference in the amount of ring-opening form generated before and after exposure. In addition, it has been found in the present inventors' studies that the specific compound has a radical scavenging ability in a ring-closed form and does not have a radical scavenging ability in a ring-opening form, and thus, it is possible to further promote a difference in a radical generation amount before and after exposure. As a result, it is presumed that, by improving the cut-off property of the exposure sensitivity, a lithographic printing plate in which streak-like unevenness is suppressed can be obtained.

In addition, it is presumed that the specific compound has excellent color formability after ring-opening by exposure depending on the type of substituent contained in the ring structure, the number of substituents contained in the ring structure, and the introduction position of the substituent into the ring structure.

From these, the on-press development type lithographic printing plate precursor according to the present disclosure is excellent in color formability, and a lithographic printing plate in which streak-like unevenness is suppressed can be obtained.

Hereinafter, each of the configuration requirements in the lithographic printing plate precursor according to the present disclosure will be specifically described.

Image-Recording Layer

The image-recording layer in the lithographic printing plate precursor according to the present disclosure contains an infrared absorber, a polymerization initiator, a polymerizable compound, and one or more compounds selected from the group consisting of a compound represented by Formula (1) and a compound represented by Formula (2).

The image-recording layer in the lithographic printing plate precursor according to the present disclosure is preferably a water-soluble or water-dispersible negative tone image-recording layer.

In addition, in the image-recording layer in the lithographic printing plate precursor according to the present disclosure, from the viewpoint of on-press developability, a non-exposed portion of the image-recording layer is preferably removable by at least any of dampening water or printing ink.

Hereinafter, each of the components to be contained in the image-recording layer will be specifically described.

Compound Represented by Formula (1) and Compound Represented by Formula (2) (Specific Compound)

The image-recording layer contains one or more compounds selected from the group consisting of a compound represented by Formula (1) and a compound represented by Formula (2).

Since these specific compounds are compounds that form color by ring opening (that is, color forming substances), they correspond to color forming substance precursors.

Formula (1)

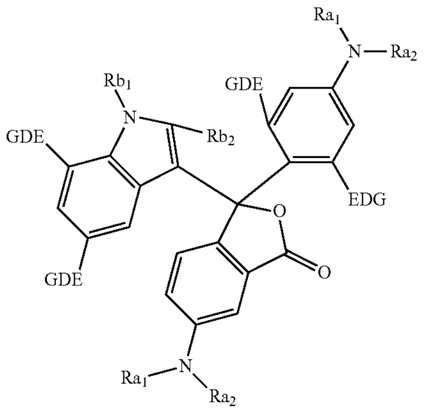

Formula (2)

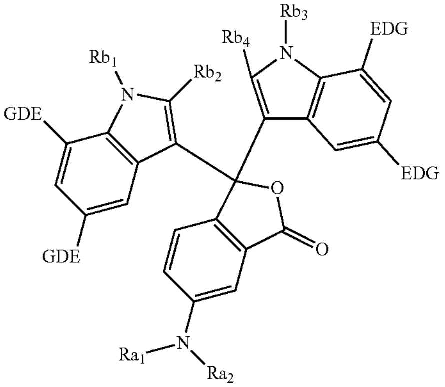

In Formula (1) and (2), $Ra_1$ and $Ra_2$ each independently represent a hydrogen atom or a substituted or unsubstituted alkyl group, $Ra_1$ and $Ra_2$ may be linked to each other to form a ring structure, $Rb_1$ and $Rb_3$ each independently represent a substituted or unsubstituted alkyl group, $Rb_2$ and $Rb_4$ each independently represent a hydrogen atom or a substituted or unsubstituted alkyl group, and EDG's each independently represent a hydrogen atom or an electron-donating group.

Provided that at least one of the four EDG's in Formula (1) represents an electron-donating group.

Examples of the substituent in the above-described substituted alkyl group include an aryl group, a heteroaryl group, a halogen atom, an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, a hydroxy group, an alkoxy group, an aryloxy group, a heteroaryloxy group, an acyl group, an alkoxycarbonyl group, an aryloxycarbonyl group, a heteroaryloxycarbonyl group, a cyano group, and the like. In addition, these substituents may be further substituted with these substituents, alkyl group, or the like.

As $Ra_1$ and $Ra_2$ described above, each independently, a substituted or unsubstituted alkyl group is preferable, an unsubstituted alkyl group having 1 to 8 carbon atoms is more preferable, and an unsubstituted alkyl group having 1 or 2 carbon atoms is even more preferable.

In addition, $Ra_1$ and $Ra_2$ are preferably the same group.

Furthermore, $Ra_1$ and $Ra_2$ may be linked to each other to form a ring structure. That is, $Ra_1$ and $Ra_2$ are linked to each other to form a ring structure containing N. The formed ring structure is preferably a 5- or 6-membered ring, and more preferably a 6-membered ring.

As $Rb_1$ and $Rb_3$ described above, each independently, a substituted or unsubstituted alkyl group having 1 to 8 carbon atoms is preferable and a substituted or unsubstituted alkyl group having 1 to 4 carbon atoms is more preferable.

In a case where $Rb_1$ and $Rb_3$ represent a substituted alkyl group, as the substituent, an aryl group or an alkoxy group is preferable, and among these, an aryl group is more preferable.

As $Rb_2$ and $Rb_4$ described above, each independently, a hydrogen atom or an unsubstituted alkyl group having 1 to 8 carbon atoms is preferable and a hydrogen atom or an unsubstituted alkyl group having 1 to 4 carbon atoms is more preferable.

As $Rb_2$ described above, a hydrogen atom or an unsubstituted alkyl group having 1 or 2 carbon atoms is particularly preferable.

As $Rb_4$ described above, a hydrogen atom or an unsubstituted alkyl group having 1 or 2 carbon atoms is particularly preferable.

Examples of the electron-donating group represented by EDG include an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, an alkoxy group, an aryloxy group, a heteroaryloxy group, and an alkyl group.

Among those, from the viewpoint of color formability, the electron-donating group represented by EDG is preferably an alkoxy group or alkyl group, more preferably an alkoxy group, and particularly preferably a methoxy group.

At least one of the four EDG's in Formula (1) is an electron-donating group, but it is preferable that one or two of the four EDG's are electron-donating groups and it is more preferable that one of the four EDG's is an electron-donating group.

In Formula (2), it is preferable that zero to two of the four EDG's are electron-donating groups and it is more preferable that zero or two of the four EDG's are electron-donating groups.

From the viewpoint of color formability, the compound represented by Formula (1) is preferably a compound represented by Formula (1a).

Formula (1a)

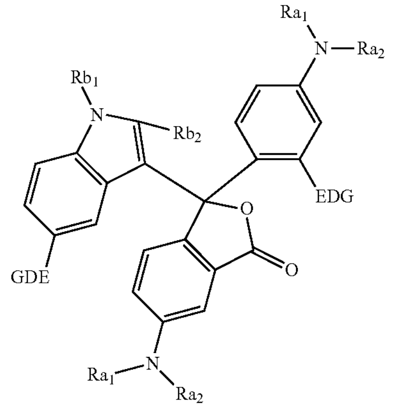

In Formula (1a), $Ra_1$ and $Ra_2$ each independently represent a hydrogen atom or a substituted or unsubstituted alkyl group, $Ra_1$ and $Ra_2$ may be linked to each other to form a ring structure, $Rb_1$ represents a substituted or unsubstituted alkyl group, $Rb_2$ represents a hydrogen atom or a substituted or unsubstituted alkyl group, and EDG's each independently represent a hydrogen atom or an electron-donating group. Provided that at least one of the two EDG's in Formula (1a) represents an electron-donating group.

$Ra_1$, $Ra_2$, $Rb_1$, $Rb_2$, and EDG in Formula (1a) have the same meanings as $Ra_1$, $Ra_2$, $Rb_1$, $Rb_2$, and EDG in Formula (1), and preferred aspects thereof are also the same.

From the viewpoint of color formability, the compound represented by Formula (1) is more preferably a compound represented by Formula (1b).

Formula (1b)

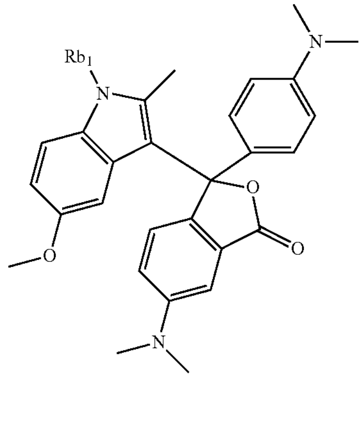

In Formula (1b), $Rb_1$ represents a substituted or unsubstituted alkyl group.

$Rb_1$ in Formula (1b) has the same meaning as $Rb_1$ in Formula (1) and the preferred aspect thereof is also the same.

In addition, from the viewpoint of color formability, the compound represented by Formula (2) is preferably a compound represented by Formula (2a).

Formula (2a)

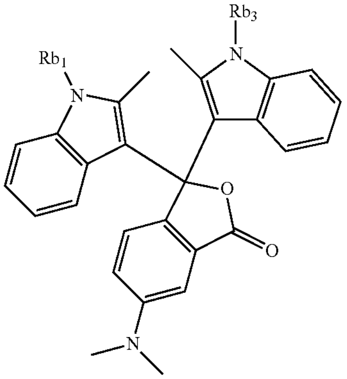

In Formula (2a), $Rb_1$ and $Rb_3$ each independently represent a substituted or unsubstituted alkyl group having 2 or more carbon atoms.

$Rb_1$ and $Rb_3$ in Formula (2a) have the same meanings as $Rb_1$ and $Rb_3$ in Formula (2), except that the number of carbon atoms is 2 or more, and preferred aspects thereof are also the same.

Specific examples of the specific compound will be described below. Provided that the specific compound is not limited to these compounds.

C-1

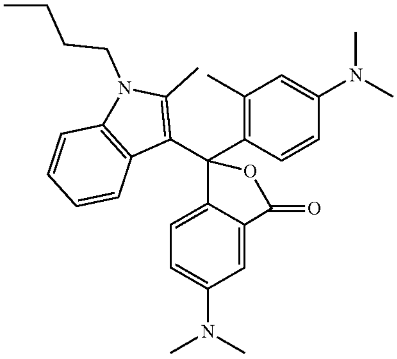

C-2

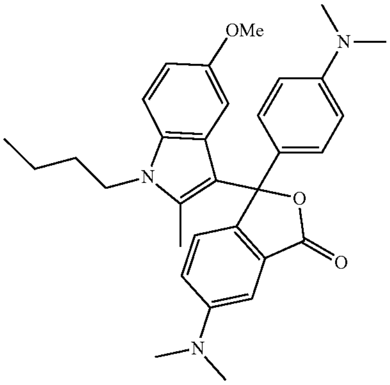

-continued

C-3

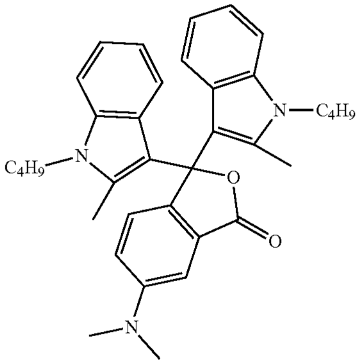

C-4

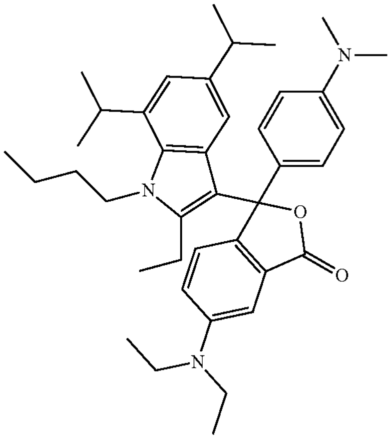

C-5

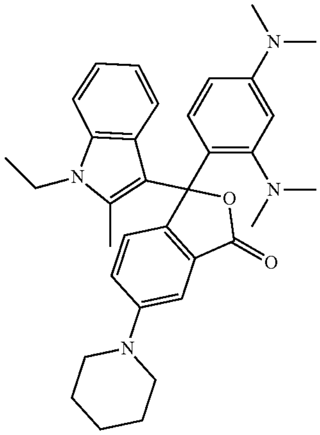

C-6

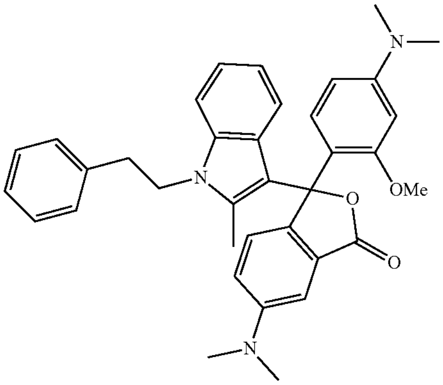

-continued
C-7
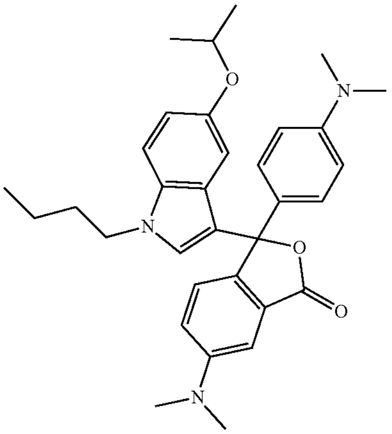
C-8
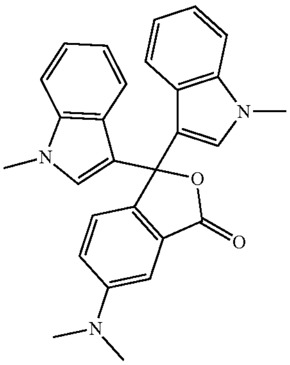
C-9
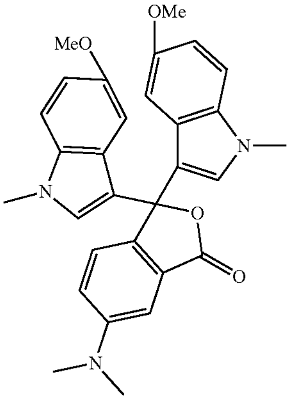
C-10
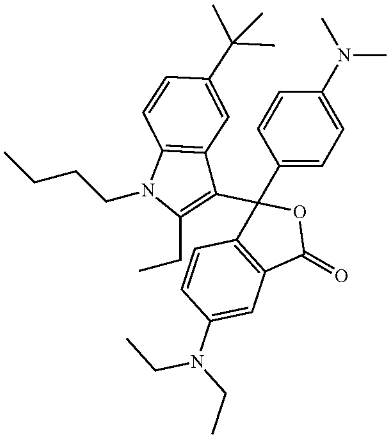
-continued
C-11
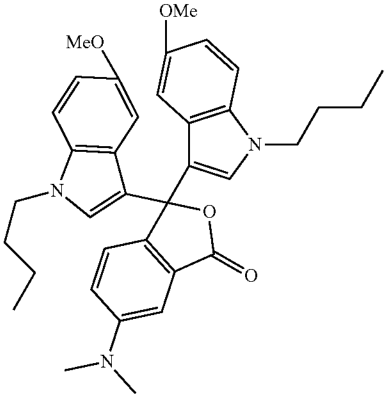
C-12
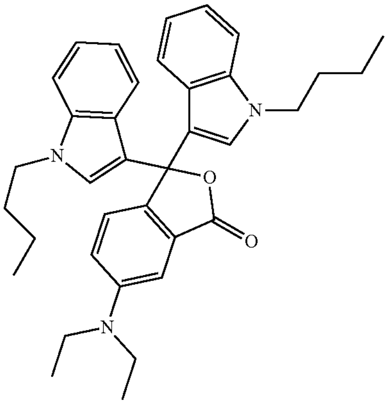
C-13
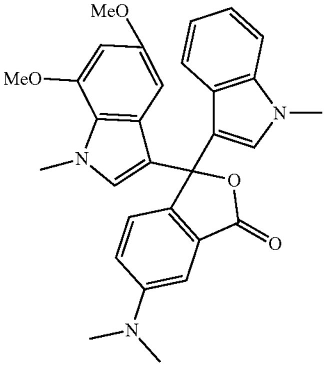
C-14
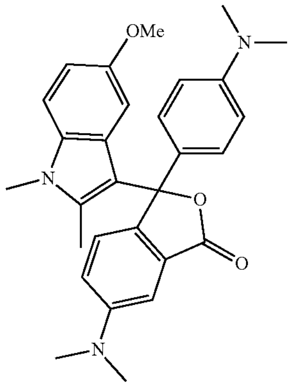

-continued

C-15

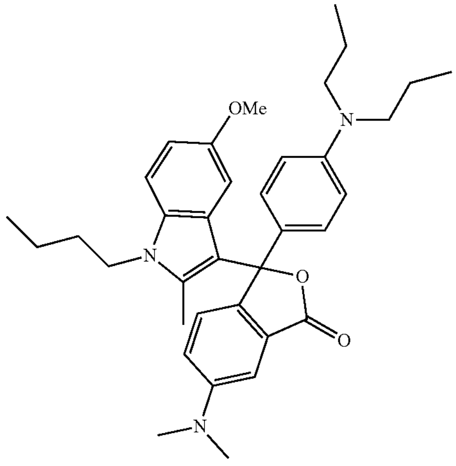

C-16

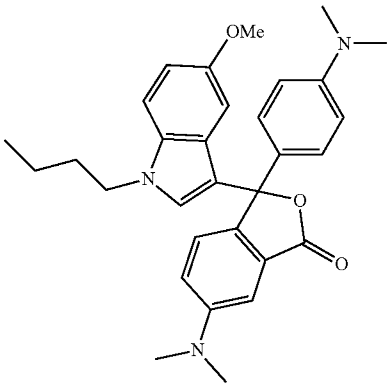

The compound represented by Formula (1) and the compound represented by Formula (2) can be obtained, for example, by adding 2 equivalents of an indole compound to a corresponding o-alkoxycarbonylbenzaldehyde to synthesize a triarylmethane compound and performing ester hydrolysis and oxidation.

Only one specific compound may be used, or two or more specific compounds may be used in combination. In a case where two or more specific compounds are used in combination, for example, the compound represented by Formula (1) and the compound represented by Formula (2) may be used in combination.

The total content of the specific compound in the image-recording layer with respect to the total mass of the image-recording layer is preferably 0.5% by mass to 10% by mass and more preferably 1% by mass to 5% by mass.

From the viewpoint of suppressing the deterioration in surface state, the total content of the specific compound with respect to the total mass of the image-recording layer is preferably 10% by mass or less and more preferably 5% by mass or less. In addition, from the viewpoint of color formability, the total content of the specific compound with respect to the total mass of the image-recording layer is preferably 0.5% by mass or more and more preferably 1% by mass or more.

Infrared Absorber

The image-recording layer contains an infrared absorber.

The infrared absorber is not particularly limited, and examples thereof include pigments and dyes.

As the dye that is used as the infrared absorber, it is possible to use commercially available dyes and known dyes described in publications, for example, "Dye Handbooks" (edited by the Society of Synthetic Organic Chemistry, Japan, 1970). Specific examples thereof include dyes such as an azo dye, a metal complex azo dye, a pyrazolone azo dye, a naphthoquinone dye, an anthraquinone dye, a phthalocyanine dye, a carbonium dye, a quinoneimine dye, a methine dye, a cyanine dye, a squarylium colorant, a pyrylium salt, and a metal thiolate complex.

Among these dyes, for example, a cyanine colorant, a squarylium colorant, a pyrylium salt, a nickel thiolate complex, and an indolenine cyanine colorant are particularly preferable. Furthermore, for example, a cyanine colorant or an indolenine cyanine colorant is preferable. Among these, a cyanine colorant is particularly preferable.

The infrared absorber is preferably a cationic polymethine colorant having an oxygen or nitrogen atom at the meso-position. Preferred examples of the cationic polymethine colorant include a cyanine colorant, a pyrylium colorant, a thiopyrylium colorant, an azulenium colorant, and the like. From the viewpoint of ease of availability, solubility in a solvent during an introduction reaction, and the like, a cyanine colorant is preferable.

Specific examples of the cyanine colorant include the compounds described in paragraphs "0017" to "0019" of JP2001-133969A and the compounds described in paragraphs "0016" to "0021" of JP2002-023360A and paragraphs "0012" to "0037" of JP2002-040638A. As the cyanine colorant, for example, the compounds described in paragraphs "0034" to "0041" of JP2002-278057A and paragraphs "0080" to "0086" of JP2008-195018A are preferable, and the compounds described in paragraphs "0035" to "0043" of JP2007-90850A and the compounds described in paragraphs "0105" to "0113" of JP2012-206495A are particularly preferable.

In addition, the compounds described in paragraphs "0008" and "0009" of JP1993-5005A (JP-H05-5005A) and paragraphs "0022" to "0025" of JP2001-222101A can also be preferably used.

As pigments, the compounds described in paragraphs "0072" to "0076" of JP2008-195018A are preferable.

The aforementioned infrared absorber preferably includes an infrared absorber that decomposes due to exposure to infrared (decomposition-type infrared absorber), and more preferably includes an infrared absorber that forms color by absorbing infrared rays and decomposes upon exposure to infrared rays (i.e., a decomposition-coloring infrared absorber).

Presumably, in a case where a decomposition-type infrared absorber is used as the aforementioned infrared absorber, the infrared absorber or a decomposition product thereof may promote polymerization, and the decomposition product of the infrared absorber and the polymerizable compound may interact with each other, which may result in excellent UV printing durability.

The decomposition-type infrared absorber is preferably the decomposition-coloring infrared absorber.

Hereinafter, a color-forming compound formed as a result of infrared absorption and decomposition of the decomposition-type infrared absorber by exposure to infrared rays will be also called "color forming substance of the decomposition-type infrared absorber".

In addition, it is preferable that the decomposition-type infrared absorber has a function of absorbing infrared rays by exposure to infrared rays and converting the absorbed infrared rays into heat.

The decomposition-type infrared absorber may be an infrared absorber that decomposes by absorbing at least a part of light in the infrared wavelength region (wavelength of 750 nm to 1 mm). The decomposition-type infrared absorber is preferably an infrared absorber having a maximal absorption wavelength in a wavelength region of 750 nm to 1,400 nm, and more preferably an infrared absorber having a maximal absorption wavelength in a wavelength region of 760 nm to 900 nm.

More specifically, the decomposition-type infrared absorber is preferably a compound that decomposes upon the exposure to infrared and generates a compound having maximal absorption wavelength in a wavelength region of 500 nm to 600 nm.

The decomposition-type infrared absorber is preferably an infrared absorber that decomposes by either or both of heat and electron migration resulting from exposure to infrared rays, and more preferably an infrared absorber that decomposes by electron migration resulting from exposure to infrared rays. "Decomposes by electron migration" mentioned herein means that electrons excited to the lowest unoccupied molecular orbital (LUMO) from the highest occupied molecular orbital (HOMO) of the decomposition-type infrared absorber by exposure to infrared rays move to electron accepting groups (groups having potential close to LUMO) in a molecule by means of intramolecular electron migration and thus result in decomposition.

The infrared absorber preferably includes a compound represented by Formula 1.

Formula 1

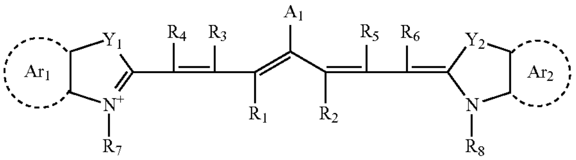

In Formula 1, $R_1$ and $R_2$ each independently represent a hydrogen atom or an alkyl group, $R_1$ and $R_2$ may be linked to each other to form a ring, $R_3$ to $R_6$ each independently represent a hydrogen atom or an alkyl group, $R_7$ and $R_8$ each independently represent an alkyl group or an aryl group, $Y_1$ and $Y_2$ each independently represent an oxygen atom, a sulfur atom, $—NR_0—$, or a dialkylmethylene group, $R_0$ represents a hydrogen atom, an alkyl group, or an aryl group, $Ar_1$ and $Ar_2$ each independently represent a group forming a benzene ring or a naphthalene ring which may have a group represented by Formula 2 that will be described later, $A_1$ represents $—NR_9R_{10}$, $—X_1\text{-}L_1$, or a group represented by Formula 2 that will be described later, $R_9$ and $R_{10}$ each independently represent an alkyl group, an aryl group, an alkoxycarbonyl group, or an arylsulfonyl group, $X_1$ represents an oxygen atom or a sulfur atom, $L_1$ represents a hydrocarbon group, a heteroaryl group, or a group that undergoes bond cleavage from $X_1$ by heat or exposure to infrared, Za represents a counterion that neutralizes charge, and at least one of $Ar_1$ or $Ar_2$ has a group represented by Formula 2.

$$—X \qquad \text{Formula 2}$$

In Formula 2, X represents a halogen atom, $—C(=O)—X_2—R_{11}$, $—C(=O)—NR_{12}R_{13}$, $—O—C(=O)—R_{14}$, $—CN$, $—SO_2NR_{15}R_{16}$, or a perfluoroalkyl group, $X_2$ represents a single bond or an oxygen atom, $R_{11}$ and $R_{14}$ each independently represent an alkyl group or an aryl group, and $R_{12}$, $R_{13}$, $R_{15}$, and $R_{16}$ each independently represent a hydrogen atom, an alkyl group, or an aryl group.

$Ar_1$ and $Ar_2$ each independently represent a group forming a benzene ring or a naphthalene ring. The benzene ring and the naphthalene ring may have a substituent other than —X. Examples of the substituent include an alkyl group, an alkoxy group, an aryloxy group, an amino group, an alkylthio group, an arylthio group, a carboxy group, a carboxylate group, a sulfo group, a sulfonate group, groups obtained by combining these, and the like. Among these, an alkyl group is preferable.

In Formula 1, at least one of $Ar_1$ or $Ar_2$ has a group represented by Formula 2. From the viewpoint of printing durability and visibility, it is preferable that both of $Ar_1$ and $Ar_2$ have a group represented by Formula 2.

X in Formula 2 represents a halogen atom, $—C(=O)—X_2—R_{11}$, $—C(=O)—NR_{12}R_{13}$, $—O—C(=O)—R_{14}$, $—CN$, $—SO_2NR_{15}R_{16}$, or a perfluoroalkyl group. From the viewpoint of printing durability, visibility, and temporal stability, X is preferably a halogen atom, $—C(=O)—X_2—R_{11}$, $—C(=O)—NR_{12}R_{13}$, $—O—C(=O)—R_{14}$, CN, or $—SO_2NR_{15}R_{16}$, more preferably a halogen atom, $—C(=O)—O—R_{11}$, $—C(=O)—NR_{12}R_{13}$, or $—O—C(=O)—R_{14}$, even more preferably a halogen atom, $—C(=O)—O—R_{11}$ or $—O—C(=O)—R_{14}$, particularly preferably a fluorine atom, a chlorine atom, a bromine atom, or $—C(=O)OR_{17}$, and most preferably a chlorine atom or a bromine atom.

$X_2$ represents a single bond or an oxygen atom, and is preferably an oxygen atom.

$R_{11}$ and $R_{14}$ each independently represent an alkyl group or an aryl group, preferably each independently represent an alkyl group having 1 to 12 carbon atoms or an aryl group having 6 to 12 carbon atoms, and more preferably each independently represent an alkyl group having 1 to 12 carbon atoms.

$R_{12}$, $R_{13}$, $R_{15}$, and $R_{16}$ each independently represent a hydrogen atom, an alkyl group, or an aryl group, preferably each independently represent a hydrogen atom, an alkyl group having 1 to 12 carbon atoms, or an aryl group having 6 to 12 carbon atoms, more preferably each independently represent a hydrogen atom or an alkyl group having 1 to 12 carbon atoms, and even more preferably each independently represent an alkyl group having 1 to 12 carbon atoms.

$R_{17}$ represents an alkyl group or an aryl group, preferably represent an alkyl group having 1 to 12 carbon atoms or an aryl group having 6 to 12 carbon atoms, and more preferably represent an alkyl group having 1 to 12 carbon atoms.

$A_1$ represents $—NR_9R_{10}$, $—X_1\text{-}L_1$, or —X. From the viewpoint of printing durability, visibility, and temporal stability, $A_1$ is preferably $—NR_9R_{10}$ or $—X_1\text{-}L_1$, and more preferably $—NR_{18}R_{19}$ or $—S—R_{20}$.

Furthermore, from the viewpoint of UV plate missing suppressiveness, GLV suitability, and UV printing durability, $A_1$ is preferably —X, more preferably a halogen atom, even more preferably a chlorine atom or a bromine atom, and particularly preferably a chlorine atom.

$R_9$ and $R_{10}$ each independently represent an alkyl group, an aryl group, an alkoxycarbonyl group, or an arylsulfonyl group, preferably each independently represent an alkyl group having 1 to 12 carbon atoms or an aryl group having 6 to 12 carbon atoms, and more preferably each independently represent an alkyl group having 1 to 12 carbon atoms.

$X_1$ represents an oxygen atom or a sulfur atom. In a case where $L_1$ is a hydrocarbon group or a heteroaryl group, $X_1$ is preferably a sulfur atom. $L_1$ is preferably a group that undergoes bond cleavage from $X_1$ by heat or exposure to infrared.

$L_1$ represents a hydrocarbon group, a heteroaryl group, or a group that undergoes bond cleavage from $X_1$ by heat or exposure to infrared. From the viewpoint of printing durability, $L_1$ is preferably a hydrocarbon group or a heteroaryl group, more preferably an aryl group or a heteroaryl group, and even more preferably a heteroaryl group.

In addition, from the viewpoint of visibility and suppressing fading over time, $L_1$ is preferably a group that undergoes bond cleavage from $X_1$ by heat or exposure to infrared.

The group that undergoes bond cleavage from $X_1$ by heat or exposure to infrared will be described later.

$R_{18}$ and $R_{19}$ each independently represent an aryl group, preferably each independently represent an aryl group having 6 to 20 carbon atoms, and more preferably each independently represent a phenyl group.

$R_{20}$ represents a hydrocarbon group or a heteroaryl group, preferably represents an aryl group or a heteroaryl group, and more preferably represents a heteroaryl group.

Preferred examples of the heteroaryl group represented by $L_1$ and $R_{20}$ include the following groups.

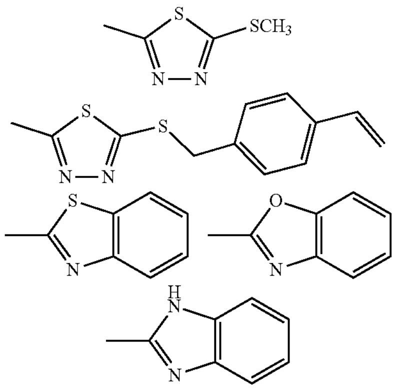

The alkyl group represented by $R_1$ to $R_{10}$ and $R_0$ is preferably an alkyl group having 1 to 30 carbon atoms, more preferably an alkyl group having 1 to 15 carbon atoms, and even more preferably an alkyl group having 1 to 10 carbon atoms. The alkyl group described above may be linear or branched, or may have a ring structure.

Specific examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group.

Among these alkyl groups, a methyl group, an ethyl group, a propyl group, or a butyl group is particularly preferable.

The alkyl group may have a substituent. Examples of the substituent include an alkoxy group, an aryloxy group, an amino group, an alkylthio group, an arylthio group, a halogen atom, a carboxy group, a carboxylate group, a sulfo group, a sulfonate group, an alkyloxycarbonyl group, an aryloxycarbonyl group, and a group obtained by combining these groups.

The aryl group represented by $R_9$, $R_{10}$, $R_{15}$, $R_{19}$, and $R_0$ is preferably an aryl group having 6 to 30 carbon atoms, more preferably an aryl group having 6 to 20 carbon atoms, and even more preferably an aryl group having 6 to 12 carbon atoms.

The aryl group may have a substituent. Examples of the substituent include an alkyl group, an alkoxy group, an aryloxy group, an amino group, an alkylthio group, an arylthio group, a halogen atom, a carboxy group, a carboxylate group, a sulfo group, a sulfonate group, an alkyloxycarbonyl group, an aryloxycarbonyl group, and groups obtained by combining these, and the like.

Specific examples of the aryl group include a phenyl group, a naphthyl group, a p-tolyl group, a p-chlorophenyl group, a p-fluorophenyl group, a p-methoxyphenyl group, a p-dimethylaminophenyl group, a p-methylthiophenyl group, a p-phenylthiophenyl group, and the like.

Among these aryl groups, a phenyl group, a p-methoxyphenyl group, a p-dimethylaminophenyl group, or a naphthyl group is preferable.

It is preferable that $R_1$ and $R_2$ be linked to each other to form a ring.

In a case where $R_1$ and $R_2$ are linked to each other to form a ring, the formed ring is preferably a 5- or a 6-membered ring and more preferably a 6-membered ring. In addition, the ring formed of $R_1$ and $R_2$ linked to each other is preferably a hydrocarbon ring which may have an ethylenically unsaturated bond.

$Y_1$ and $Y_2$ each independently represent an oxygen atom, a sulfur atom, $-NR_0-$, or a dialkylmethylene group. Among these, $-NR_0-$ or a dialkylmethylene group is preferable, and a dialkylmethylene group is more preferable.

$R_0$ represents a hydrogen atom, an alkyl group, or an aryl group. $R_0$ is preferably an alkyl group.

It is preferable that $R_7$ and $R_8$ be the same group.

$R_7$ and $R_8$ preferably each independently represent a linear alkyl group or an alkyl group having a sulfonate group on a terminal, and more preferably each independently represent a methyl group, an ethyl group, or a butyl group having a sulfonate group on a terminal.

The countercation of the aforementioned sulfonate group may be a cation on a nitrogen atom in Formula 1 or may be an alkali metal cation or an alkaline earth metal cation.

From the viewpoint of improving water solubility of the compound represented by Formula 1, $R_7$ and $R_8$ preferably each independently represent an alkyl group having an anion structure, more preferably each independently represent an alkyl group having a carboxylate group or a sulfonate group, and even more preferably each independently represent an alkyl group having a sulfonate group on a terminal.

From the viewpoint of increasing the maximum absorption wavelength of the compound represented by Formula 1 and from the viewpoint of visibility and printing durability of the lithographic printing plate, $R_7$ and $R_8$ preferably each independently represent an alkyl group having an aromatic ring, more preferably each independently represent an alkyl group having an aromatic ring on a terminal, and particularly preferably each independently represent a 2-phenylethyl group, a 2-naphthalenylethyl group, or a 2-(9-anthracenyl) ethyl group.

$R_3$ to $R_6$ each independently represent a hydrogen atom or an alkyl group, and preferably each independently represent a hydrogen atom.

From the viewpoint of temporal stability, UV plate missing suppressiveness, GLV suitability, and UV printing durability, the compound represented by Formula 1 preferably has one or more halogen atoms, more preferably has one or more halogen atoms in at least one group selected from the group consisting of $A_1$, $Ar_1$, and $Ar_2$, and particularly preferably has one or more halogen atoms in each of $A_1$, $Ar_1$ and $Ar_2$.

Furthermore, from the viewpoint of temporal stability, UV plate missing suppressiveness, GLV suitability, and UV printing durability, the compound represented by Formula 1 more preferably has two or more halogen atoms, even more preferably has three or more halogen atoms, and particularly preferably has three or more and six or less halogen atoms.

Preferred examples of the aforementioned halogen atoms include a chlorine atom and a bromine atom.

From the viewpoint of temporal stability, UV plate missing suppressiveness, GLV suitability, and UV printing durability, the compound represented by Formula 1 preferably has halogen atoms in at least one of $Ar_1$ or $Ar_2$, more preferably has chlorine atoms or bromine atoms in at least one of $Ar_1$ or $Ar_2$, and particularly preferably has bromine atoms in at least one of $Ar_1$ or $Ar_2$.

Za represents a counterion that neutralizes charge. In a case where Za represents anionic species, examples thereof include a sulfonate ion, a carboxylate ion, a tetrafluoroborate ion, a hexafluorophosphate ion, a perchlorate ion, a sulfonamide anion, a sulfonimide anion, and the like. In a case where Za represents cationic species, an alkali metal ion, an alkaline earth metal ion, an ammonium ion, a pyridinium ion, or a sulfonium ion is preferable, a sodium ion, a potassium ion, an ammonium ion, a pyridinium ion, or a sulfonium ion is more preferable, a sodium ion, a potassium ion, or an ammonium ion is even more preferable, and a sodium ion, a potassium ion, or a trialkylammonium ion is particularly preferable.

As Za, among the above, from the viewpoint of printing durability and visibility, an organic anion having a carbon atom is preferable, a sulfonate ion, a carboxylate ion, a sulfonamide anion, or a sulfonimide anion is more preferable, a sulfonamide anion or a sulfonimide anion is even more preferable, and a sulfonimide anion is particularly preferable.

$R_1$ to $R_8$, $R_0$, $A_1$, $Ar_1$, $Ar_2$, $Y_1$, and $Y_2$ may have an anion structure or a cation structure. In a case where all of $R_1$ to $R_8$, $R_0$, $A_1$, $Ar_1$, $Ar_2$, $Y_1$, and $Y_2$ represent a group having neutral charge, Za represents a monovalent counteranion. However, for example, in a case where two or more among $R_1$ to $R_8$, $R_0$, $A_1$, $Ar_1$, $Ar_2$, $Y_1$, and $Y_2$ have an anion structure, Za can be a countercation.

In Formula 1, in a case where portions other than Za have neutral charge, Formula 1 may not have Za.

As the sulfonamide anion, an aryl sulfonamide anion is preferable.

In addition, as the sulfonimide anion, a bisaryl sulfonimide anion is preferable.

Specific examples of the sulfonamide anion or the sulfonimide anion will be shown below, but the present disclosure is not limited thereto. In the following specific examples, Ph represents a phenyl group, Me represents a methyl group, and Et represents an ethyl group.

I-1

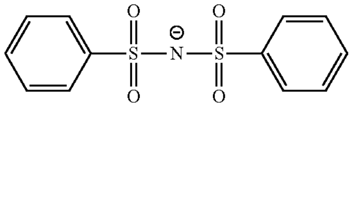

-continued

I-2

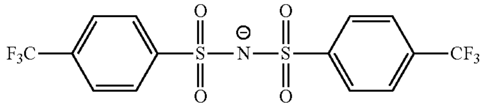

I-3

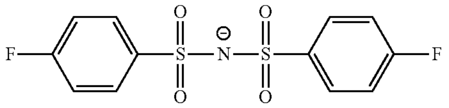

I-4

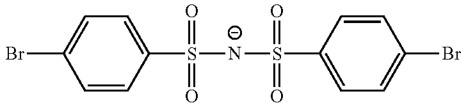

I-5

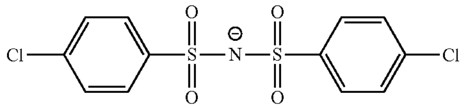

I-6

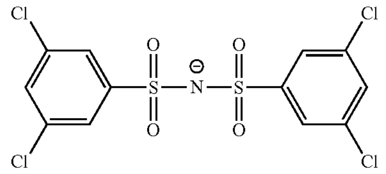

I-7

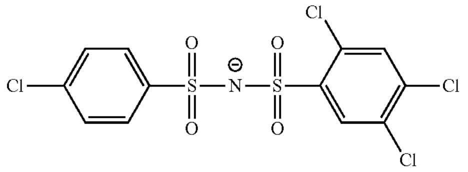

I-8

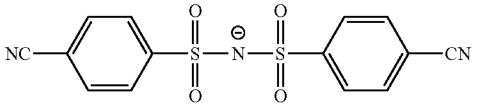

I-9

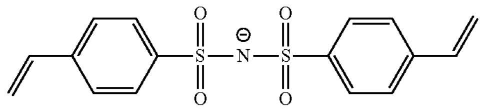

I-10

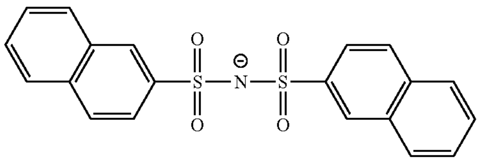

I-11

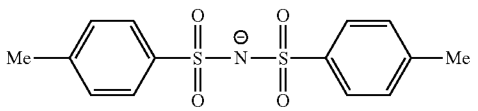

I-12

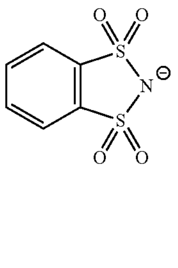

-continued

I-13

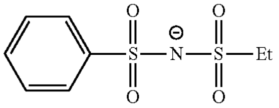

I-14

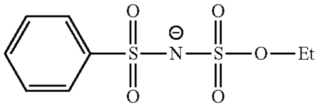

I-15

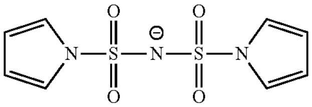

I-16

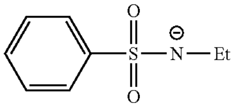

I-17

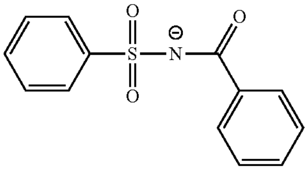

I-18

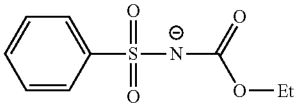

I-19

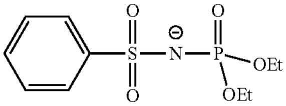

I-20

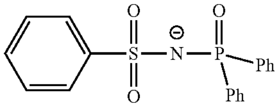

I-21

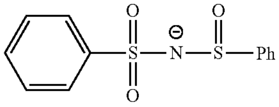

I-22

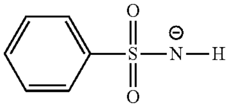

I-23

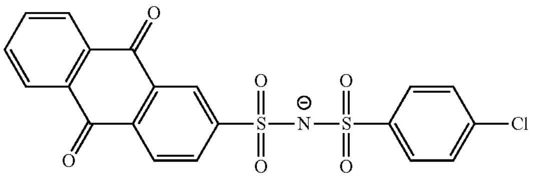

-continued

I-24

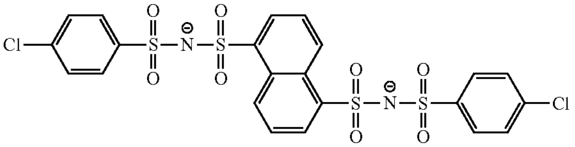

I-25

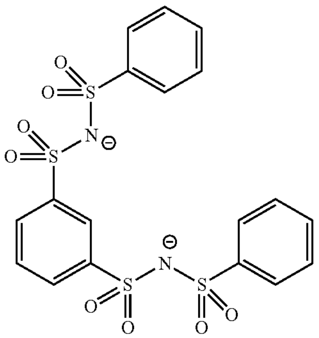

I-26

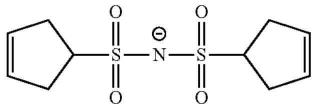

From the viewpoint of visibility, the group that undergoes bond cleavage from $X_1$ by heat or exposure to infrared is preferably a group represented by any of Formulas (1-1) to (1-7), and more preferably a group represented by any of Formulas (1-1) to (1-3).

(1-1)

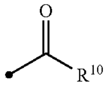

(1-2)

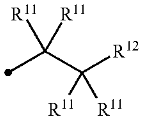

(1-3)

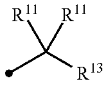

(1-4)

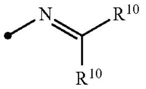

(1-5)

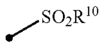

(1-6)

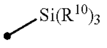

(1-7)

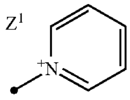

In Formulas (1-1) to (1-7), • represents a bonding site with $X_1$ in Formula 1, $R^{10}$ each independently represent a hydrogen atom, an alkyl group, an alkenyl group, an aryl group, —$OR^{14}$, —$NR^{15}R^{16}$ or —$SR^{17}$, $R^{11}$ each independently represent a hydrogen atom, an alkyl group, or an aryl group, $R^{12}$ represents an aryl group, —$OR^{14}$, —$NR^{15}R^{16}$, —$SR^{17}$, —C(═O)$R^{18}$, —OC(═O)$R^{18}$, or a halogen atom, $R^{13}$ represents an aryl group, an alkenyl group, an alkoxy group, or an onium group, $R^{14}$ to $R^{17}$ each independently represent a hydrogen atom, an alkyl group, or an aryl group, $R^{18}$ each independently represent an alkyl group, an aryl group, —$OR^{14}$, —$NR^{15}R^{16}$, or —$SR^{17}$, and $Z^1$ represents a counterion that neutralizes charge.

In a case where $R^{10}$, $R^{11}$, and $R^{14}$ to $R^{18}$ each represent an alkyl group, preferred aspects of the alkyl group are the same as preferred aspects of the alkyl group represented by $R^2$ to $R^9$ and $R^0$.

The number of carbon atoms in the alkenyl group represented by $R^{10}$ and $R^{13}$ is preferably 1 to 30, more preferably 1 to 15, and even more preferably 1 to 10.

In a case where $R^{10}$ to $R^{18}$ each represent an aryl group, preferred aspects of the aryl group are the same as preferred aspects of the aryl group represented by $R^0$.

From the viewpoint of visibility, $R^{10}$ in Formula (1-1) is preferably an alkyl group, an alkenyl group, an aryl group, —$OR^{14}$, —$NR^{15}R^{16}$, or —$SR^{17}$, more preferably an alkyl group, —$OR^{14}$, —$NR^{15}R^{16}$, or —$SR^{17}$, even more preferably an alkyl group or —$OR^{14}$, and particularly preferably —$OR^{14}$.

In a case where $R^{10}$ in Formula (1-1) is an alkyl group, the alkyl group is preferably an alkyl group having an arylthio group or an alkyloxycarbonyl group at the α-position.

In a case where $R^{10}$ in Formula (1-1) represents —$OR^{14}$, $R^{14}$ is preferably an alkyl group, more preferably an alkyl group having 1 to 8 carbon atoms, even more preferably an isopropyl group or a t-butyl group, and particularly preferably a t-butyl group.

From the viewpoint of visibility, $R^{11}$ in Formula (1-2) is preferably a hydrogen atom.

In addition, from the viewpoint of visibility, $R^{12}$ in Formula (1-2) is preferably —C(═O)$OR^{14}$, —OC(═O)$OR^{14}$, or a halogen atom, and more preferably —C(═O)$OR^{14}$ or —OC(═O)$OR^{14}$. In a case where $R^{12}$ in Formula (1-2) is —C(═O)$OR^{14}$ or —OC(═O)$OR^{14}$, $R^{14}$ is preferably an alkyl group.

From the viewpoint of visibility, $R^{11}$ in Formula (1-3) preferably each independently represent a hydrogen atom or an alkyl group. It is more preferable that at least one of $R^1$'s in Formula (1-3) be an alkyl group.

The alkyl group represented by $R^{11}$ is preferably an alkyl group having 1 to 10 carbon atoms, and more preferably an alkyl group having 3 to 10 carbon atoms.

Furthermore, the alkyl group represented by $R^{11}$ is preferably an alkyl group having a branch or a cycloalkyl group, more preferably a secondary or tertiary alkyl group or a cycloalkyl group, and even more preferably an isopropyl group, a cyclopentyl group, a cyclohexyl group, or a t-butyl group.

In addition, from the viewpoint of visibility, $R^{13}$ in Formula (1-3) is preferably an aryl group, an alkoxy group, or an onium group, more preferably a p-dimethylaminophenyl group or a pyridinium group, and even more preferably a pyridinium group.

Examples of the onium group represented by $R^{13}$ include a pyridinium group, an ammonium group, a sulfonium group, and the like. The onium group may have a substituent. Examples of the substituent include an alkyl group, an alkoxy group, an aryloxy group, an amino group, an alkylthio group, an arylthio group, a halogen atom, a carboxy group, a sulfo group, an alkyloxycarbonyl group, an aryloxycarbonyl group, groups obtained by combining these, and the like. Among these, an alkyl group, an aryl group, and groups obtained by combining these are preferable.

Among these, a pyridinium group is preferable, an N-alkyl-3-pyridinium group, an N-benzyl-3-pyridinium group, an N-(alkoxypolyalkyleneoxyalkyl)-3-pyridinium group, an N-alkoxycarbonylmethyl-3-pyridinium group, an N-alkyl-4-pyridinium group, an N-benzyl-4-pyridinium group, an N-(alkoxypolyalkyleneoxyalkyl)-4-pyridinium group, an N-alkoxycarbonylmethyl-4-pyridinium group, or an N-alkyl-3,5-dimethyl-4-pyridinium group is more preferable, an N-alkyl-3-pyridinium group or an N-alkyl-4-pyridinium group is even more preferable, an N-methyl-3-pyridinium group, an N-octyl-3-pyridinium group, an N-methyl-4-pyridinium group, or an N-octyl-4-pyridinium group is particularly preferable, and an N-octyl-3-pyridinium group or an N-octyl-4-pyridinium group is most preferable.

In a case where $R^{13}$ is a pyridinium group, examples of the counteranion include a sulfonate ion, a carboxylate ion, a tetrafluoroborate ion, a hexafluorophosphate ion, a p-toluenesulfonate ion, a perchlorate ion, and the like. Among these, a p-toluenesulfonate ion or a hexafluorophosphate ion is preferable.

From the viewpoint of visibility, $R^{10}$ in Formula (1-4) is preferably an alkyl group or an aryl group. It is more preferable that one of two $R^{10}$'s be an alkyl group and the other be an aryl group.

From the viewpoint of visibility, $R^{10}$ in Formula (1-5) is preferably an alkyl group or an aryl group, more preferably an aryl group, and even more preferably a p-methylphenyl group.

From the viewpoint of visibility, $R^{10}$ in Formula (1-6) preferably each independently represent an alkyl group or an aryl group, and more preferably each independently represent a methyl group or a phenyl group.

From the viewpoint of visibility, $Z^1$ in Formula (1-7) may be a counterion that neutralizes charge, and may be included in Za in the entirety of the compound.

$Z^1$ is preferably a sulfonate ion, a carboxylate ion, a tetrafluoroborate ion, a hexafluorophosphate ion, a p-toluenesulfonate ion, or a perchlorate ion, and more preferably a p-toluenesulfonate ion or a hexafluorophosphate ion.

The group that undergoes bond cleavage from $X_1$ by heat or exposure to infrared is particularly preferably a group represented by Formula (1-8).

(1-8)

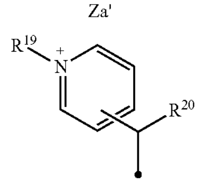

In Formula (1-8), • represents a bonding site with $X_1$ in formula 1, $R^{19}$ and $R^{20}$ each independently represent an alkyl group, and Za' represents a counterion that neutralizes charge.

In Formula (1-8), the bonding position of a pyridinium ring and a hydrocarbon group having $R^{20}$ is preferably the 3-position or 4-position of the pyridinium ring, and more preferably the 4-position of the pyridinium ring.

The alkyl group represented by $R^{19}$ and $R^{20}$ may be linear or branched, or may have a ring structure.

Furthermore, the above alkyl group may have a substituent, and preferred examples of the substituent include an alkoxy group and a terminal alkoxypolyalkyleneoxy group.

$R^{19}$ is preferably an alkyl group having 1 to 12 carbon atoms, more preferably a linear alkyl group having 1 to 12 carbon atoms, even more preferably a linear alkyl group having 1 to 8 carbon atoms, and particularly preferably a methyl group or an n-octyl group.

$R^{20}$ is preferably an alkyl group having 1 to 8 carbon atoms, more preferably a branched alkyl group having 3 to 8 carbon atoms, even more preferably an isopropyl group or a t-butyl group, and particularly preferably an isopropyl group.

Za' may be a counterion that neutralizes charge, and may be included in Za in the entirety of the compound.

Za' is preferably a sulfonate ion, a carboxylate ion, a tetrafluoroborate ion, a hexafluorophosphate ion, a p-toluenesulfonate ion, or a perchlorate ion, and more preferably a p-toluenesulfonate ion or a hexafluorophosphate ion.

From the viewpoint of improving visibility of exposed portions, the decomposition-type infrared absorber is preferably a cyanine colorant having a group that decomposes by exposure to infrared (specifically, $R^1$ in Formulas 1-1 to 1-7).

From the viewpoint of improving visibility of exposed portions, the decomposition-type infrared absorber is more preferably a compound represented by Formula 1-1.

Formula 1-1

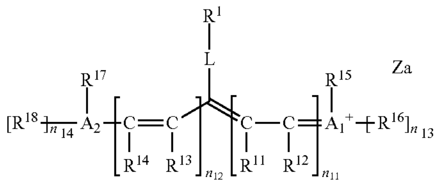

In Formula 1-1, $R^1$ represents a group that is represented by any of Formula 2-1 to Formula 4-1, $R^{11}$ to $R^{18}$ each independently represent a hydrogen atom, a halogen atom, $-R^a$, $-OR^b$, $-SR^c$, or $-NR^dR^e$, $R^a$ to $R^e$ each independently represent a hydrocarbon group, $A_1$, $A_2$, and a plurality of $R_{11}$ to $R_{18}$ may be linked to each other to form a monocyclic or polycyclic ring, $A_1$ and $A_2$ each independently represent an oxygen atom, a sulfur atom, or a nitrogen atom, $n_{11}$ and $n_{12}$ each independently represent an integer of 0 to 5, the sum of $n_{11}$ and $n_{12}$ is 2 or more, $n_{13}$ and $n_{14}$ each independently represent 0 or 1, L represents an oxygen atom, a sulfur atom, or $-NR^{10}-$, $R^{10}$ represents a hydrogen atom, an alkyl group, or an aryl group, and Za represents a counterion that neutralizes charge.

Formula 2-1

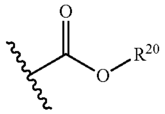

Formula 3-2

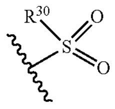

-continued

Formula 4-1

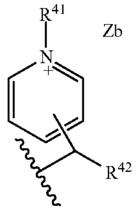

In Formula 2-1 to Formula 4-1, $R^{20}$, $R^{30}$, $R^{41}$, and $R^{42}$ each independently represent an alkyl group or an aryl group, Zb represents a counterion that neutralizes charge, a wavy line represents a bonding site with a group represented by L in Formula 1-1.

In a case where the compound represented by Formula 1-1 is exposed to infrared, the $R^1$-L bond is cleaved, L turns into =O, =S, or $=NR^{10}$, and the compound is discolored.

In Formula 1-1, $R^1$ represents a group represented by any of Formula 2-1 to Formula 4-1.

Hereinafter, each of the group represented by Formula 2-1, the group represented by Formula 3-1, and the group represented by Formula 4-1 will be described.

In Formula 2-1, $R^{20}$ represents an alkyl group or an aryl group, and the portion of the wavy line represents a bonding site with the group represented by L in Formula 1-1.

As the alkyl group represented by $R^{20}$, an alkyl group having a carbon number of 1 to 30 is preferable, an alkyl group having a carbon number of 1 to 15 is more preferable, and an alkyl group having a carbon number of 1 to 10 is even more preferable.

The alkyl group described above may be linear or branched, or may have a ring structure.

The aryl group represented by $R^{20}$ is preferably an aryl group having a carbon number of 6 to 30, more preferably an aryl group having a carbon number of 6 to 20, and even more preferably an aryl group having a carbon number of 6 to 12.

From the viewpoint of visibility, $R^{20}$ is preferably an alkyl group.

From the viewpoint of decomposition properties and visibility, the alkyl group represented by $R^{20}$ is preferably a secondary alkyl group or a tertiary alkyl group, and more preferably a tertiary alkyl group.

Furthermore, from the viewpoint of decomposition properties and visibility, the alkyl group represented by $R^{20}$ is preferably an alkyl group having a carbon number of 1 to 8, more preferably a branched alkyl group having a carbon number of 3 to 10, even more preferably a branched alkyl group having a carbon number of 3 to 6, particularly preferably an isopropyl group or a tert-butyl group, and most preferably a tert-butyl group.

Specific examples of the group represented by Formula 2-1 will be shown below. However, the present disclosure is not limited thereto. In the following structural formulas, • represents a bonding site with the group represented by L in Formula 1-1.

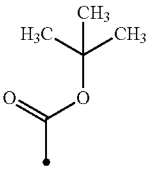
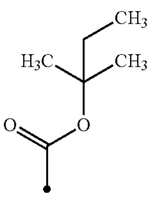
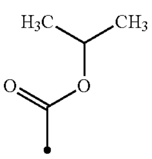

-continued

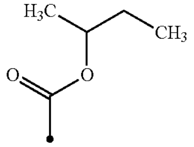
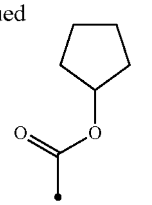

In Formula 3-1, $R^{30}$ represents an alkyl group or an aryl group, and the portion of the wavy line represents a bonding site with the group represented by L in Formula 1-1.

The alkyl group and aryl group represented by $R^{30}$ are the same as the alkyl group and aryl group represented by $R^{20}$ in Formula 2-1, and the preferred aspects thereof are also the same.

From the viewpoint of decomposition properties and visibility, the alkyl group represented by $R^{30}$ is preferably a secondary alkyl group or a tertiary alkyl group, and more preferably a tertiary alkyl group.

Furthermore, from the viewpoint of decomposition properties and visibility, the alkyl group represented by $R^{30}$ is preferably an alkyl group having a carbon number of 1 to 8, more preferably a branched alkyl group having a carbon number of 3 to 10, even more preferably a branched alkyl group having a carbon number of 3 to 6, particularly preferably an isopropyl group or a tert-butyl group, and most preferably a tert-butyl group.

In addition, from the viewpoint of decomposition properties and visibility, the alkyl group represented by $R^{30}$ is preferably a substituted alkyl group, more preferably a fluoro-substituted alkyl group, even more preferably a perfluoroalkyl group, and particularly preferably a trifluoromethyl group.

From the viewpoint of decomposition properties and visibility, the aryl group represented by $R^{30}$ is preferably a substituted aryl group. Examples of the substituent include an alkyl group (preferably an alkyl group having a carbon number of 1 to 4), an alkoxy group (preferably an alkoxy group having a carbon number of 1 to 4), and the like.

Specific examples of the group represented by Formula 3-1 will be shown below. However, the present disclosure is not limited thereto. In the following structural formulas, • represents a bonding site with the group represented by L in Formula 1-1.

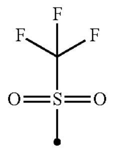
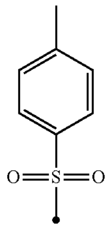

In Formula 4-1, $R^{41}$ and $R^{42}$ each independently represent an alkyl group or an aryl group, Zb represents a counterion that neutralizes charge, and the portion of the wavy line represents a bonding site with the group represented by L in Formula 1-1.

The alkyl group and aryl group represented by $R^{41}$ or $R^{42}$ are the same as the alkyl group and aryl group represented by $R^{20}$ in Formula 2-1, and preferred aspects thereof are also the same.

From the viewpoint of decomposition properties and visibility, $R^{41}$ is preferably an alkyl group.

From the viewpoint of decomposition properties and visibility, $R^{42}$ is preferably an alkyl group.

From the viewpoint of decomposition properties and visibility, the alkyl group represented by $R^{41}$ is preferably an alkyl group having a carbon number of 1 to 8, more preferably an alkyl group having a carbon number of 1 to 4, and particularly preferably a methyl group.

From the viewpoint of decomposition properties and visibility, the alkyl group represented by $R^{42}$ is preferably a secondary alkyl group or a tertiary alkyl group, and more preferably a tertiary alkyl group.

Furthermore, from the viewpoint of decomposition properties and visibility, the alkyl group represented by $R^{42}$ is preferably an alkyl group having a carbon number of 1 to 8, more preferably a branched alkyl group having a carbon number of 3 to 10, even more preferably a branched alkyl group having a carbon number of 3 to 6, particularly preferably an isopropyl group or a tert-butyl group, and most preferably a tert-butyl group.

Zb in Formula 4-1 may be a counterion that neutralizes charge, and may be included in Za in Formula 1-1 in the entirety of the compound.

Zb is preferably a sulfonate ion, a carboxylate ion, a tetrafluoroborate ion, a hexafluorophosphate ion, a p-toluenesulfonate ion, or a perchlorate ion, and more preferably a tetrafluoroborate ion or a hexafluorophosphate ion.

Specific examples of the group represented by Formula 4-1 will be shown below. However, the present disclosure is not limited thereto. In the following structural formulas, • represents a bonding site with the group represented by L in Formula 1-1.

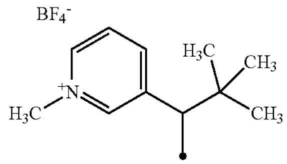
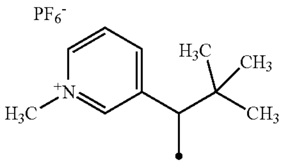

L in Formula 1-1 is preferably an oxygen atom or —$NR^{10}$—, and particularly preferably an oxygen atom.

In addition, $R^{10}$ in —$NR^{10}$—, is preferably an alkyl group. The alkyl group represented by $R^{10}$ is preferably an alkyl group having a carbon number of 1 to 10. The alkyl group represented by $R^{10}$ may be linear or branched, or may have a ring structure.

Among the alkyl groups, a methyl group or a cyclohexyl group is preferable.

In a case where $R^{10}$ in —$NR^{10}$— represents an aryl group, the aryl group is preferably an aryl group having a carbon number of 6 to 30, more preferably an aryl group having a carbon number of 6 to 20, and even more preferably an aryl group having a carbon number of 6 to 12. These aryl groups may have a substituent.

In Formula 1-1, $R^{11}$ to $R^{18}$ preferably each independently represent a hydrogen atom, —$R^a$, —$OR^b$, —$SR^c$, or —$NR^dR^e$.

The hydrocarbon group represented by $R^a$ to $R^e$ is preferably a hydrocarbon group having a carbon number of 1 to 30, more preferably a hydrocarbon group having a carbon number of 1 to 15, and even more preferably a hydrocarbon group having a carbon number of 1 to 10.

The hydrocarbon group may be linear or branched or may have a ring structure.

As the hydrocarbon group, an alkyl group is particularly preferable.

The aforementioned alkyl group is preferably an alkyl group having a carbon number of 1 to 30, more preferably an alkyl group having a carbon number of 1 to 15, and even more preferably an alkyl group having a carbon number of 1 to 10.

The alkyl group described above may be linear or branched, or may have a ring structure.

Specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an s-butyl group, a tert-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group.

Among these alkyl groups, a methyl group, an ethyl group, a propyl group, or a butyl group is preferable.

The alkyl group described above may have a substituent.

Examples of the substituent include an alkoxy group, an aryloxy group, an amino group, an alkylthio group, an arylthio group, a halogen atom, a carboxy group, a carboxylate group, a sulfo group, a sulfonate group, an alkyloxycarbonyl group, an aryloxycarbonyl group, groups obtained by combining these, and the like.

$R^{11}$ to $R^{14}$ in Formula 1-1 preferably each independently represent a hydrogen atom or —$R^a$ (that is, a hydrocarbon group), more preferably each independently represent a hydrogen atom or an alkyl group, and even more preferably each independently represent a hydrogen atom except in the cases described below.

Particularly, each of $R^{11}$ and $R^{13}$ bonded to the carbon atom that is bonded to the carbon atom to which L is bonded is preferably an alkyl group. It is more preferable that $R^{11}$ and $R^{13}$ be linked to each other to form a ring. The ring to be formed in this way may be a monocyclic or polycyclic ring. Specifically, examples of the ring to be formed include a monocyclic ring such as a cyclopentene ring, a cyclopentadiene ring, a cyclohexene ring, or a cyclohexadiene ring, and a polycyclic ring such as an indene ring or an indole ring.

Furthermore, it is preferable that $R^{12}$ bonded to the carbon atom to which $A_1$+ is bonded be linked to $R^{11}$ or $R^{16}$ (preferably $R^{16}$) to form a ring, and $R^{14}$ bonded to the carbon atom to which $A_2$ is bonded be linked to $R^{17}$ or $R^{18}$ (preferably $R^{18}$) to form a ring.

In Formula 1-1, $n_{13}$ is preferably 1, and $R^{16}$ is preferably —$R^a$ (that is, a hydrocarbon group).

Furthermore, it is preferable that $R^{16}$ be linked to $R^{12}$ bonded to the carbon atom, to which $A_1$+ is bonded, to form a ring. As the ring to be formed, an indolium ring, a pyrylium ring, a thiopyrylium ring, a benzoxazoline ring, or a benzimidazoline ring is preferable, and an indolium ring is more preferable from the viewpoint of improving visibility of exposed portions. These rings may further have a substituent.

In Formula 1-1, $n_{14}$ is preferably 1, and $R^{18}$ is preferably —$R^a$ (that is, a hydrocarbon group).

In addition, it is preferable that $R^{18}$ be linked to $R^{14}$ bonded to the carbon atom, to which $A_2$ is bonded, to form a ring. As the ring to be formed, an indole ring, a pyran ring, a thiopyran ring, a benzoxazole ring, or a benzimidazole ring is preferable, and an indole ring is more preferable from the viewpoint of improving visibility of exposed portions. These rings may further have a substituent.

It is preferable that $R^{16}$ and $R^{18}$ in Formula 1-1 be the same group. In a case where $R^{16}$ and $R^{18}$ each form a ring, it is preferable that the formed rings have the same structure except for $A_1^+$ and $A_2$.

It is preferable that $R^{15}$ and $R^{17}$ in Formula 1-1 be the same group. In addition, $R^{15}$ and $R^{17}$ are preferably —$R^a$ (that is, a hydrocarbon group), more preferably an alkyl group, and even more preferably a substituted alkyl group.

From the viewpoint of improving water solubility, $R^{15}$ and $R^{17}$ in the compound represented by Formula 1-1 are preferably a substituted alkyl group.

Examples of the substituted alkyl group represented by $R^{15}$ or $R^{17}$ include a group represented by any of Formula (a1) to Formula (a4).

$$-W\!\left(R^{W0}-O\right)_{n_{W1}}R^{W1} \quad \text{(a1)}$$

$$-R^{W2}-CO_2M \quad \text{(a2)}$$

$$-R^{W3}-PO_3M_2 \quad \text{(a3)}$$

$$-R^{W4}-SO_3M \quad \text{(a4)}$$

In Formula (a1) to Formula (a4), $R^{W0}$ represents an alkylene group having a carbon number of 2 to 6, W represents a single bond or an oxygen atom, and $n_{W1}$ represents an integer of 1 to 45, $R^{W1}$ represents an alkyl group having a carbon number of 1 to 12 or —C(═O)—$R^{W5}$, $R^{W5}$ represents an alkyl group having a carbon number of 1 to 12, $R^{W2}$ to $R^{W4}$ each independently represent a single bond or an alkylene group having a carbon number of 1 to 12, and M represents a hydrogen atom, a sodium atom, a potassium atom, or an onium group.

Specific examples of the alkylene group represented by $R^{W0}$ in Formula (a1) include an ethylene group, a n-propylene group, an isopropylene group, a n-butylene group, an isobutylene group, a n-pentylene group, an isopentylene group, a n-hexyl group, an isohexyl group, and the like. Among these, an ethylene group, a n-propylene group, an isopropylene group, or a n-butylene group is preferable, and a n-propylene group is particularly preferable.

$n_{W1}$ is preferably 1 to 10, more preferably 1 to 5, and particularly preferably 1 to 3.

Specific examples of the alkyl group represented by $R^{W1}$ include a methyl group, an ethyl group, an n-propyl group, an isopropyl group, an n-butyl group, an isobutyl group, a tert-butyl group, an n-pentyl group, an isopentyl group, a neopentyl group, an n-hexyl group, an n-octyl group, an n-dodecyl group, and the like. Among these, a methyl group, an ethyl group, an n-propyl group, an isopropyl group, an n-butyl group, or a tert-butyl group is preferable, a methyl group or an ethyl group is more preferable, and a methyl group is particularly preferable.

The alkyl group represented by $R^{W5}$ is the same as the alkyl group represented by $R^{W1}$. Preferred aspects of the alkyl group represented by $R^{W5}$ are the same as preferred aspects of the alkyl group represented by $R^{W1}$.

Specific examples of the group represented by Formula (a1) will be shown below. However, the present disclosure is not limited thereto. In the following structural formulas, Me represents a methyl group, Et represents an ethyl group, and * represents a bonding site.

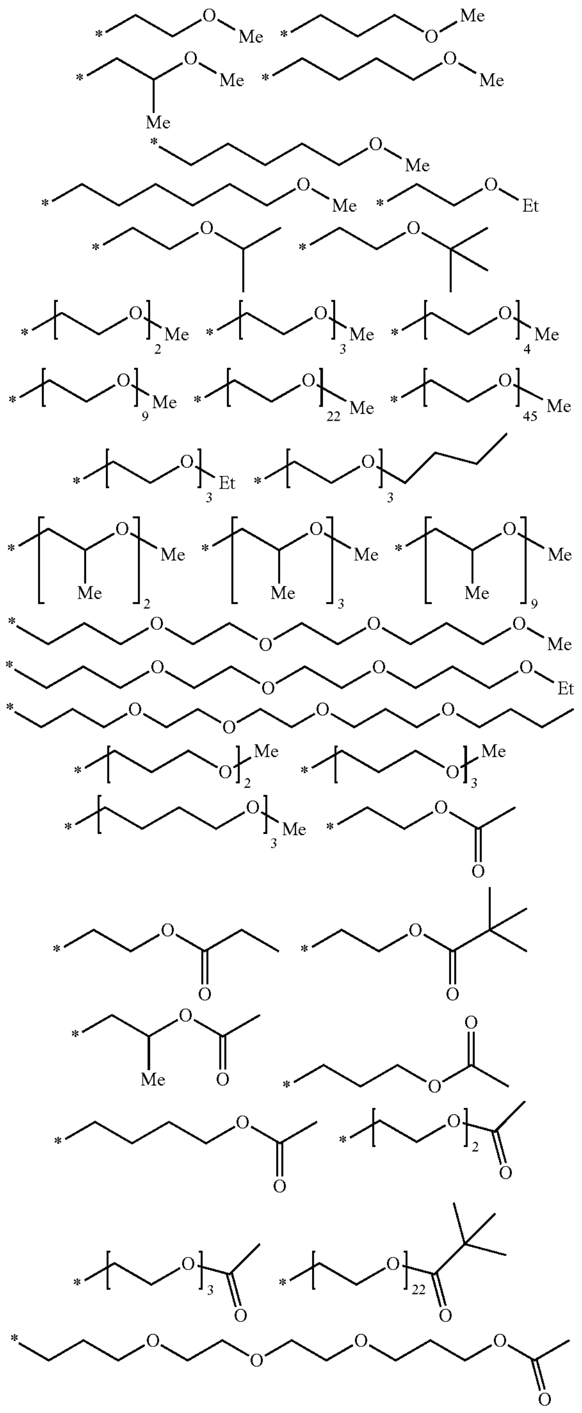

Specific examples of the alkylene group represented by $R^{W2}$ to $R^{W4}$ in Formula (a2) to Formula (a4) include a methylene group, an ethylene group, a n-propylene group, an isopropylene group, a n-butylene group, an isobutylene group, a n-pentylene group, an isopentylene group, a n-hexyl group, an isohexyl group, a n-octylene group, a n-dodecylene group, and the like. Among these, an ethylene group, a n-propylene group, an isopropylene group, or a n-butylene group is preferable, and an ethylene group or a n-propylene group is particularly preferable.

In Formula (a3), two Ms may be the same as or different from each other.

Examples of the onium group represented by M in Formula (a2) to Formula (a4) include an ammonium group, an iodonium group, a phosphonium group, a sulfonium group, and the like.

All of $CO_2M$ in Formula (a2), $PO_3M_2$ in Formula (a2), and $SO_3M$ in Formula (a4) may have an anion structure from which M is dissociated. The countercation of the anion structure may be $A_1^+$ or a cation that can be contained in $R^1$-L in Formula 1-1.

Among the groups represented by Formula (a1) to Formula (a4), the group represented by Formula (a1), Formula (a2), or Formula (a4) is preferable.

$n_{11}$ and $n_{12}$ in Formula 1-1 are preferably the same as each other, and preferably both represent an integer of 1 to 5, more preferably both represent an integer of 1 to 3, even more preferably both represent 1 or 2, and particularly preferably both represent 2.

$A_1$ and $A_2$ in Formula 1-1 each independently represent an oxygen atom, a sulfur atom, or a nitrogen atom. Among these, a nitrogen atom is preferable.

$A_1$ and $A_2$ in Formula 1-1 are preferably the same atoms.

Za in Formula 1-1 represents a counterion that neutralizes charge.

In a case where all of $R^{11}$ to $R^{18}$ and $R^1$-L are groups having a neutral charge, Za is a monovalent counteranion. Here, $R^{11}$ to $R^{18}$ and $R^1$-L may have an anion structure or a cation structure. For example, in a case where two or more among $R^{11}$ to $R^{18}$ and $R^1$-L have an anion structure, Za can also be a countercation.

In a case where the cyanine colorant represented by Formula 1-1 has such a structure that the overall charge of the compound is neutral except for Za, Za is unnecessary.

In a case where Za is a counteranion, examples thereof include a sulfonate ion, a carboxylate ion, a tetrafluoroborate ion, a hexafluorophosphate ion, a p-toluenesulfonate ion, a perchlorate ion, and the like. Among these, a tetrafluoroborate ion is preferable.

In a case where Za is a countercation, examples thereof include an alkali metal ion, an alkaline earth metal ion, an ammonium ion, a pyridinium ion, a sulfonium ion, and the like. Among these, a sodium ion, a potassium ion, an ammonium ion, a pyridinium ion, or a sulfonium ion is preferable, and a sodium ion, a potassium ion, or an ammonium ion is more preferable.

From the viewpoint of improving visibility of exposed portions, the decomposition-type infrared absorber is more preferably a compound represented by Formula 1-2 (that is, a cyanine colorant).

Formula 1-2

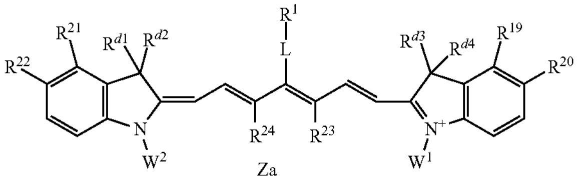

In Formula 1-2, $R^1$ represents a group that is represented by any of Formula 2-1 to Formula 4-1, $R^{19}$ to $R^{22}$ each independently represent a hydrogen atom, a halogen atom, —$R^a$, —$OR^b$, —CN, —$SR^c$, or —$NR^dR^e$, $R^{23}$ and $R^{24}$ each independently represent a hydrogen atom or —$R^a$, $R^a$ to $R^e$ each independently represent a hydrocarbon group, $R^{19}$ and $R^{20}$, $R^{21}$ and $R^{22}$, or $R^{23}$ and $R^{24}$ may be linked to each other to form a monocyclic or polycyclic ring, L represents an oxygen atom, a sulfur atom, or —$NR^{10}$—, $R^{10}$ represents a hydrogen atom, an alkyl group, or an aryl group, $R^{d1}$ to $R^{d4}$, $W^1$, and $W^2$ each independently represent an alkyl group which may have a substituent, and Za represents a counterion that neutralizes charge.

$R^1$ in Formula 1-2 has the same definition as $R^1$ in Formula 1-1, and preferred aspects thereof are also the same.

In Formula 1-2, $R^{19}$ to $R^{22}$ preferably each independently represent a hydrogen atom, a halogen atom, —$R^a$, —$OR^b$, or —CN.

More specifically, $R^{19}$ and $R^{21}$ are preferably a hydrogen atom or —$R^a$.

In addition, $R^{20}$ and $R^{22}$ are preferably a hydrogen atom, —$R^a$, —$OR^b$, or —CN.

—$R^a$ represented by $R^{19}$ to $R^{22}$ is preferably an alkyl group or an alkenyl group.

In a case where all of $R^{19}$ to $R^{22}$ are —$R^a$, it is preferable that $R^{19}$ and $R^{20}$ and $R^{21}$ and $R^{22}$ be linked to each other to form a monocyclic or polycyclic ring.

Examples of the ring formed of $R^{19}$ and $R^{20}$ or $R^{21}$ and $R^{22}$ linked to each other include a benzene ring, a naphthalene ring, and the like.

$R^{23}$ and $R^{24}$ in Formula 1-2 are preferably linked to each other to form a monocyclic or polycyclic ring.

The ring formed of $R^{23}$ and $R^{24}$ linked to each other may be a monocyclic or polycyclic ring. Specifically, examples of the ring to be formed include a monocyclic ring such as a cyclopentene ring, a cyclopentadiene ring, a cyclohexene ring, or a cyclohexadiene ring, and a polycyclic ring such as an indene ring.

$R^{d1}$ to $R^{d4}$ in Formula 1-2 are preferably an unsubstituted alkyl group. In addition, all of $R^{d1}$ to $R^{d4}$ are preferably the same group.

Examples of the unsubstituted alkyl group include unsubstituted alkyl groups having a carbon number of 1 to 4. Among these, a methyl group is preferable.

From the viewpoint of improving water solubility of the compound represented by Formula 1-2, $W^1$ and $W^2$ in Formula 1-2 preferably each independently represent a substituted alkyl group.

Examples of the substituted alkyl group represented by $W^1$ and $W^2$ include a group represented by any of Formula (a1) to Formula (a4) in Formula 1-1, and preferred aspects thereof are also the same.

From the viewpoint of on-press developability, $W^1$ and $W^2$ preferably each independently represent an alkyl group having a substituent. The alkyl group preferably has at least —$OCH_2CH_2$—, a sulfo group, a salt of a sulfo group, a carboxy group, or a salt of a carboxy group, as the substituent.

Za represents a counterion that neutralizes charge in the molecule.

In a case where all of $R^{19}$ to $R^{22}$, $R^{23}$ and $R^{24}$, $R^{d1}$ to $R^{d4}$, $W^1$, $W^2$, and $R^1$-L are groups having a neutral charge, Za is a monovalent counteranion. Here, $R^{19}$ to $R^{22}$, $R^{23}$ and $R^{24}$, $R^{d1}$ to $R^{d4}$, $W^1$, $W^2$, and $R^1$-L may have an anion structure or a cation structure. For example, in a case where two or more among $R^{19}$ to $R^{22}$, $R^{23}$ and $R^{24}$, $R^{d1}$ to Rd[4], $W^1$, $W^2$, and $R^1$-L have an anion structure, Za can be a countercation.

In a case where the compound represented by Formula 1-2 has such a structure that the overall charge of the compound is neutral except for Za, Za is unnecessary.

Examples of the case where Za is a counteranion are the same as such examples of Za in Formula 1-1, and preferred aspects thereof are also the same. Furthermore, examples of the case where Za is a countercation are the same as such examples of Za in Formula 1-1, and preferred aspects thereof are also the same.

From the viewpoint of decomposition properties and visibility, the cyanine dye as a decomposition-type infrared absorber is even more preferably a compound represented by any of Formula 1-3 to Formula 1-7.

Particularly, from the viewpoint of decomposition properties and visibility, the cyanine dye is preferably a compound represented by any of Formula 1-3, Formula 1-5, and Formula 1-6.

Formula 1-3

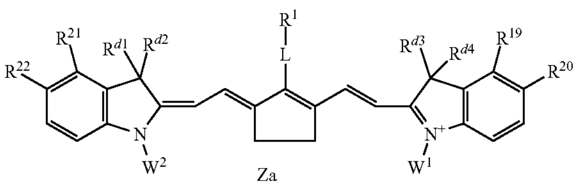

Formula 1-4

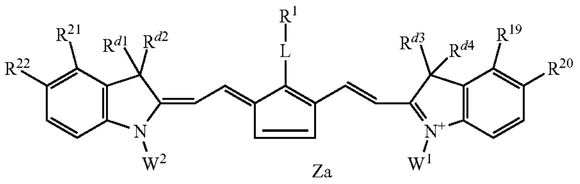

Formula 1-5

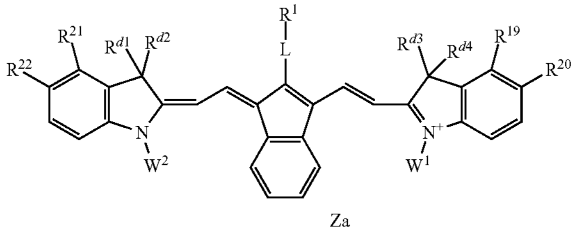

Formula 1-6

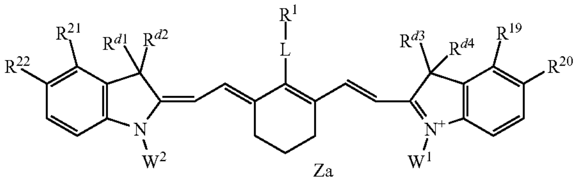

Formula 1-7

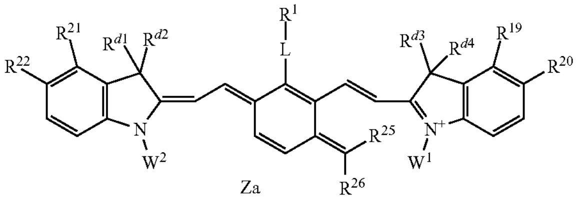

In Formula 1-3 to Formula 1-7, $R^1$ represents a group that is represented by any of Formula 2-1 to Formula 4-1, $R^{19}$ to $R^{22}$ each independently represent a hydrogen atom, a halogen atom, —$R^a$, —$OR^b$, —CN, —$SR^c$, or —$NR^dR^e$, $R^{25}$ and $R^{26}$ each independently represent a hydrogen atom, a halogen atom, or —$R^a$, $R^a$ to $R^e$ each independently represent a hydrocarbon group, $R^{19}$ and $R^{20}$, $R^{21}$ and $R^{22}$, or $R^{25}$ and $R^{26}$ may be linked to each other to form a monocyclic or polycyclic ring, L represents an oxygen atom, a sulfur atom, or —$NR^{10}$—, $R^{10}$ represents a hydrogen atom, an alkyl group, or an aryl group, $R^{d1}$ to $R^{d4}$, $W^1$, and $W^2$ each independently represent an alkyl group which may have a substituent, and Za represents a counterion that neutralizes charge.

$R^1$, $R^{19}$ to $R^{22}$, $R^{d1}$ to $R^{d4}$, $W^1$, $W^2$, and L in Formula 1-3 to Formula 1-7 have the same definitions as $R^1$, $R^{19}$ to $R^{22}$, $R^{d1}$ to $Rd^4$, $W^1$, $W^2$, and L in Formula 1-2, and preferred aspects thereof are also the same.

$R^{25}$ and $R^{26}$ in Formula 1-7 preferably each independently represent a hydrogen atom or an alkyl group, more preferably each independently represent an alkyl group, and particularly preferably each independently represent a methyl group.

Specific examples of the cyanine dye as a decomposition-type infrared absorber will be shown below. However, the present disclosure is not limited thereto.

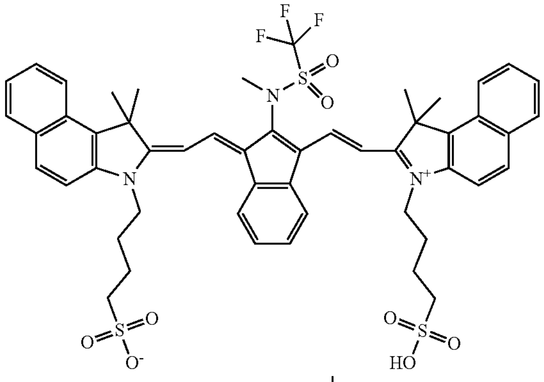

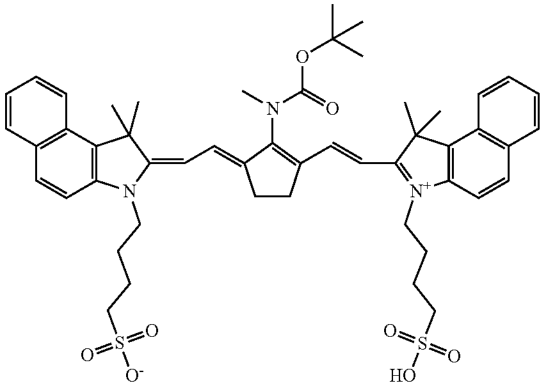

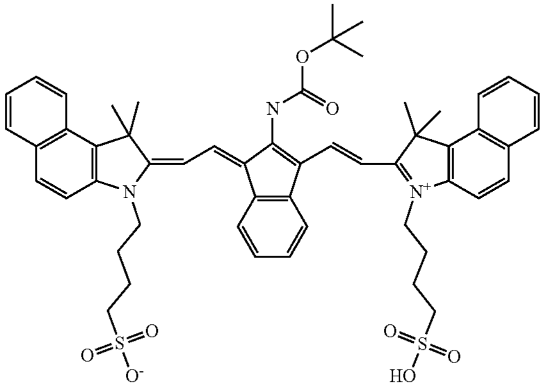

-continued

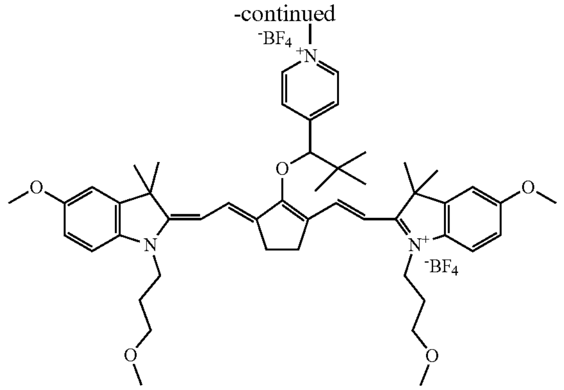

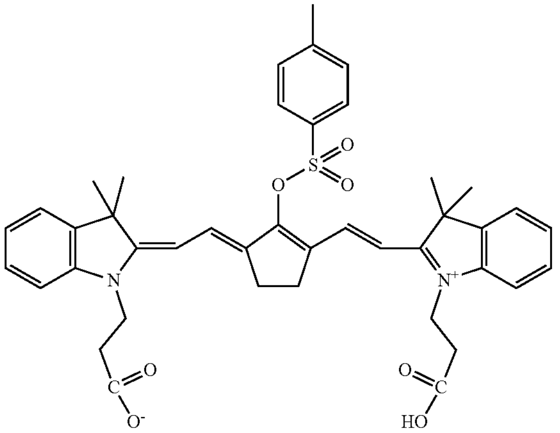

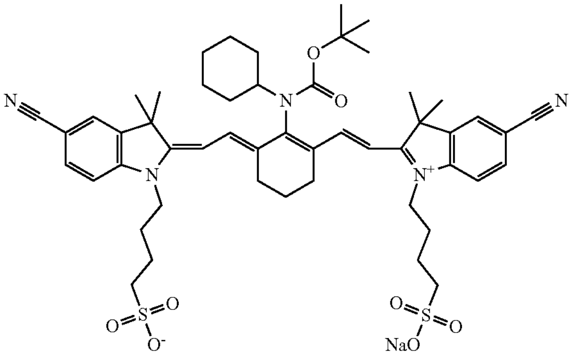

In addition, from the viewpoint of color formability, the infrared absorber preferably includes a compound represented by Formula (X) as a decomposition-type infrared absorber.

Formula (X)

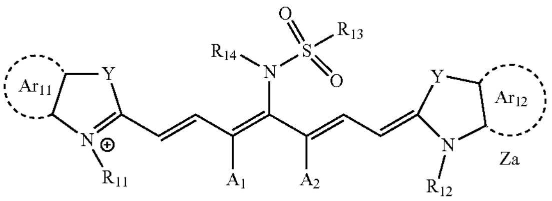

In Formula (X), $Ar_{11}$ and $Ar_{12}$ each independently represent an atomic group necessary for forming a substituted or unsubstituted aromatic ring or for forming a substituted or unsubstituted heteroaromatic ring, $R_{11}$ and $R_{12}$ each independently represent a substituted or unsubstituted alkyl group, $R_{13}$ represents a substituted or unsubstituted alkyl group, a substituted or unsubstituted aryl group, or a substituted or unsubstituted heteroaryl group, $R_{14}$ represents a hydrogen atom, a substituted or unsubstituted alkyl group, a substituted or unsubstituted aryl group, or a substituted or unsubstituted heteroaryl group, Y's each independently represent an oxygen atom, a sulfur atom, or a dialkylmethylene group represented by $>C(R_{15}R_{16})$, $R_{15}$ and $R_{16}$ each independently represent a substituted or unsubstituted alkyl group having 1 to 4 carbon atoms, $A_1$ and $A_2$ each independently represent a substituted or unsubstituted alkyl group or represent an atomic group including 2 or 3 carbon atoms necessary for forming a substituted or unsubstituted 5- or 6-membered non-aromatic carbon ring by linking to each other, and Za represents a counter ion that neutralizes an electric charge.

$Ar_{11}$ and $Ar_{12}$ each independently represent an atomic group necessary for forming a substituted or unsubstituted aromatic ring or a substituted or unsubstituted heteroaromatic ring, and examples of a substituent of the aromatic ring or the heteroaromatic ring include an alkyl group, an alkoxy group, a halogen atom, a cyano group, a —COOR group, a $—SO_3R$ group, or a $—SO_2R$ group (R represents a substituted or unsubstituted alkyl group), and an alkyl group or a halogen atom is preferable.

In addition, $Ar_{11}$ and $Ar_{12}$ are preferably an atomic group necessary for forming a substituted or unsubstituted aromatic ring, and more preferably an atomic group necessary for forming a substituted or unsubstituted benzene ring or naphthalene ring.

Y's each independently preferably represent a dialkylmethylene group represented by $>C(R_{15}R_{16})$, and more preferably a dialkylmethylene group represented by $>C(R_{15}R_{16})$ in which $R_{15}$ and $R_{16}$ are the same. In this case, it is preferable that $R_{15}$ and $R_{16}$ each independently represent a substituted or unsubstituted alkyl group having 1 or 2 carbon atoms.

The above-described Y, in particular, is represented by $>C(R_{15}R_{16})$, is preferably a dialkylmethylene group in which $R_{15}$ and $R_{16}$ are a methyl group.

$R_{11}$ and $R_{12}$ described above each independently preferably represent a substituted or unsubstituted alkyl group having 1 to 12 carbon atoms. In addition, $R_{11}$ and $R_{12}$ may include an ether bond or an ester bond in the middle of a carbon chain of a substituted or unsubstituted alkyl group having 1 to 12 carbon atoms.

$R_{13}$ is preferably a substituted or unsubstituted alkyl group having 1 to 12 carbon atoms, and more preferably a haloalkyl group in which one or more of hydrogen atoms of an alkyl group having 1 to 12 carbon atoms are substituted with a halogen atom. In this case, preferred examples of the halogen atom include a chlorine atom and a bromine atom.

Among these, $R_{11}$ and $R_{12}$ each independently preferably represent a perfluoroalkyl group.

$R_{14}$ is preferably a hydrogen atom or an unsubstituted alkyl group having 1 or 8 carbon atoms.

It is preferable that $A_1$ and $A_2$ each independently represent a substituted or unsubstituted alkyl group, or an atomic group that are bonded to each other and include 2 or 3 carbon atoms necessary for forming a cyclopentene ring or a cyclohexene ring.

In a case where Za is a counteranion, an anion containing a halogen atom or an anion containing a boron atom is preferable. Specific examples of Za include $CLO_4^-$, $PF_6^-$, $BF_4^-$, $SbF_6^-$, $CH_3SO_3^-$, $CF_3SO_3^-$, $C_6H_5SO_3^-$, $CH_3C_6H_5SO_3^-$, $HOC_6H_5SO_3^-$, $ClC_6H_5SO_3^-$, $CH_3C_6H_5SO_3^-$, and a tetraaryl borate anion (for example, a tetraphenylborate anion).

In a case where Za is a countercation, examples thereof include an alkali metal ion, an alkaline earth metal ion, a tertiary ammonium ion, a quaternary ammonium ion, and an onium ion (an iodonium ion, a sulfonium ion, a phosphonium ion, and the like).

Specific examples of the compound represented by Formula (X) will be shown below. However, the present disclosure is not limited thereto.

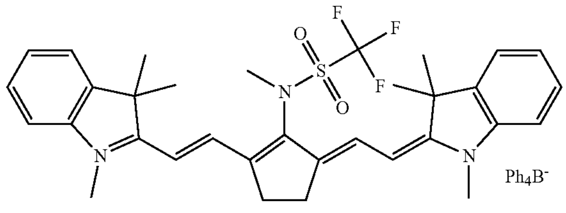

As the infrared absorber that decomposes by exposure to infrared, those described in JP2008-544322A or WO2016/027886A can also be suitably used.

In addition, as the cyanine colorant which is a decomposition-type infrared absorber, the infrared absorbing compounds described in WO2019/219560A can be suitably used.

Only one infrared absorber may be used, or two or more infrared absorbers may be used in combination. In addition, as the infrared absorber, a pigment and a dye may be used in combination.

The total content of the infrared absorber in the image-recording layer with respect to the total mass of the image-recording layer is preferably 0.1% by mass to 10.0% by mass, and more preferably 0.5% by mass to 5.0% by mass.

Polymerization Initiator

It is preferable that the image-recording layer in the lithographic printing plate precursor according to the present disclosure contain a polymerization initiator.

From the viewpoints of sensitivity, printing durability, on-press developability, and receptivity, the polymerization initiator preferably includes an electron-accepting polymerization initiator, and more preferably includes an electron-accepting polymerization initiator and an electron-donating polymerization initiator.

Electron-Accepting Polymerization Initiator

It is preferable that the image-recording layer contain an electron-accepting polymerization initiator as a polymerization initiator.

The electron-accepting polymerization initiator is a compound which accepts an electron by intermolecular electron migration in a case where electrons of an infrared absorber are excited by exposure to infrared rays, and generates a polymerization initiation species such as radicals.

The electron-accepting polymerization initiator used in the present disclosure is a compound that generates a polymerization initiation species such as a radical or a cation by either or both of light energy and heat energy, and can be appropriately selected from known thermal polymerization initiators, compounds having a bond that requires low bond dissociation energy, photopolymerization initiators, and the like.

The electron-accepting polymerization initiator is preferably a radical polymerization initiator and more preferably an onium salt compound.

In addition, as the electron-accepting polymerization initiator, an infrared-ray-sensitive polymerization initiator is preferable.

Examples of the electron-accepting radical polymerization initiator include (a) organic halide, (b) carbonyl compound, (c) azo compound, (d) organic peroxide, I metallocene compound, (f) azide compound, (g) hexaarylbiimidazole compound, (i) disulfone compound, (j) oxime ester compound, and (k) onium salt compound.

As (a) organic halide, for example, the compounds described in paragraphs "0022" and "0023" of JP2008-195018A are preferable.

As (b) carbonyl compound, for example, the compounds described in paragraph "0024" of JP2008-195018A are preferable.

As (c) azo compound, for example, the azo compounds described in JP1996-108621A (JP-H8-108621A) and the like can be used.

As (d) organic peroxide, for example, the compounds described in paragraph "0025" of JP2008-195018A are preferable.

As (e) metallocene compound, for example, the compounds described in paragraph "0026" of JP2008-195018A are preferable.

Examples of (f) azide compound can include compounds such as 2,6-bis(4-azidobenzylidene)-4-methylcyclohexanone.

As (g) hexaarylbiimidazole compound, for example, the compounds described in paragraph "0027" of JP2008-195018A are preferable.

Examples of (i) disulfone compound include the compounds described in JP1986-166544A (JP-S61-166544A) and JP2002-328465A.

As (j) oxime ester compound, for example, the compounds described in paragraphs "0028" to "0030" of JP2008-195018A are preferable.

Among the above electron-accepting polymerization initiators, from the viewpoint of curing properties, an oxime ester compound and an onium salt compound are preferable. Particularly, from the viewpoint of printing durability, an iodonium salt compound, a sulfonium salt compound, or an azinium salt compound is preferable, an iodonium salt compound or a sulfonium salt compound is more preferable, and an iodonium salt compound is particularly preferable.

Specific examples of these compounds will be shown below, but the present disclosure is not limited thereto.

As the iodonium salt compound, for example, a diaryliodonium salt compound is preferable. Particularly, an electron-donating group, for example, a diphenyl iodonium salt compound substituted with an electron-donating group such as an alkyl group or an alkoxyl group is more preferable. Furthermore, an asymmetric diphenyl iodonium salt compound is preferable. Specific examples thereof include diphenyliodonium=hexafluorophosphate, 4-methoxyphenyl-4-(2-methylpropyl)phenyliodonium=hexafluoro- phosphate, 4-(2-methylpropyl)phenyl-p-tolyliodonium=hexafluorophosphate, 4-hexyloxyphenyl-2,4,6-trimethoxyphenyl iodonium=hexafluorophosphate, 4-hexyloxyphenyl-2,4-diethoxyphenyl iodonium=tetrafluoroborate, 4-octyloxyphenyl-2,4,6-trimethoxyphenyl iodonium=1-perfluorobutane sulfonate, 4-octyloxyphenyl-2,4,6-trimethoxyphenyliodonium=hexafluorophosphate, and bis(4-t-butylphenyl) iodonium=hexafluorophosphate.

As the sulfonium salt compound, for example, a triarylsulfonium salt compound is preferable. Particularly, a triarylsulfonium salt compound is preferable in which at least some of electron-withdrawing groups such as groups on an aromatic ring are substituted with halogen atoms, and a triarylsulfonium salt compound is more preferable in which the total number of halogen atoms as substituents on an aromatic ring is 4 or more. Specific examples thereof include triphenylsulfonium=hexafluorophosphate, triphenylsulfonium=benzoyl formate, bis(4-chlorophenyl) phenylsulfonium=benzoyl formate, bis(4-chlorophenyl)-4-methylphenylsulfonium=tetrafluoroborate, tris(4-chlorophenyl)sulfonium=3,5-bis(methoxycarbonyl)benzenesulfonate, tris(4-chlorophenyl)sulfonium=hexafluorophosphate, and tris(2,4-dichlorophenyl)sulfonium=hexafluorophosphate.

As a counteranion of the iodonium salt compound and the sulfonium salt compound, a sulfonamide anion or a sulfonimide anion is preferable, and a sulfonimide anion is more preferable.

As the sulfonamide anion, an aryl sulfonamide anion is preferable.

In addition, as the sulfonimide anion, a bisaryl sulfonimide anion is preferable.

Specific examples of the sulfonamide anion or the sulfonimide anion will be shown below, but the present disclosure is not limited thereto. In the following specific examples, Ph represents a phenyl group, Me represents a methyl group, and Et represents an ethyl group.

I-1

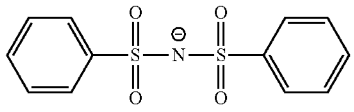

I-2

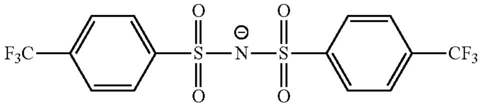

I-3

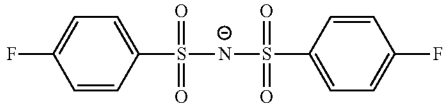

I-4

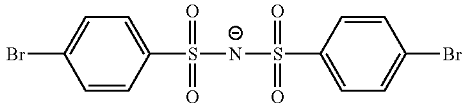

I-5

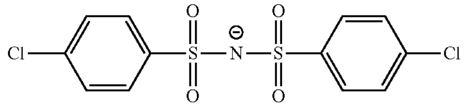

I-6

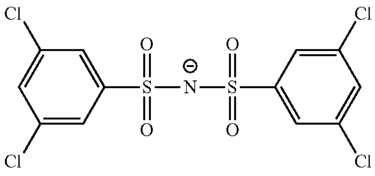

I-7

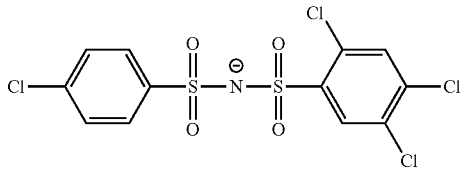

-continued
I-8
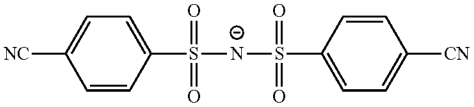
I-9
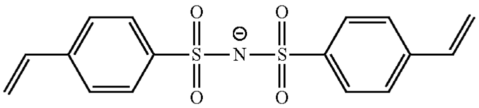
I-10
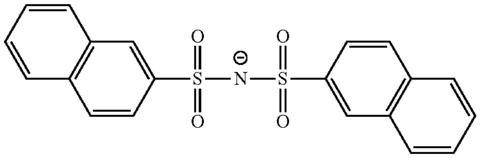
I-11
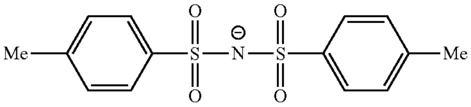
I-12
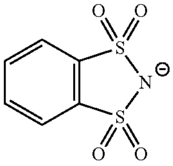
I-13
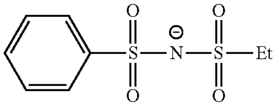
I-14
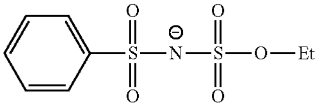
I-15
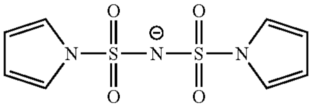
I-16
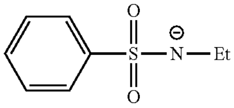
I-17
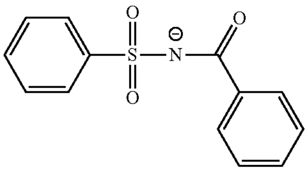
I-18
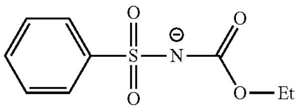
I-19
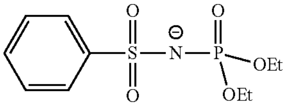
-continued
I-20
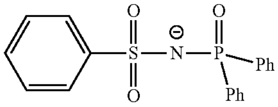
I-21
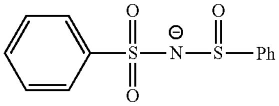
I-22
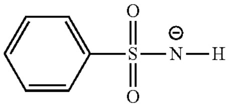
I-23
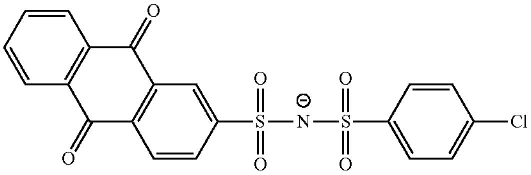
I-24
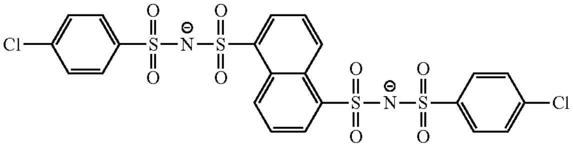
I-25
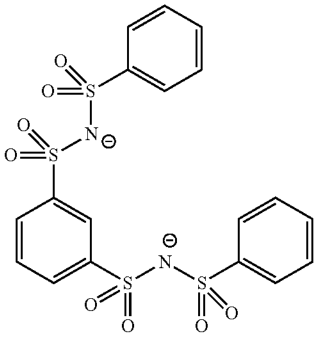
I-26
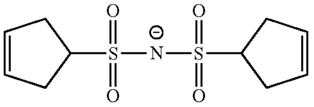
The polymerization intiator preferably includes, as the electron-accepting polymerization initiator, a compound A represented by Formula (Ia) and one or more compounds B selected from the group consisting of a compound represented by Formula (Ib) and a compound represented by Formula (Ic).

Formula (Ia)

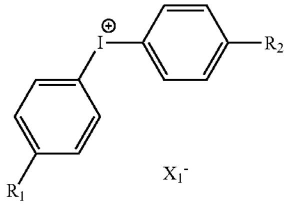

Formula (Ib)

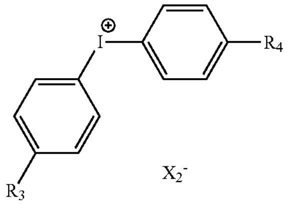

Formula (Ic)

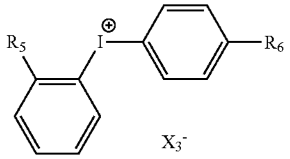

In Formula (Ia) to (Ic), $R_1$, $R_2$, $R_3$, $R_4$, $R_5$, and $R_6$ are each independently a substituted or unsubstituted alkyl group having 2 to 9 carbon atoms or a substituted or unsubstituted alkoxy group having 2 to 9 carbon atoms, at least one elected from the group consisting of $R_3$ and $R_4$ is different from $R_1$ or $R_2$, a difference between a total number of carbon atoms in $R_1$ and $R_2$ and a total number of carbon atoms in $R_3$ and $R_4$ is 0 to 4 (that is, 0, 1, 2, 3, or 4), a difference between the total number of carbon atoms in $R_1$ and $R_2$ and a total number of carbon atoms in $R_5$ and $R_6$ is 0 to 4, and $X_1$, $X_2$, and $X_3$ are the same or different anions.

$R_1$, $R_2$, $R_3$, $R_4$, $R_5$, and $R_6$ are each independently preferably a substituted or unsubstituted alkyl group having 2 to 9 carbon atoms or a substituted or unsubstituted alkoxy group having 2 to 9 carbon atoms, more preferably a substituted or unsubstituted alkyl group having 3 to 6 carbon atoms or a substituted or unsubstituted alkoxy group having 3 to 6 carbon atoms, and even more preferably a substituted or unsubstituted alkyl group having 3 to 6 carbon atoms. The alkyl group and the alkoxy group may be linear or branched, but are preferably branched.

Examples of the substituted or unsubstituted alkyl group include an ethyl group, an n-propyl group, an iso-propyl group, an n-butyl group, an iso-butyl group, a sec-butyl group, a t-butyl group, an n-pentyl group, a t-pentyl group, a sec-pentyl group, a neopentyl group, a n-hexyl group, an iso-hexyl group, a sec-hexyl group, a t-hexyl group, an n-heptyl group, an n-octyl group, an iso-octyl group, a 2-ethyl hexyl group, and a nonyl group.

Examples of the substituted or unsubstituted alkoxy group include an ethoxy group, a propoxy group, an iso-propoxy group, a t-butoxy group, an n-butoxy group, and an n-octyloxy group.

As $X_1$, $X_2$, and $X_3$, $ClO_4^-$, $PF_6^-$, $BF_4^-$, $SbF_6^-$, $CH_3SO_3^-$, $CF_3SO_3^-$, $C_6H_5SO_3^-$, $CH_3C_6H_4SO_3^-$, $HOC_6H_4SO_3^-$, $ClC_6H_4SO_3^-$, and a borate anion represented by the following formula (Id) are preferable.

$$B^-(R^1)(R^2)(R^3)(R^4) \qquad \text{Formula(Id)}$$

In Formula (Id), $R^1$, $R^2$, $R^3$, and $R^4$ each independently represent a substituted or unsubstituted alkyl group, a substituted or unsubstituted aryl group (including a halogen-substituted aryl group), a substituted or unsubstituted alkenyl group, a substituted or unsubstituted alkynyl group, a substituted or unsubstituted cycloalkyl group, or a substituted or unsubstituted heterocyclic group. Two or more of $R^1$, $R^2$, $R^3$, and $R^4$ may be linked to each other to form a substituted or unsubstituted heterocyclic ring containing a boron atom. The heterocyclic ring to be obtained has a maximum of 7 carbon atoms, nitrogen atoms, oxygen atoms, or nitrogen atoms.

Examples of the substituent in $R^1$, $R^2$, $R^3$, and $R^4$ include a chlorine atom, a fluorine atom, a nitro group, an alkyl group, an alkoxy group, and an acetoxy group.

All of $R^1$, $R^2$, $R^3$, and $R^4$ are preferably a substituted or unsubstituted aryl group, and more preferably an unsubstituted phenyl group.

It is preferable that at least one of $X_1$, $X_2$, or $X_3$ is a tetraaryl borate anion including the same or different aryl groups, it is more preferable that one or more of $X_1$, $X_2$, and $X_3$ are tetraphenyl borate anions, and it is even more preferable that each of $X_1$, $X_2$, and $X_3$ is a tetraphenyl borate anion.

Examples of a preferable aspect include an aspect in which the compound B includes a compound represented by Formula (Ic), $R_1$ is the same as $R_8$, and $R_2$ is the same as $R_6$. In particular, it is preferable that $R_1$ is the same as $R_2$, and for example, both $R_1$ and $R_2$ are an iso-propyl group, an iso-butyl group, or a t-butyl group.

In addition, examples of another preferable aspect include an aspect in which the compound B includes a compound represented by Formula (Ib), $R_1$ is the same as $R_2$, and $R_3$ is the same as $R_4$. In this case, it is preferable that both $R_1$ and $R_2$ are an iso-propyl group, an iso-butyl group, or a t-butyl group. In addition, the difference in the number of carbon atoms between $R_1$ and $R_3$ is preferably 1 or 2.

The compound B may be a mixture of a compound represented by Formula (Ib) and a compound represented by Formula (Ic).

The compounds represented by Formula (Ia) to (Ic) may be obtained from Sigma-Aldrich Co., LLC or the like, or may be synthesized by a known synthesis method using easily available starting materials.

The molar ratio between the compound A and the compound B is preferably 10:90 to 90:10, more preferably 20:80 to 80:20, and even more preferably 30:70 to 70:30.

From the viewpoints of developability and UV printing durability of the lithographic printing plate to be obtained, the electron-accepting polymerization initiator may include a compound represented by Formula (II) described in paragraphs “0186” to “0197” of WO2022/019217A.

From the viewpoint of improving sensitivity and making it difficult for plate missing to occur, the lowest unoccupied molecular orbital (LUMO) of the electron-accepting polymerization initiator is preferably −3.00 eV or less, and more preferably −3.02 eV or less.

The lower limit of LUMO is preferably −3.80 eV or more and more preferably −3.60 eV or more.

One electron-accepting polymerization initiator may be used alone, or two or more electron-accepting polymerization initiators may be used in combination.

The content of the electron-accepting polymerization initiator with respect to the total mass of the image-recording layer is preferably 0.1% by mass to 50% by mass, more preferably 0.5% by mass to 30% by mass, and particularly preferably 0.8% by mass to 20% by mass.

Electron-Donating Polymerization Initiator

From the viewpoint of contributing the improvement of chemical resistance and UV printing durability of the lithographic printing plate, the polymerization initiator preferably further includes an electron-donating polymerization initiator, and more preferably includes both the electron-donating polymerization initiator and the electron-accepting polymerization initiator described above.

Examples of the electron-donating polymerization initiator include the following five kinds of initiators.

(i) Alkyl- or aryl-ate complex: considered to generate active radicals by oxidative cleavage of carbon-hetero bond. Specific examples thereof include a borate salt compound and the like.

(ii) Amino acetate compound: considered to generate active radicals by oxidation-induced cleavage of C—X bond on carbon adjacent to nitrogen. X is preferably a hydrogen atom, a carboxy group, a trimethylsilyl group, or a benzyl group. Specific examples thereof include N-phenylglycines (which may have a substituent in a phenyl group), N-phenyl iminodiacetic acids (which may have a substituent in a phenyl group), and the like.

(iii) Sulfur-containing compound: compound obtained by substituting nitrogen atoms of the aforementioned amino acetate compound with sulfur atoms and capable of generating active radicals by the same action as that of the amino acetate compound. Specific examples thereof include phenylthioacetic acids (which may have a substituent on a phenyl group) and the like.

(iv) Tin-containing compound: compound obtained by substituting nitrogen atoms of the aforementioned amino acetate compound with tin atoms and capable of generating active radicals by the same action as that of the amino acetate compound.

(v) Sulfinates: capable of generating active radicals by oxidation. Specific examples thereof include sodium aryl sulfinate and the like.

It is preferable that the image-recording layer contain the borate salt compound among the above electron-donating polymerization initiators. As the borate salt compound, a tetraaryl borate salt compound or a monoalkyltriaryl borate salt compound is preferable. From the viewpoint of compound stability, a tetraaryl borate salt compound is more preferable, and a tetraphenyl borate salt compound is particularly preferable.

A countercation that the borate salt compound has is not particularly limited, but is preferably an alkali metal ion or a tetraalkyl ammonium ion and more preferably a sodium ion, a potassium ion, or a tetrabutylammonium ion.

Specifically, preferred examples of the borate salt compound include sodium tetraphenyl borate.

From the viewpoint of chemical resistance and UV printing durability, the highest occupied molecular orbital (HOMO) of the electron-donating polymerization initiator used in the present disclosure is preferably −6.00 eV or more, more preferably −5.95 eV or more, even more preferably −5.93 eV or more, and particularly preferably more than −5.90 eV.

The upper limit of HOMO is preferably −5.00 eV or less and more preferably −5.40 eV or less.

Specifically, as the electron-donating polymerization initiator, for example, compounds B-1 to B-8 and other compounds shown below are preferable. It goes without saying that the present disclosure is not limited thereto. In the following chemical formulas, Bu represents a n-butyl group, and Z represents a countercation.

Examples of the countercation represented by $Z^+$ include $Na^+$, $K^+$, $N^+(Bu)_4$, and the like. Bu represents a n-butyl group.

As the countercation represented by $Z^+$, for example, the onium ion in the aforementioned electron-accepting polymerization initiator is also suitable.

B-1

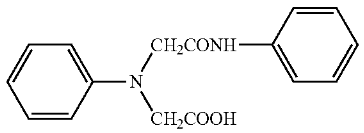

B-2

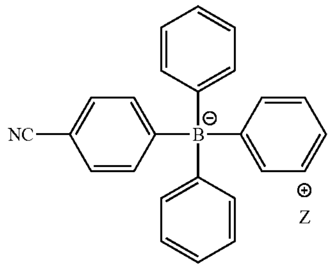

HOMO = -6.052 eV

B-3

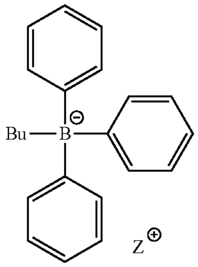

HOMO = -5.772 eV

B-4

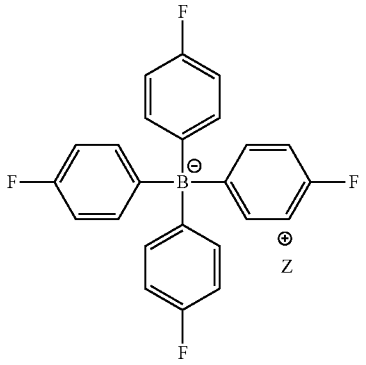

HOMO = -5.957 eV

B-5

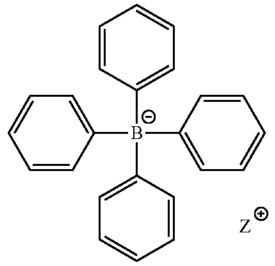

HOMO = -5.905 eV

-continued
B-6
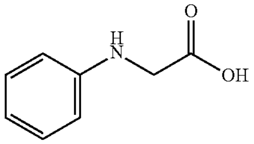
B-7
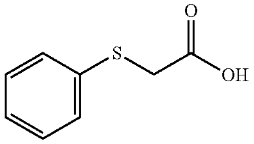
B-8
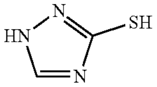
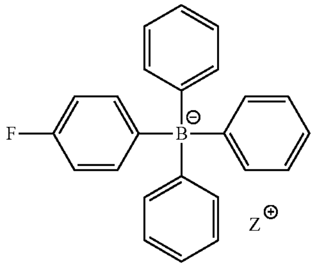
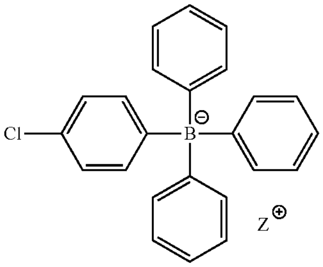
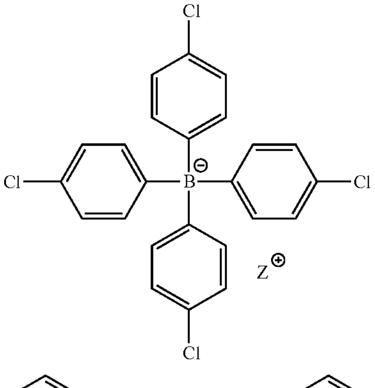
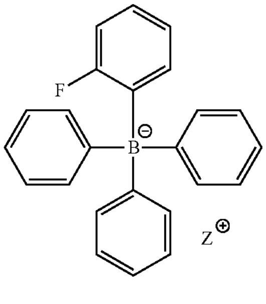
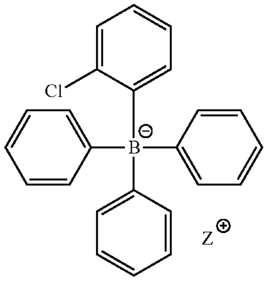
-continued
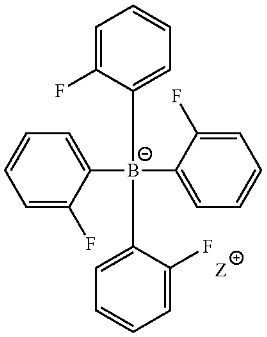
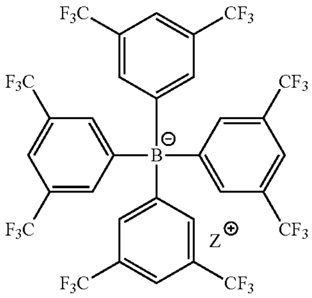
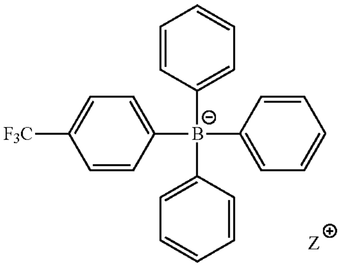
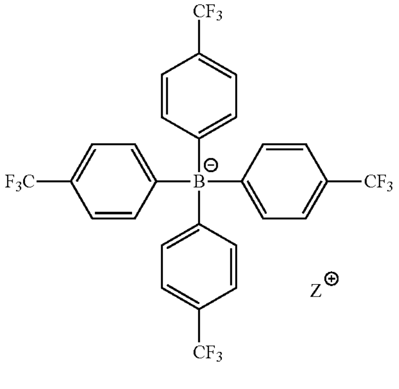
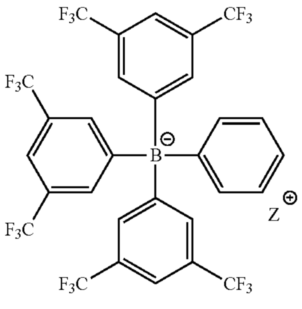

-continued

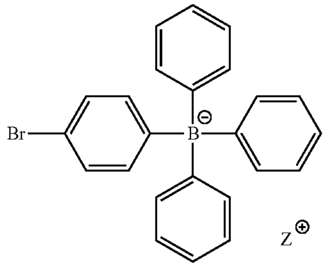

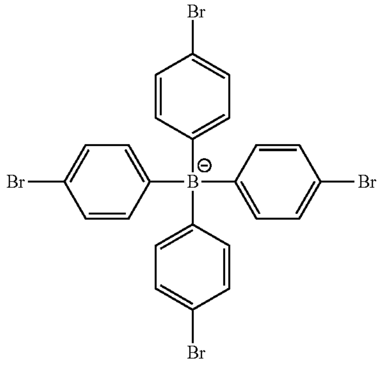

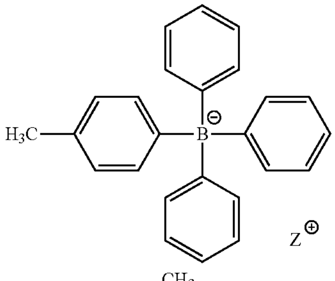

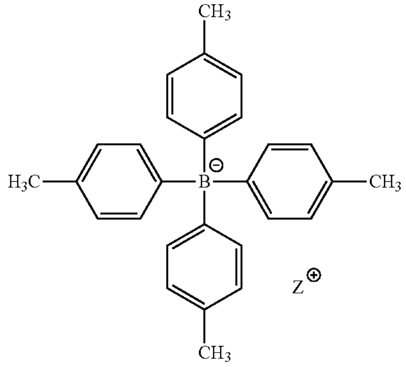

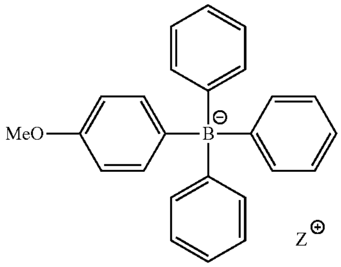

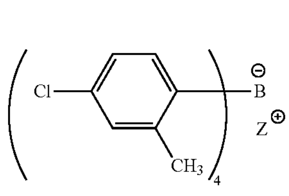

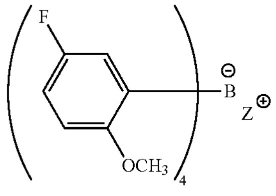

-continued

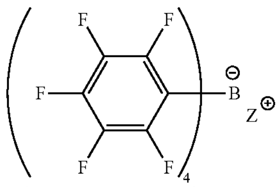

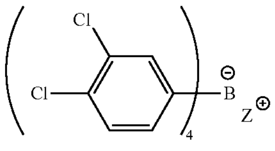

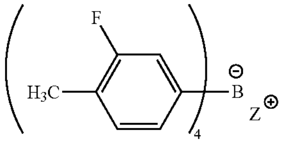

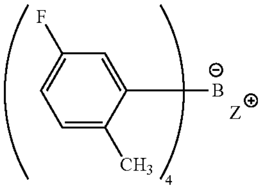

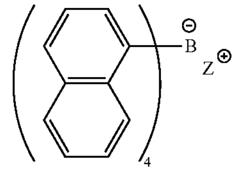

From the viewpoint of visibility, UV printing durability, and temporal stability, the image-recording layer preferably contains an onium salt compound as the electron-accepting polymerization initiator and contains at least one kind of compound selected from the group consisting of borate salt compounds as the electron-donating polymerization initiator, and more preferably contains an onium salt compound as the electron-accepting polymerization initiator and contains a borate salt compound as the electron-donating polymerization initiator.

In addition, the image-recording layer preferably contains a borate salt compound as the electron-donating polymerization initiator. The image-recording layer more preferably contains a borate salt compound as the electron-donating polymerization initiator, and the HOMO value of the infrared absorber—the HOMO value of the borate salt compound is more preferably equal to or less than 0.70 eV.

HOMO described above is calculated by the method that will be described later.

Only one kind of electron-donating polymerization initiator may be added to the image-recording layer, or two or more kinds of electron-donating polymerization initiators may be used in combination.

The content of the electron-donating polymerization initiator with respect to the total mass of the image-recording layer is preferably 0.01% by mass to 30% by mass, more preferably 0.05% by mass to 25% by mass, and even more preferably 0.1% by mass to 20% by mass.

One of the preferred aspects of the present disclosure is an aspect in which the aforementioned electron-accepting polymerization initiator and the aforementioned electron-donating polymerization initiator form a salt.

Specific examples thereof include an aspect in which the aforementioned onium salt compound is a salt formed of an onium ion and an anion of the electron-donating polymerization initiator (for example, a tetraphenyl borate anion). In addition, for example, an iodonium borate salt compound is more preferable which is a salt formed of an iodonium cation of the aforementioned iodonium salt compound (for example, a di-p-tolyl iodonium cation) and a borate anion of the aforementioned electron-donating polymerization initiator.

Specific examples of the aspect in which the electron-accepting polymerization initiator and the electron-donating polymerization initiator form a salt will be shown below. However, the present disclosure is not limited thereto.

(IA-1)

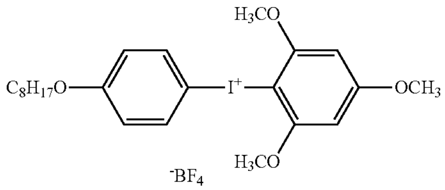

(IA-2)

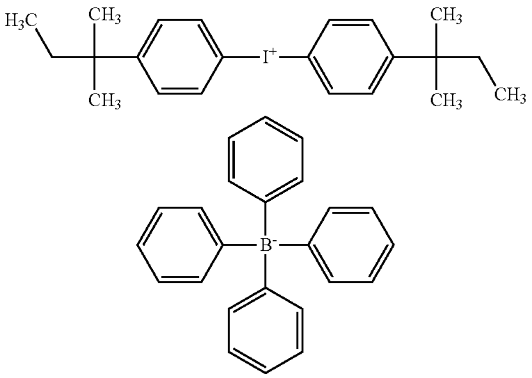

(IA-3)

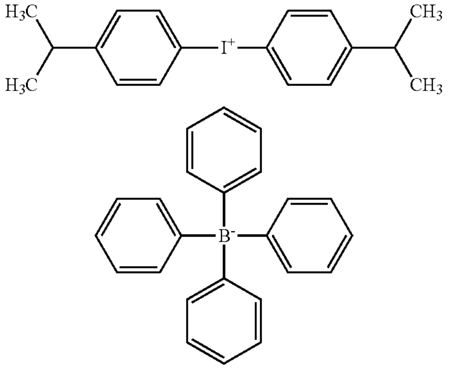

(IA-4)

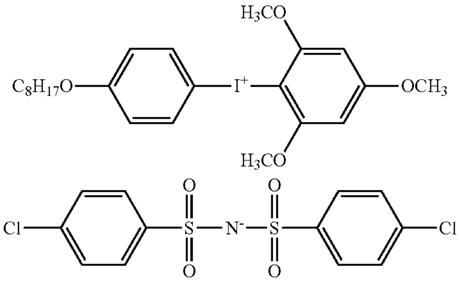

-continued (IA-5)

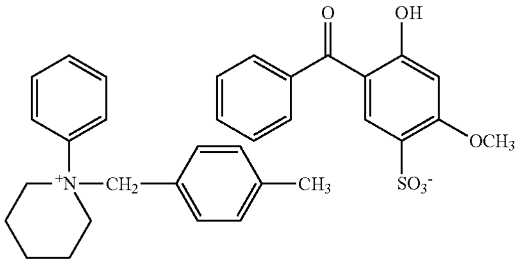

In the present disclosure, in a case where the image-recording layer contains an onium ion and an anion of the aforementioned electron-donating polymerization initiator, the image-recording layer is regarded as containing an electron-accepting polymerization initiator and the electron-donating polymerization initiator described above.

Relationship Among Electron-Donating Polymerization Initiator, Electron-Accepting Polymerization Initiator, and Infrared Absorber The image-recording layer of the present disclosure preferably contains the electron-donating polymerization initiator, the electron-accepting polymerization initiator, and the infrared absorber described above. HOMO of the electron-donating polymerization initiator is preferably −6.0 eV or more, and LUMO of the electron-accepting polymerization initiator is preferably −3.0 eV or less.

More preferred aspects of HOMO of the electron-donating polymerization initiator and LUMO of the electron-accepting polymerization initiator are as described above.

Presumably, in the image-recording layer of the present disclosure, the electron-donating polymerization initiator, at least one of the infrared absorber, and the electron-accepting polymerization initiator may exchange energy, for example, in the manner described in the following chemical formula.

Accordingly, it is considered that in a case where HOMO of the electron-donating polymerization initiator is −6.0 eV or more and LUMO of the electron-accepting polymerization initiator is −3.0 eV or less, radicals may be more efficiently generated, and chemical resistance and UV printing durability may be therefore further improved easily.

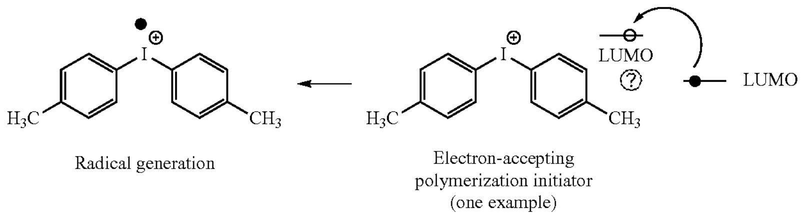

-continued

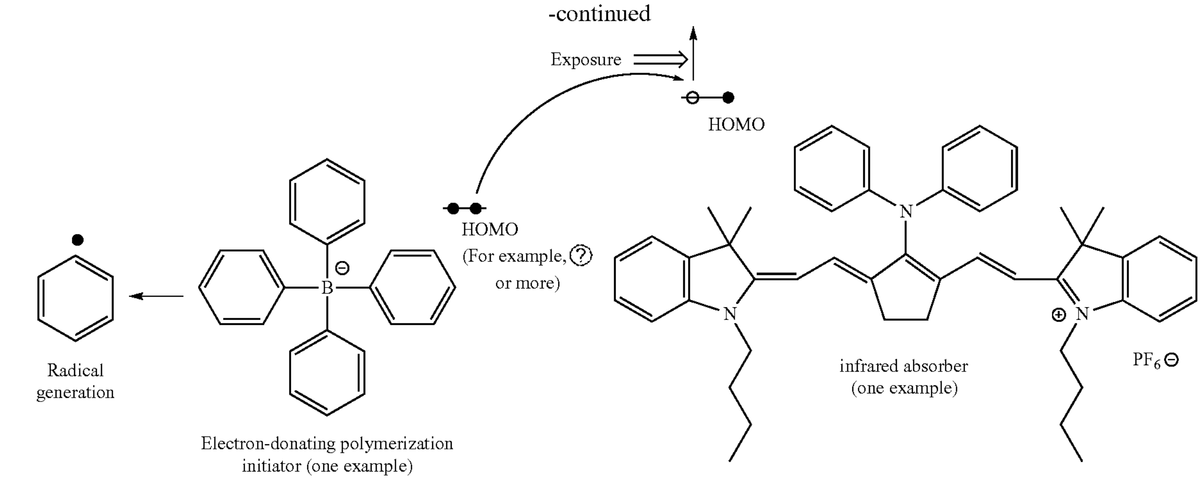

ⓘ indicates text missing or illegible when filed

From the viewpoints of UV printing durability and chemical resistance, at least one of the HOMO value of the infrared absorber—the HOMO value of the electron-donating polymerization initiator is preferably 1.0 eV or less, more preferably 0.70 eV or less, and particularly preferably 0.60 eV or less. In addition, from the same viewpoint as above, at least one of the HOMO value of the infrared absorber—the HOMO value of the electron-donating polymerization initiator is preferably equal to or more than −0.200 eV, and more preferably equal to or more than 0.100 eV. The negative sign means that the HOMO value of the electron-donating polymerization initiator is higher than at least one of the HOMO value of the infrared absorber.

In addition, from the viewpoints of UV printing durability and chemical resistance, the LUMO value of the electron-accepting polymerization initiator—at least one of the LUMO value of the infrared absorber is preferably 1.00 eV or less, and more preferably 0.700 eV or less. In addition, from the same viewpoint as above, the LUMO value of the electron-accepting polymerization initiator—at least one of the LUMO value of the infrared absorber is preferably −0.200 eV or more, and more preferably −0.100 eV or more.

Furthermore, from the same viewpoint as above, the LUMO value of the electron-accepting polymerization initiator—at least one of the LUMO value of the infrared absorber is preferably in a range of 1.00 eV to −0.200 eV and more preferably in a range of 0.700 eV to −0.100 eV. The negative sign means that at least one of the LUMO of the infrared absorber is higher than LUMO of the electron-accepting polymerization initiator.

Polymerizable Compound

It is preferable that the image-recording layer in the present disclosure contain a polymerizable compound.

In the present disclosure, a polymerizable compound refers to a compound having a polymerizable group.

The polymerizable group is not particularly limited, may be a known polymerizable group, and is preferably an ethylenically unsaturated group. In addition, the polymerizable group may be a radically polymerizable group or a cationically polymerizable group, and is preferably a radically polymerizable group.

Examples of the radically polymerizable group include a (meth)acryloyl group, an allyl group, a vinylphenyl group, a vinyl group, and the like. From the viewpoint of reactivity, a (meth)acryloyl group is preferable.

The molecular weight of the polymerizable compound (weight-average molecular weight in a case where the polymerizable compound has molecular weight distribution) is preferably 50 or more and less than 2,500.

The polymerizable compound used in the present disclosure may be, for example, a radically polymerizable compound or a cationically polymerizable compound, and is preferably an addition polymerizable compound having at least one ethylenically unsaturated bond (ethylenically unsaturated compound).

The ethylenically unsaturated compound is preferably a compound having at least one terminal ethylenically unsaturated bond, and more preferably a compound having two or more terminal ethylenically unsaturated bonds. The chemical form of the polymerizable compound is, for example, a monomer, a prepolymer which is in other words a dimer, a trimer, or an oligomer, a mixture of these, or the like.

Particularly, from the viewpoint of UV printing durability, the aforementioned polymerizable compound preferably includes a polymerizable compound having functionalities of 3 or more, more preferably includes a polymerizable compound having functionalities of 7 or more, and even more preferably includes a polymerizable compound having functionalities of 10 or more. Particularly, from the viewpoint of UV printing durability of the lithographic printing plate to be obtained, the aforementioned polymerizable compound preferably includes an ethylenically unsaturated compound having functionalities of 3 or more (preferably having functionalities of 7 or more and more preferably having functionalities of 10 or more), and more preferably includes a (meth)acrylate compound having functionalities of 3 or more (preferably having functionalities of 7 or more and more preferably having functionalities of 10 or more).

From the viewpoints of on-press developability and contamination suppressiveness, the polymerizable compound preferably includes a polymerizable compound having functionalities of 2 or less, more preferably includes a difunctional polymerizable compound, and particularly preferably includes a difunctional (meth)acrylate compound.

From the viewpoints of printing durability, on-press developability, and contamination suppressiveness, the content of the polymerizable compound having functionalities of 2 or less (preferably a difunctional polymerizable compound) with respect to the total mass of polymerizable compounds in the image-recording layer is preferably 5% by mass to 100% by mass, more preferably 10% by mass to 100% by mass, and even more preferably 15% by mass to 100% by mass.

Oligomer

As the polymerizable compound to be incorporated into in the image-recording layer, a polymerizable compound which is an oligomer (hereinafter, also simply called "oligomer") is preferable.

In the present disclosure, an oligomer represents a polymerizable compound which has a molecular weight (weight-average molecular weight in a case where the compound has molecular weight distribution) of 600 or more and 10,000 or less and at least one polymerizable group.

From the viewpoint of excellent chemical resistance and excellent UV printing durability, the molecular weight of the oligomer is preferably 1,000 or more and 5,000 or less.

In addition, from the viewpoint of improving UV printing durability, the number of polymerizable groups in one molecule of the oligomer is preferably 2 or more, more preferably 3 or more, even more preferably 6 or more, and particularly preferably 10 or more. The upper limit value of the number of the polymerizable groups in the oligomer is not particularly limited, but the number of polymerizable groups is preferably 20 or less.

From the viewpoint of UV printing durability and on-press developability, an oligomer having 7 or more polymerizable groups and a molecular weight of 1,000 or more and 10,000 or less is preferable, and an oligomer having 7 or more and 20 or less polymerizable groups and a molecular weight of 1,000 or more and 5,000 or less is more preferable.

The oligomer may contain a polymer component which is likely to be generated in the process of manufacturing the oligomer.

From the viewpoint of UV printing durability, visibility, and on-press developability, the oligomer preferably has at least one compound selected from the group consisting of a compound having a urethane bond, a compound having an ester bond, and a compound having an epoxy residue, and more preferably has a compound having a urethane bond.

In the present disclosure, an epoxy residue refers to a structure formed of an epoxy group and for example, means a structure similar to a structure obtained by the reaction between an acid group (carboxylic acid group or the like) and an epoxy group.

As the compound having a urethane bond, which is an example of the oligomer, for example, a compound having at least a group represented by Formula (Ac-1) or Formula (Ac-2) is preferable, and a compound having at least a group represented by Formula (Ac-1) is more preferable.

(Ac-1)

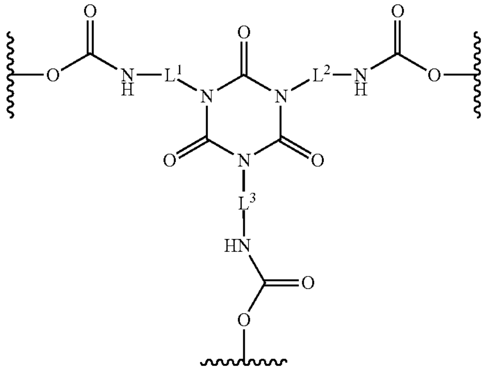

(Ac-2)

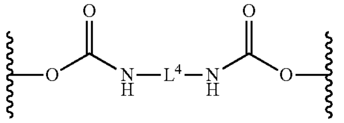

In Formula (Ac-1) and Formula (Ac-2), $L^1$ to $L^4$ each independently represent a divalent hydrocarbon group having a carbon number of 2 to 20, and the portion of the wavy line represents a bonding position with other structures.

$L^1$ to $L^4$ preferably each independently represent an alkylene group having a carbon number of 2 to 20, more preferably each independently represent an alkylene group having a carbon number of 2 to 10, and even more preferably each independently represent an alkylene group having a carbon number of 4 to 8. The alkylene group may have a branched structure or a ring structure. The alkylene group is preferably a linear alkylene group.

The portion of the wavy line in Formula (Ac-1) or Formula (Ac-2) is preferably each independently directly bonded to the portion of the wavy line in a group represented by Formula (Ae-1) or Formula (Ae-2).

(Ae-1)

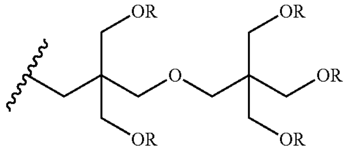

(Ae-2)

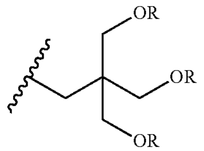

In Formula (Ae-1) and Formula (Ae-2), R each independently represent an acryloyloxy group or a methacryloyloxy group, and the portion of the wavy line represents a bonding position with portion of the wavy line in Formula (Ac-1) and Formula (Ac-2).

As the compound having a urethane bond, a compound may also be used which is prepared by obtaining polyurethane by a reaction between a polyisocyanate compound and a polyol compound and introducing a polymerizable group into the obtained polyurethane by a polymer reaction.

For example, the compound having a urethane bond may be obtained by reacting a polyol compound having an acid group with a polyisocyanate compound to obtain a polyurethane oligomer and reacting the obtained polyurethane oligomer with a compound having an epoxy group and a polymerizable group.

The number of polymerizable groups in the compound having an ester bond, which is an example of oligomer, is preferably 3 or more, and more preferably 6 or more.

As the compound having an epoxy residue, which is an example of oligomer, a compound containing a hydroxy group is preferable.

The number of polymerizable groups in the compound having an epoxy residue is preferably 2 to 6, and more preferably 2 or 3.

The compound having an epoxy residue can be obtained, for example, by reacting a compound having an epoxy group with an acrylic acid.

Specific examples of oligomers will be shown as follows, but the oligomer used in the present disclosure is not limited thereto.

As the oligomer, commercially available products may also be used. Examples thereof include UA-510H, UA-306H, UA-3061, and UA-306T (all manufactured by KYOEISHA CHEMICAL Co., Ltd.), UV-1700B, UV-6300B, and UV7620EA (all manufactured by The Nippon Synthetic Chemical Industry Co., Ltd.), U-15HA (manufactured by SHIN-NAKAMURA CHEMICAL Co., Ltd.), EBECRYL450, EBECRYL657, EBECRYL885, EBECRYL800, EBECRYL3416, and EBECRYL860 (all manufactured by DAICEL-ALLNEX LTD.), and the like. However, the oligomer is not limited to these.

From the viewpoint of improving chemical resistance and UV printing durability and further suppressing the residues of on-press development, the content of the oligomer with respect to the total mass of polymerizable compounds in the image-recording layer is preferably 30% by mass to 100% by mass, more preferably 50% by mass to 100% by mass, and even more preferably 80% by mass to 100% by mass.

Low-Molecular-Weight Polymerizable Compound

The polymerizable compound may further include a polymerizable compound other than the oligomer described above.

From the viewpoint of chemical resistance, the polymerizable compound other than the oligomer is preferably a low-molecular-weight polymerizable compound. The low-molecular-weight polymerizable compound may take a chemical form such as a monomer, a dimer, a trimer, or a mixture of these.

From the viewpoint of chemical resistance, the low-molecular-weight polymerizable compound is preferably at least one polymerizable compound selected from the group consisting of a polymerizable compound having three or more ethylenically unsaturated groups and a polymerizable compound having an isocyanuric ring structure.

In the present disclosure, a low-molecular-weight polymerizable compound refers to a polymerizable compound having a molecular weight (weight-average molecular weight in a case where the compound has molecular weight distribution) of 50 or more and less than 600.

From the viewpoint of excellent chemical resistance, excellent UV printing durability, and excellently suppressing the residues of on-press development, the molecular weight of the low-molecular-weight polymerizable compound is preferably 100 or more and less than 600, more preferably 300 or more and less than 600, and even more preferably 400 or more and less than 600.

In a case where the polymerizable compound includes a low-molecular-weight polymerizable compound as the polymerizable compound other than an oligomer (total amount in a case where the polymerizable compound includes two or more low-molecular-weight polymerizable compounds), from the viewpoint of chemical resistance and UV printing durability and suppressing the residues of on-press development, the ratio of the oligomer to the low-molecular-weight polymerizable compound (oligomer/low-molecular-weight polymerizable compound) is preferably 10/1 to 1/10, more preferably 10/1 to 3/7, and even more preferably 10/1 to 7/3, based on mass.

As the low-molecular-weight polymerizable compound, the polymerizable compounds described in paragraphs "0082" to "0086" of WO2019/013268A can also be suitably used.

The details of how to use the polymerizable compound, such as the structure of the compound, whether the compound is used alone or used in combination with other compounds, and the additive amount of the compound, can be optionally set.

Particularly, from the viewpoint of UV printing durability, the image-recording layer preferably contains two or more polymerizable compounds.

The content of the polymerizable compound (total content of polymerizable compounds in a case where the image-recording layer contains two or more polymerizable compounds) with respect to the total mass of the image-recording layer is preferably 5% by mass to 75% by mass, more preferably 10% by mass to 70% by mass, and even more preferably 15% by mass to 60% by mass.

Compound Represented by Formula (pH)

From the viewpoint of color formability, the image-recording layer may further include a compound represented by Formula (Ph).

(Ph)

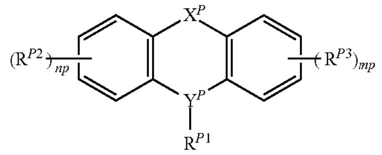

In Formula (Ph), $X^P$ represents O, S, or NH, $Y^P$ represents N or CH, $R^{P1}$ represents a hydrogen atom or an alkyl group, $R^{P2}$ and $R^{P3}$ each independently represent a halogen atom, an alkylthio group, an arylthio group, an alkoxy group, an aryloxy group, an alkyl group, an aryl group, an acylthio group, or an acyl group, and mp and np each independently represent an integer of 0 to 4.

$X^P$ is preferably S or NH and more preferably S.

$Y^P$ is preferably N.

$R^{P1}$ is preferably a hydrogen atom or a substituted or unsubstituted alkyl group having 1 to 20 carbon atoms and more preferably a hydrogen atom.

$R^{P2}$ and $R^{P3}$ each independently preferably represent a halogen atom such as a fluorine atom, a chlorine atom, a bromine atom, an iodine atom, an alkylthio group having 1 to 20 carbon atoms, a phenylthio group, an alkoxy group having 1 to 20 carbon atoms, a phenoxy group, an alkyl group having 1 to 20 carbon atoms, a phenyl group, an acetylthio group, or an acetyl group, and more preferably represent a chlorine atom, an alkylthio group having 1 or 2 carbon atoms, or an acetyl group. These groups may have one or more substituents.

mp and np are each independently preferably 0, 1, or 2. Both mp and np may be 0, or mp may be 0 and np may be 1 or 2.

Specific examples of the compound represented by Formula (Ph) are as follows.

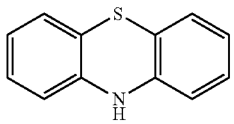

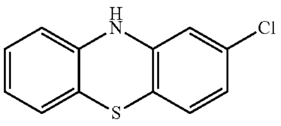

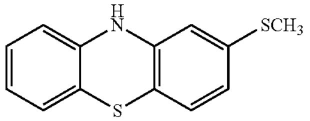

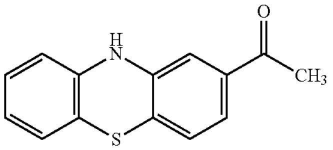

Only one compound represented by Formula (Ph) may be added to the image-recording layer, or two or more borate compounds may be used in combination.

The content of the compound represented by Formula (Ph) with respect to the total mass of the image-recording layer is preferably 0.1% by mass to 5% by mass and more preferably 0.5% by mass to 3% by mass.

Polymer Having Structural Unit Represented by Formula (I)

The image-recording layer may further include a polymer (I) having a structural unit represented by Formula (I).

Hereinafter, the polymer (I) having the structural unit represented by Formula (I) will be also simply referred to as a "polymer (I)".

(I)

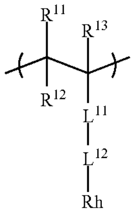

In Formula (I), $R^{11}$ and $R^{12}$ each independently represent a hydrogen atom or an alkyl group, $R^{13}$ represents a hydrogen atom or a monovalent substituent, $L^{11}$ and $L^{12}$ each independently represent a single bond or a divalent linking group, and Rh represents a substituent including two or more silicon atoms.

Examples of the alkyl group represented by $R^{11}$ and $R^{12}$ include a linear alkyl group having 1 to 18 carbon atoms, and a branched or cyclic alkyl group having 3 to 18 carbon atoms. Specific examples the alkyl group described above include a methyl group, an ethyl group, a propyl group, a butyl group, an isopropyl group, a tert-butyl group, a cyclohexyl group, and the like.

$R^{11}$ and $R^{12}$ all are preferably a hydrogen atom.

Examples of the monovalent substituent represented by $R^{13}$ include an alkyl group, an alkenyl group, and an aryl group.

Examples of the alkyl group include a linear alkyl group having 1 to 18 carbon atoms, and a branched or cyclic alkyl group having 3 to 18 carbon atoms. Specific examples the alkyl group described above include a methyl group, an ethyl group, a propyl group, a butyl group, an isopropyl group, a tert-butyl group, a cyclohexyl group, and the like.

Examples of the alkenyl group include an alkenyl group having 2 to 12 carbon atoms. Specific examples of the alkenyl group described above include a vinyl group, a 1-propenyl group, a 1-butenyl group, a 1-methyl-1-propenyl group, a 1-cyclopentenyl group, a 1-cyclohexenyl group, and the like.

Examples of the aryl group include an aryl group having 6 to 12 carbon atoms. Specific examples the aryl group described above include a phenyl group, an α-methylphenyl group, a naphthyl group, and the like.

$R^{13}$ is preferably a hydrogen atom or a methyl group.

Examples of the divalent linking group represented by $L^{11}$ include —C(=O)—O— (so-called ester bond) and —C(=O)—NH—.

The divalent linking group represented by $L^{11}$ is preferably —C(=O)—O—, which is an ester bond.

The divalent linking group represented by $L^{12}$ is not particularly limited as long as it is a group that can link $L^{11}$ and Rh. Examples of the divalent linking group represented by $L^{12}$ include an alkylene group. The alkylene group is preferably an alkylene group having 2 to 10 carbon atoms, and more preferably an alkylene group having 4 to 8 carbon atoms.

The substituent including two or more silicon atoms, which is represented by Rh, is not particularly limited as long as the atomic group constituting the substituent includes two or more silicon atoms. From the viewpoint of on-press developability, it is preferable that the substituent having two or more silicon atoms includes the silicon atom as a silicon-oxygen bond (Si—O bond). The substituent having two or more silicon atoms preferably has two or more silicon-oxygen bonds, more preferably has three or more silicon-oxygen bonds, and even more preferably has 3 to 12 silicon-oxygen bonds. The substituent including two or more silicon atoms preferably includes a silicon-oxygen bond as a polysiloxane structure.

In addition, from the viewpoint of on-press developability, the substituent containing two or more silicon atoms preferably has a branched structure, and more preferably has a branched structure branched around a silicon atom.

Specifically, Rh in Formula (I) is preferably a group having two or more structures represented by Formula (a1).

(a1)

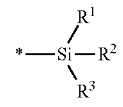

in Formula (a1), * represents a bonding position, and $R^1$, $R^2$, and $R^3$ each independently represent an alkyl group, an alkenyl group, an aryl group, or an alkylene aryl group.

Examples of the alkyl group represented by $R^1$, $R^2$, and $R^3$ include a linear alkyl group having 1 to 18 carbon atoms, and a branched or cyclic alkyl group having 3 to 18 carbon atoms. Specific examples the alkyl group described above include a methyl group, an ethyl group, a propyl group, a butyl group, an isopropyl group, a tert-butyl group, a cyclohexyl group, and the like.

Examples of the alkenyl group represented by $R^1$, $R^2$, and $R^3$ include an alkenyl group having 2 to 12 carbon atoms. Specific examples of the alkenyl group described above include a vinyl group, a 1-propenyl group, a 1-butenyl group, a 1-methyl-1-propenyl group, a 1-cyclopentenyl group, a 1-cyclohexenyl group, and the like.

Examples of the aryl group represented by $R^1$, $R^2$, and $R^3$ include an aryl group having 6 to 12 carbon atoms. Specific examples the aryl group described above include a phenyl group, an α-methylphenyl group, a naphthyl group, and the like.

Examples of the alkylene aryl group represented by $R^1$, $R^2$, and $R^3$ include an alkylene aryl group having 7 to 30 carbon atoms.

In Formula (a1), it is preferable that $R^1$, $R^2$, and $R^3$ are each independently an alkyl group, it is more preferable that $R^1$, $R^2$, and $R^3$ all are the same alkyl group, it is even more preferable that $R^1$, $R^2$, and $R^3$ all are an alkyl group having 1 to 4 carbon atoms, and it is particularly preferable that $R^1$, $R^2$, and $R^3$ all are a methyl group.

The substituent including two or more silicon atoms is preferably a group including three or more structures represented by Formula (a1), and more preferably a group including 3 to 6 structures represented by Formula (a1).

The substituent including two or more silicon atoms is preferably a group represented by Formula (a2).

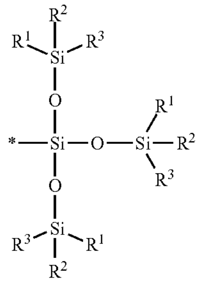
(a2)

in Formula (a2), * represents a bonding position, and $R^1$, $R^2$, and $R^3$ each independently represent an alkyl group, an alkenyl group, an aryl group, or an alkylene aryl group.

$R^1$, $R^2$, and $R^3$ in Formula (a2) have the same meanings as $R^1$, $R^2$, and $R^3$ in Formula (a1), and preferred aspects thereof are also the same.

The structural unit represented by Formula (I) is preferably a structural unit represented by Formula (a3).

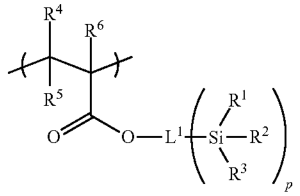
(a3)

In Formula (a3), $R^1$, $R^2$, and $R^3$ each independently represent an alkyl group, an alkenyl group, an aryl group, or an alkylene aryl group, $R^4$ and $R^5$ each independently represent a hydrogen atom or an alkyl group, $R^6$ represents a hydrogen atom or a monovalent substituent, $L^1$ represents a p+1-valent linking group, and p represents an integer of 2 to 12.

$R^1$, $R^2$, and $R^3$ in Formula (a3) have the same meanings as $R^1$, $R^2$, and $R^3$ in Formula (a1), and preferred aspects thereof are also the same.

Examples of the alkyl group represented by $R^4$ and $R^5$ include a linear alkyl group having 1 to 18 carbon atoms, and a branched or cyclic alkyl group having 3 to 18 carbon atoms. Specific examples the alkyl group described above include a methyl group, an ethyl group, a propyl group, a butyl group, an isopropyl group, a tert-butyl group, a cyclohexyl group, and the like.

$R^4$ and $R^5$ are preferably a hydrogen atom.

Examples of the monovalent substituent represented by $R^6$ include an alkyl group, an alkenyl group, and an aryl group. The alkyl group, the alkenyl group, and the aryl group are the same as the alkyl group, the alkenyl group, and the aryl group represented by $R^1$, $R^2$, and $R^3$, respectively, and preferred aspects thereof are also the same.

$R^6$ is preferably a hydrogen atom or a methyl group.

Examples of the p+1-valent linking group represented by $L^1$ include a p+1-valent hydrocarbon group having 1 to 10 carbon atoms. As the p+1-valent linking group, a hydrocarbon group in which a part of carbon atoms constituting the hydrocarbon group are substituted with heteroatoms is also suitably used. As the hydrocarbon group, a saturated hydrocarbon group is preferable. Here, examples of the heteroatom substituting a part of the carbon atom include a silicon atom, an oxygen atom, and a nitrogen atom, and among these, a silicon atom or an oxygen atom is preferable.

The p+1-valent linking group represented by $L^1$ is preferably a branched saturated hydrocarbon group, and is also preferably a branched saturated hydrocarbon group in which a part of carbon atoms constituting the branched saturated hydrocarbon group are substituted with a heteroatom (preferably, a silicon atom and an oxygen atom).

p is an integer of 2 to 12, and is preferably an integer of 3 to 12.

Specific examples of the monomer unit for forming the structural unit represented by Formula (I) include monomers represented by the following K-1 to K-12. Specific examples of the monomer unit forming the structural unit represented by Formula (I) are not limited thereto.

In the following structures, n is an integer of 2 to 1,000.

K-1

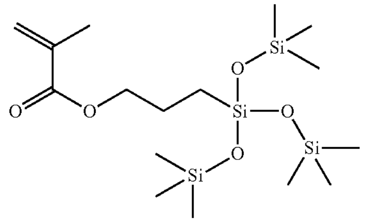

K-2

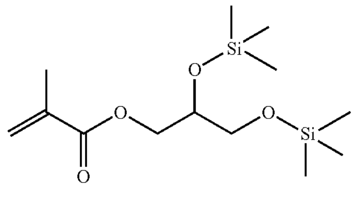

-continued

K-3

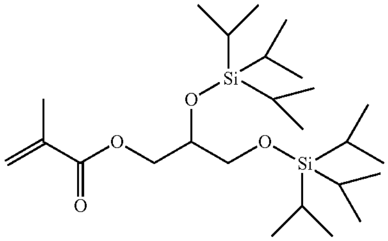

K-4

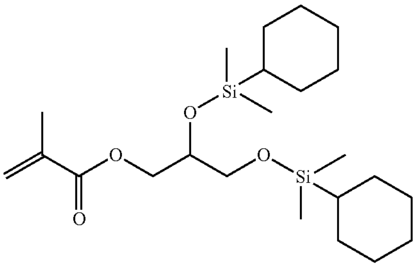

K-5

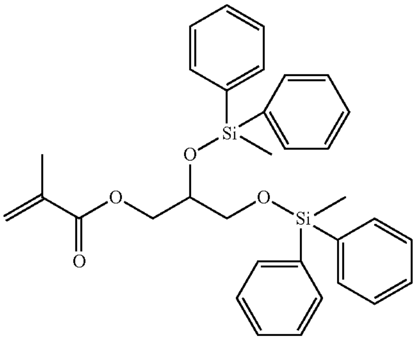

K-6

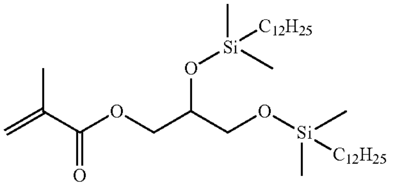

K-7

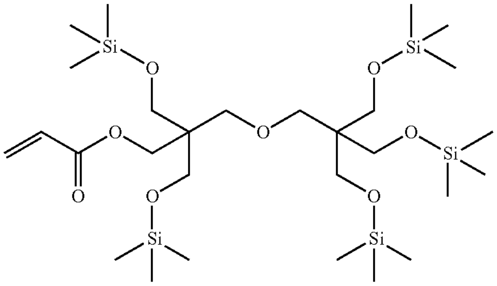

K-8

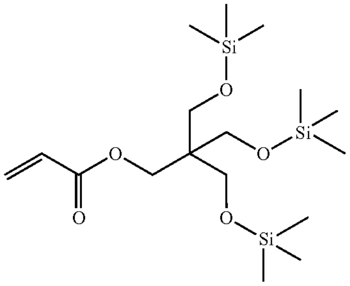

-continued

K-9

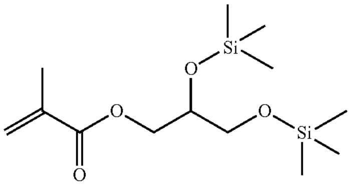

K-10

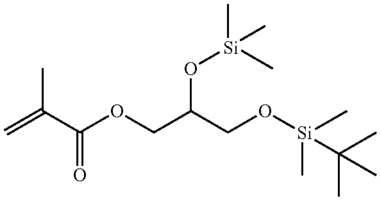

K-11

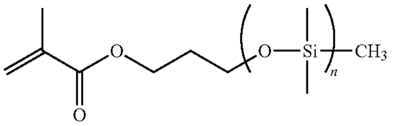

K-12

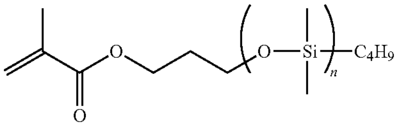

It is preferable that the polymer (I) further has a structural unit having a hydrophilic group in the side chain. The structural unit having a hydrophilic group in the side chain is preferably a structural unit having a polyalkyleneoxy group in the side chain. That is, the polymer (I) is preferably a copolymer further having a structural unit having a polyalkyleneoxy group in the side chain.

The structural unit having a hydrophilic group in the side chain in the polymer (I) is preferably a structural unit represented by Formula (a4).

(a4)

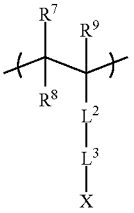

In Formula (a4), $R^7$ and $R^8$ each independently represent a hydrogen atom or an alkyl group, $R^9$ represents a hydrogen atom or a monovalent substituent, $L^2$ represents —C(═O)—O— or —C(═O)—NH—, $L^3$ represents a single bond or a divalent linking group, and X represents a hydrophilic group.

The alkyl group represented by $R^7$ and $R^8$ is the same as the alkyl group represented by $R^4$ and $R^5$ in Formula (a3), and preferred aspects thereof are also the same.

The monovalent substituent represented by $R^9$ is the same as the monovalent substituent represented by $R^6$ in Formula (a3), and a preferred aspect thereof is also the same.

The divalent linking group represented by $L^3$ is not particularly limited as long as it is a group that can link $L^2$ and X. Examples of the divalent linking group represented by $L^3$ include an alkylene group. The alkylene group is preferably an alkylene group having 2 to 10 carbon atoms, and more preferably an alkylene group having 4 to 8 carbon atoms.

Examples of the hydrophilic group represented by X include a hydroxyl group, a phosphoric acid group, a polyalkyleneoxy group, and a group obtained by combining two or more of these groups. Here, examples of the polyalkyleneoxy group include a polyethyleneoxy group, a polypropyleneoxy group, a polybutyleneoxy group, and a group obtained by combining these groups.

Specific examples of the monomer unit for forming the structural unit having a hydrophilic group in the side chain include a monomer (monomer) represented by H-1 to H-25. Specific examples of the monomer unit that forms the structural unit having a hydrophilic group in the side chain are not limited thereto.

In the following structures, n and m are each independently an integer of 2 to 100.

In the following structures, the description of "random" means that a plurality of polyalkyleneoxy groups are randomly arranged.

H-1

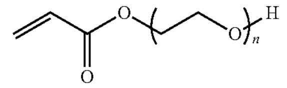

H-2

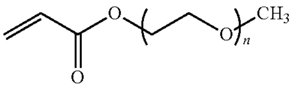

H-3

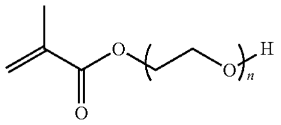

H-4

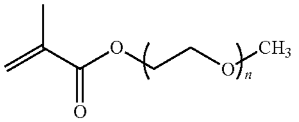

H-5

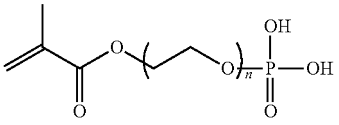

H-6

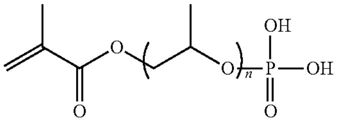

H-7

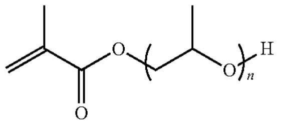

H-8

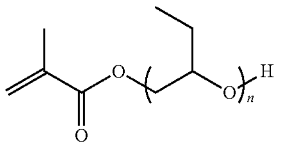

-continued

H-9

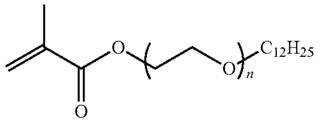

H-10

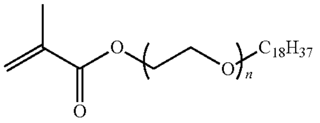

H-11

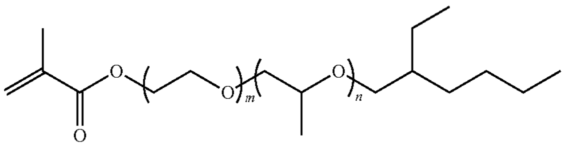

H-12

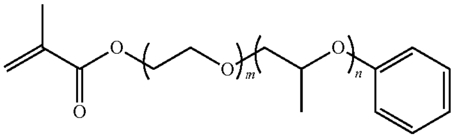

H-13

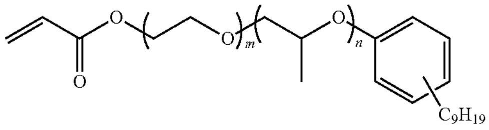

H-14

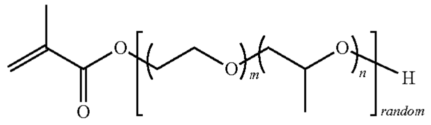

H-15

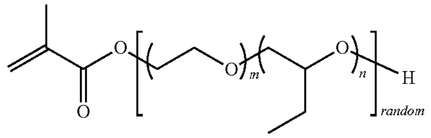

H-16

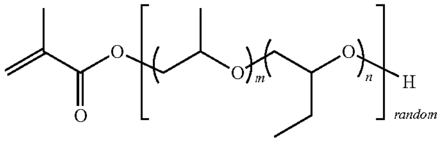

H-17

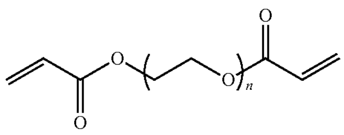

H-18

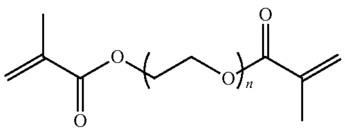

H-19

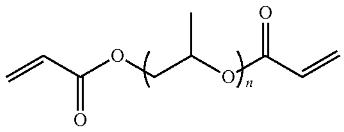

-continued

H-20

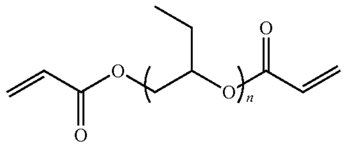

H-21

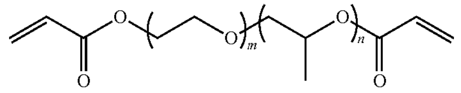

H-22

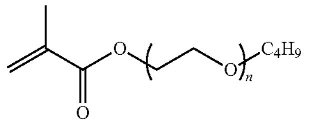

H-23

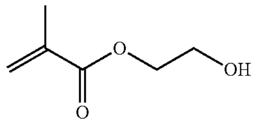

H-24

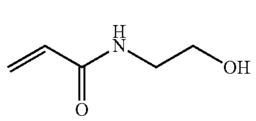

H-25

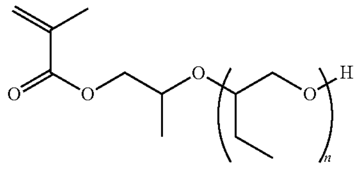

The polymer (I) may contain only one structural unit (b1) represented by Formula (I), or two or more thereof.

In the polymer (I), the content of the structural unit (b1) represented by Formula (I) may be 100% by mass with respect to the mass of the polymer (I), and is preferably 15% by mass to 70% by mass, more preferably 20% by mass to 60% by mass, and even more preferably 25% by mass to 50% by mass with respect to the mass of the polymer (I).

In addition, the polymer (I) may contain only one structural unit (b2) having a hydrophilic group in the side chain, or two or more thereof.

In the polymer (I), the content of the structural unit (b2) having a hydrophilic group with respect to the total mass of the polymer (I) is preferably 30% by mass to 85% by mass, more preferably 40% by mass to 80% by mass, and even more preferably 50% by mass to 75% by mass.

The polymer (I) may further include other structural units. Examples of the other structural unit include a structural unit having a carboxylic acid group in the side chain. Examples of the structural unit having a carboxylic acid group in the side chain include (meth)acrylic acid, itaconic acid, an itaconic acid derivative, and the like. It is preferable that the structural unit having a carboxylic acid group in the side chain is included as a structural unit different from the above-mentioned structural unit having a hydrophilic group in the side chain.

Examples of the other structural units include alkyl (meth) acrylate (the number of carbon atoms in the alkyl group is 1 to 24), a styrene derivative, maleic acid anhydride, maleimide anhydride, (meth)acrylonitrile, a vinyl ether derivative, an alkyl (meth)acrylamide derivative, and the like.

In the polymer (I), the content of the other structural units is preferably 0% by mass to 20% by mass with respect to the mass of the polymer (I).

From the viewpoint of obtaining an image-recording layer having excellent surface state, the weight-average molecular weight of the polymer (I) is preferably 5,000 to 100,000 and more preferably 8,000 to 60,000.

Specific examples of the polymer (I) include the following P-1 to P-11. Specific examples of the polymer (I) are not limited thereto.

P-1

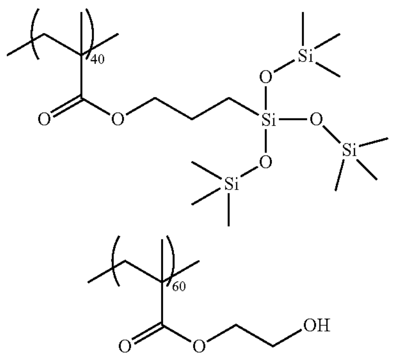

P-2

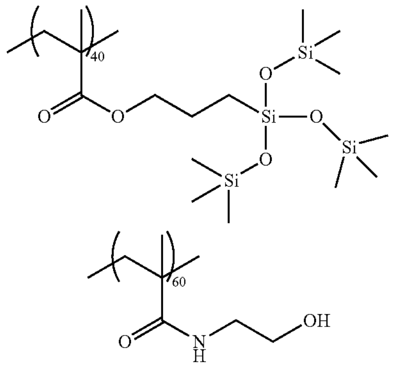

P-3

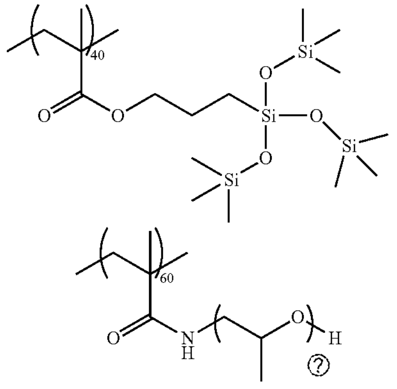

P-4

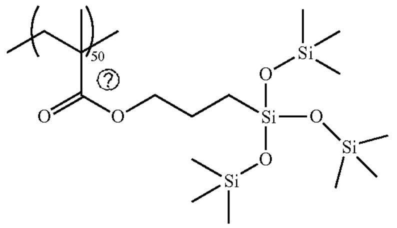

-continued

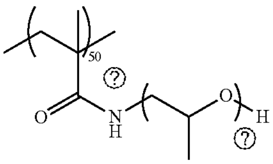

P-5

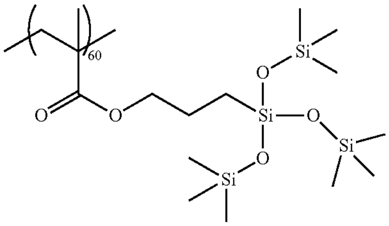

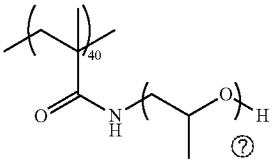

P-6

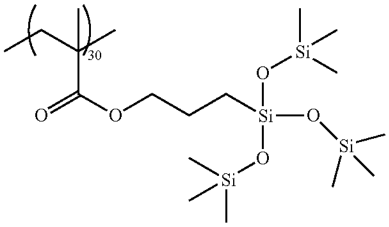

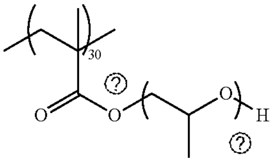

P-7

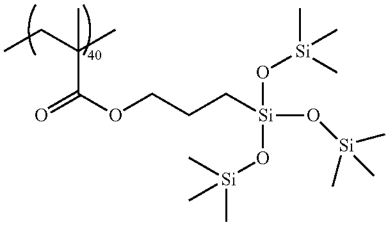

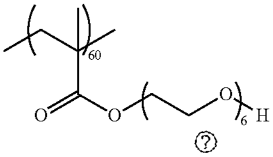

P-8

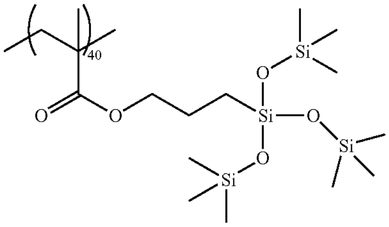

-continued

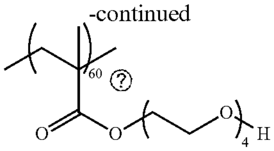

P-9

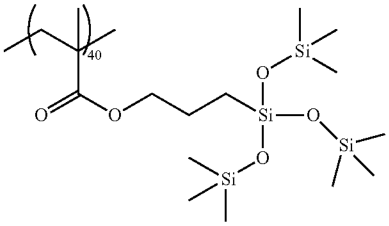

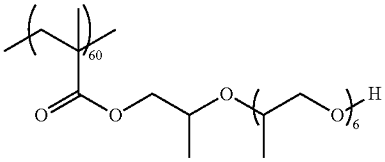

P-10

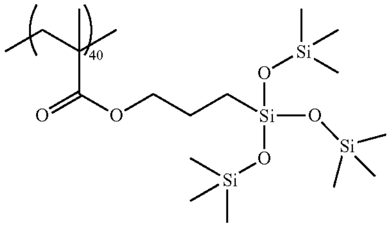

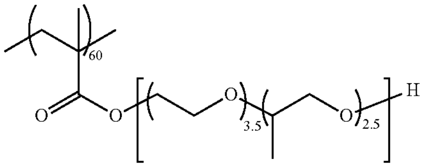

P-11

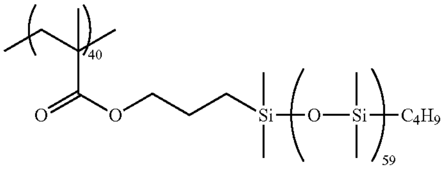

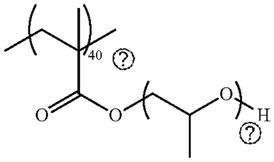

(?) indicates text missing or illegible when filed

The content of the polymer (I) with respect to the total mass of the coating liquid for the image-recording layer is preferably 0.001% by mass to 0.1% by mass and more preferably 0.002% by mass to 0.01% by mass.

Oil Agent

The image-recording layer may further contain an oil agent.

In the present disclosure, an oil agent refers to a hydrophobic compound that is in a liquid state at 80° C. and is not mixed with water and separates in a case where the compound is mixed with water of the same mass.

In a case where two or more oil agents are used, the oil agents may include a compound having a melting point of 80° C. or higher as long as the two or more oil agents are in a liquid state at 80° C. in a mixed state.

In addition, from the viewpoint of on-press developability and dampening water turbidity suppressiveness, the oil agent is preferably a compound having a molecular weight less than 1,000, more preferably a compound having a molecular weight of 200 to 800, and particularly preferably a compound having a molecular weight of 300 to 500.

Furthermore, from the viewpoint of on-press developability and dampening water turbidity suppressiveness, the oil agent is preferably a compound having a boiling point of 200° C. or higher at 1 atm, more preferably a compound having a boiling point of 250° C. or higher at 1 atm, even more preferably a compound having a boiling point of 300° C. or higher at 1 atm, and particularly preferably a compound having a boiling point of 400° C. or higher and 500° C. or lower at 1 atm.

In the present disclosure, unless otherwise specified, "boiling point" means a boiling point at 1 atm.

In addition, from the viewpoint of on-press developability and dampening water turbidity suppressiveness, the melting point of the oil agent at 1 atm is preferably 50° C. or lower, more preferably 30° C. or lower, and particularly preferably −200° C. or higher and 25° C. or lower.

In the present disclosure, unless otherwise specified, "melting point" means a melting point at 1 atm.

Examples of the oil agent include a phosphoric acid ester compound, an aromatic hydrocarbon compound, a glyceride compound, a fatty acid compound, an aromatic ester compound, and the like.

Among the above, from the viewpoints of UV printing durability, receptivity, on-press developability, and dampening water turbidity suppressiveness, at least one compound selected from the group consisting of a phosphoric acid ester compound, an aromatic hydrocarbon compound, a glyceride compound, and an aromatic ester compound is preferable, at least one compound selected from the group consisting of a phosphoric acid ester compound, an aromatic hydrocarbon compound, and a glyceride compound is more preferable, at least one compound selected from the group consisting of a phosphoric acid ester compound and an aromatic hydrocarbon compound is even more preferable, and a phosphoric acid ester compound is particularly preferable.

As the phosphoric acid ester compound, from the viewpoints of UV printing durability, receptivity, on-press developability, and dampening water turbidity suppressiveness, a phosphoric acid triester compound is preferable, a phosphoric acid triaryl ester compound is more preferable, tricresyl phosphate is even more preferable, and a mixture of two or more isomers among ortho, meta, and para isomers of tricresyl phosphate is particularly preferable.

As the aromatic hydrocarbon compound, from the viewpoint of on-press developability and dampening water turbidity suppressiveness, a compound having two or more aromatic rings is preferable, and a compound having two or more unfused benzene rings is more preferable.

As the glyceride compound, from the viewpoint of on-press developability and dampening water turbidity suppressiveness, a triglyceride compound is preferable, a fatty oil is more preferable, and a fatty oil which is a liquid at 25° C., such as castor oil, is particularly preferable.

As the fatty acid compound, from the viewpoint of on-press developability and dampening water turbidity suppressiveness, an unsaturated fatty acid is preferable, an unsaturated fatty acid having a carbon number of 8 to 30 is more preferable, and an unsaturated fatty acid having a carbon number of 12 to 24 is particularly preferable.

As the aromatic ester compound, from the viewpoint of on-press developability and dampening water turbidity suppressiveness, an aromatic diester compound is preferable, and an aromatic diester compound having an aliphatic ring is more preferable.

As the aliphatic ester compound, from the viewpoint of on-press developability and dampening water turbidity suppressiveness, an aliphatic ester compound having a branched alkyl group is preferable, and an aliphatic ester compound having a branched alkyl group and a carbon number of 10 to 24 is more preferable.

From the viewpoints of UV printing durability, receptivity, on-press developability, and dampening water turbidity suppressiveness, the oil agent preferably includes an oil agent having a phosphorus atom, and is more preferably an oil agent having a phosphorus atom.

In addition, from the viewpoint of on-press developability and dampening water turbidity suppressiveness, the oil agent preferably includes an oil agent having an aromatic ring, more preferably includes an oil agent having two or more aromatic rings, and particularly preferably includes an oil agent having two or more unfused benzene rings.

From the viewpoints of UV printing durability, receptivity, on-press developability, and dampening water turbidity suppressiveness, a C log P value of the oil agent is preferably 5.0 or more, more preferably 5.50 or more, even more preferably 5.50 or more and 10.0 or less, and particularly preferably 5.60 or more and 7.00 or less.

The C log P value is a value obtained by calculating the common logarithm log P of the 1-octanol/water partition coefficient P. For calculating the C log P value, known methods and software can be used. In the present disclosure, unless otherwise specified, the C log P program incorporated into ChemBioDraw Ultra 12.0 from CambridgeSoft is used.

Specific examples of the oil agent include tricresyl phosphate, dimethyl(1-phenylethyl) benzene, 2,4-diphenyl-4-methyl-1-pentene, dicyclohexylphthalate, castor oil, α-linolenic acid, tri(2-ethylhexyl) phosphate, and the like.

One oil agent may be used alone, or two or more oil agents may be used in combination. From the viewpoint of on-press developability and dampening water turbidity suppressiveness, it is preferable that the image-recording layer contain two or more oil agents having different structures.

The content of the oil agent with respect to the total mass of the image-recording layer is preferably 0.0001% by mass to 10.0% by mass, more preferably 0.0002% by mass to 1.0% by mass, even more preferably 0.0005% by mass to 0.5% by mass, and particularly preferably 0.001% by mass to 0.05% by mass.

Particles

The image-recording layer preferably contains particles.

The particles may be organic particles or inorganic particles. From the viewpoint of UV printing durability, the image-recording layer preferably contains organic particles, and more preferably contains polymer particles.

As inorganic particles, known inorganic particles can be used, and metal oxide particles such as silica particles and titania particles can be suitably used.

The polymer particles are preferably selected from the group consisting of thermoplastic resin particles, thermal reactive resin particles, polymer particles having a polymerizable group, microcapsules encapsulating a hydrophobic compound, and a microgel (crosslinked polymer particles). Among these, polymer particles having a polymerizable group or a microgel are preferable. In a particularly preferable embodiment, the polymer particles have at least one ethylenically unsaturated polymerizable group. The presence of such polymer particles brings about effects of improving the printing durability of an exposed portion and improving the on-press developability of a non-exposed portion.

From the viewpoint of UV printing durability and on-press developability, the polymer particles are preferably thermoplastic resin particles.

The thermoplastic resin particles are preferably the thermoplastic polymer particles described in Research Disclosure No. 33303 published in January 1992, JP1997-123387A (JP-H09-123387A), JP1997-131850A (JP-H09-131850A), JP1997-171249A (JP-H09-171249A), JP1997-171250A (JP-H09-171250A), EP931647B, and the like.

Specific examples of polymers constituting the thermoplastic resin particles include homopolymers or copolymers of monomers of ethylene, styrene, vinyl chloride, methyl acrylate, ethyl acrylate, methyl methacrylate, ethyl methacrylate, vinylidene chloride, acrylonitrile, vinylcarbazole, acrylate or methacrylate having a polyalkylene structure, and the like and mixtures of these. Preferred examples thereof can include polystyrene, copolymers having styrene and acrylonitrile, or polymethyl methacrylate. The average particle diameter of the thermoplastic resin particle is preferably 0.01 μm to 3.0 μm.

Examples of the thermal reactive resin particles include polymer particles having a thermal reactive group. The thermal reactive polymer particles form a hydrophobilized region through crosslinking by a thermal reaction and the accompanying change in functional groups.

The thermal reactive Iroup in the polymer particles having a thermal reactive group may be a functional group that causes any reaction as long as chemical bonds are formed, and is preferably a polymerizable group. Preferred examples thereof include an ethylenically unsaturated group that causes a radical polymerization reaction (for example, an acryloyl group, a methacryloyl group, a vinyl group, an allyl group, and the like), a cationically polymerizable group (for example, a vinyl group, a vinyloxy group, an epoxy group, an oxetanyl group, and the like), an isocyanato group or a blocked isocyanato group that causes an addition reaction, an epoxy group, a vinyloxy group, an active hydrogen atom-containing functional group that is a reaction partner thereof (for example, an amino group, a hydroxy group, a carboxy group, and the like), a carboxy group that causes a condensation reaction, a hydroxy group or an amino group that is a reaction partner of the carboxy group, an acid anhydride that causes a ring-opening addition reaction, an amino group or a hydroxy group which is a reaction partner of the acid anhydride, and the like.

Examples of the microcapsules include microcapsules encapsulating at least some of the constituent components of the image-recording layer as described in JP2001-277740A and JP2001-277742A. The constituent components of the image-recording layer can also be contained in the exterior of the microcapsules. In a preferred aspect, the image-recording layer containing microcapsules is constituted such that hydrophobic constituent components are encapsulated in the microcapsules and hydrophilic constituent components are contained in the exterior of the microcapsules.

The microgel (crosslinked polymer particles) can contain some of the constituent components of the image-recording layer, in at least one of the surface or the interior of the microgel. From the viewpoints of sensitivity of the lithographic printing plate precursor to be obtained and printing durability of the lithographic printing plate to be obtained, a reactive microgel having a radically polymerizable group on the surface thereof is particularly preferable.

In order to encapsulate the constituent components of the image-recording layer in microcapsules or microgel, known methods can be used.

From the viewpoints of printing durability, antifouling property, and storage stability of the lithographic printing plate to be obtained, the polymer particles are preferably polymer particles which are obtained by a reaction of a polyvalent isocyanate compound that is an adduct of a polyhydric phenol compound having two or more hydroxy groups in a molecule and isophorone diisocyanate with a compound having active hydrogen.

The polyhydric phenol compound is preferably a compound having a plurality of benzene rings having a phenolic hydroxy group.

The compound having active hydrogen is preferably a polyol compound or a polyamine compound, more preferably a polyol compound, and even more preferably at least one compound selected from the group consisting of propylene glycol, glycerin, and trimethylolpropane.

Preferred examples of the resin particles obtained by the reaction of a polyvalent isocyanate compound that is an adduct of a polyhydric phenol compound having two or more hydroxy groups in a molecule and isophorone diisocyanate, with a compound having active hydrogen include the polymer particles described in paragraphs "0032" to "0095" of JP2012-206495A.

Furthermore, from the viewpoint of printing durability and solvent resistance of the lithographic printing plate to be obtained, the polymer particles preferably have a hydrophobic main chain and include both i) structural unit having a pendant cyano group directly bonded to the hydrophobic main chain and ii) structural unit having a pendant group including a hydrophilic polyalkylene oxide segment.

Preferred examples of the hydrophobic main chain include an acrylic resin chain.

Preferred examples of the pendant cyano group include $-[CH_2CH(C{\equiv}N-]-$ or $-[CH_2C(CH_3)(C{\equiv}N)]-$.

In addition, the structural unit having the pendant cyano group can be easily derived from an ethylenically unsaturated monomer, for example, acrylonitrile or methacrylonitrile, or a combination of these.

Furthermore, as an alkylene oxide in the hydrophilic polyalkylene oxide segment, ethylene oxide or a propylene oxide is preferable, and ethylene oxide is more preferable.

The number of repeating alkylene oxide structures in the hydrophilic polyalkylene oxide segment is preferably 10 to 100, more preferably 25 to 75, and even more preferably 40 to 50.

As the resin particles having a hydrophobic main chain and including both i) structural unit having the pendant cyano group directly bonded to the hydrophobic main chain and ii) structural unit having a pendant group including the hydrophilic polyalkylene oxide segment, for example, the particles described in paragraphs "0039" to "0068" of JP2008-503365A are preferable.

From the viewpoint of UV printing durability and on-press developability, the polymer particles preferably have a hydrophilic group.

The hydrophilic group is not particularly limited as long as it has a hydrophilic structure, and examples thereof include an acid group such as a carboxy group, a hydroxy group, an amino group, a cyano group, a polyalkylene oxide structure, and the like.

Among these, from the viewpoint of on-press developability and UV printing durability, a polyalkylene oxide structure is preferable, and a polyethylene oxide structure, a polypropylene oxide structure, or a polyethylene/propylene oxide structure is more preferable.

In addition, from the viewpoints of on-press developability and suppressing the residues of development during on-press development, the polyalkylene oxide structure preferably has a polypropylene oxide structure, and more preferably has a polyethylene oxide structure and a polypropylene oxide structure.

From the viewpoints of printing durability, receptivity, and on-press developability, the hydrophilic group preferably has a structural unit having a cyano group, or a group represented by Formula Z, more preferably has a structural unit represented by Formula (AN) or a group represented by Formula Z, and particularly preferably has a group represented by Formula Z.

*-Q-W—Y Formula Z

In Formula Z, Q represents a divalent linking group, W represents a divalent group having a hydrophilic structure or a divalent group having a hydrophobic structure, and Y represents a monovalent group having a hydrophilic structure or a monovalent group having a hydrophobic structure, either W or Y has a hydrophilic structure, and * represents a bonding site with another structure.

(AN)

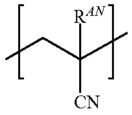

In Formula (AN), $R^{AN}$ represents a hydrogen atom or a methyl group.

From the viewpoint of UV printing durability, the polymer contained in the aforementioned polymer particles preferably has a structural unit formed of a cyano group-containing compound.

Generally, it is preferable that a cyano group is introduced as a structural unit having a cyano group into a resin by using a compound (monomer) having a cyano group. Examples of the compound having a cyano group include acrylonitrile compounds and suitable examples thereof include (meth) acrylonitrile.

The structural unit having a cyano group is preferably a structural unit formed of an acrylonitrile compound, and more preferably a structural unit formed of (meth)acrylonitrile, that is, a structural unit represented by Formula (AN).

In a case where the aforementioned polymer includes a polymer having a cyano group-containing structural unit, from the viewpoint of UV printing durability, the content of the cyano group-containing structural unit which is preferably a structural unit represented by Formula (AN) in the polymer having the cyano group-containing structural unit with respect to the total mass of the polymer having the cyano group-containing structural unit is preferably 5% by mass to 90% by mass, more preferably 20% by mass to 80% by mass, and particularly preferably 30% by mass to 60% by mass.

In addition, from the viewpoints of printing durability, receptivity, and on-press developability, the polymer particles preferably include polymer particles having a group represented by Formula Z.

Q in Formula Z is preferably a divalent linking group having 1 to 20 carbon atoms, and more preferably a divalent linking group having 1 to 10 carbon atoms.

In addition, Q in Formula Z is preferably an alkylene group, an arylene group, an ester bond, an amide bond, or a group formed by combining two or more of these, and more preferably a phenylene group, an ester bond, or an amide bond.

The divalent group having a hydrophilic structure represented by W in Formula Z is preferably a polyalkyleneoxy group or a group in which $—CH_2CH_2NR^W—$ is bonded to one terminal of a polyalkyleneoxy group. $R^W$ represents a hydrogen atom or an alkyl group.

The divalent group having a hydrophobic structure represented by W in Formula Z is preferably $—R^{WA}—$, $—O—R^{WA}—O—$, $—R^{WN}—R^{WA}—NR^W—$, $—OC(=O)—R^{WA}—O—$, or $—OC(=O)—R^{WA}—O—$. $R^{WA}$'s each independently represent a linear, branched, or cyclic alkylene group having a carbon number of 6 to 120, a haloalkylene group having a carbon number of 6 to 120, an arylene group having a carbon number of 6 to 120, an alkarylene group having a carbon number of 6 to 120 (divalent group formed by removing one hydrogen atom from an alkylaryl group), or an aralkylene group having a carbon number of 6 to 120.

The monovalent group having a hydrophilic structure represented by Y in Formula Z is preferably —OH, —C(=O)OH, a polyalkyleneoxy group having a hydrogen atom or an alkyl group on a terminal, or a group in which $—CH_2CH_2N(R^W)—$ is bonded to one terminal of a polyalkyleneoxy group having a hydrogen atom or an alkyl group on the other terminal.

The monovalent group having a hydrophobic structure represented by Y in Formula Z is preferably a linear, branched, or cyclic alkyl group having 6 to 120 carbon atoms, a haloalkyl group having 6 to 120 carbon atoms, an aryl group having 6 to 120 carbon atoms, an alkaryl group (alkylaryl group) having 7 to 120 carbon atoms, an aralkyl group having 7 to 120 carbon atoms, $—OR^{WB}$, $—C(=O)OR^{WB}$, or $—OC(=O)R^{WB}$. $R^{WB}$ represents an alkyl group having 6 to 20 carbon atoms.

From the viewpoints of printing durability, receptivity, and on-press developability, in the polymer particles having a group represented by formula Z, W is preferably a divalent group having a hydrophilic structure, and it is more preferable that Q is a phenylene group, an ester bond, or an amide bond, W is a polyalkyleneoxy group, and Y is a polyalkyleneoxy group having a hydrogen atom or an alkyl group on a terminal.

From the viewpoints of printing durability and on-press developability, the polymer particles preferably include polymer particles having a polymerizable group, and more preferably include polymer particles having a polymerizable group on the particle surface.

Furthermore, from the viewpoint of printing durability, the polymer particles preferably include polymer particles having a hydrophilic group and a polymerizable group.

The polymerizable group may be a cationically polymerizable group or a radically polymerizable group and, from the viewpoint of reactivity, is preferably a radically polymerizable group.

The polymerizable group is not particularly limited as long as it is a polymerizable group, but from the viewpoint of reactivity, is preferably an ethylenically unsaturated group, more preferably a vinylphenyl group (styryl group), a (meth)acryloxy group, or a (meth)acrylamide group, and particularly preferably a (meth)acryloxy group.

In addition, the polymer in the polymer particles having a polymerizable group preferably has a structural unit having a polymerizable group.

The polymerizable group may be introduced into the surface of the polymer particles by a polymer reaction.

From the viewpoint of UV printing durability and on-press developability, the image-recording layer preferably contains, as the aforementioned polymer particles, addition polymerization-type resin particles having a dispersible group which more preferably includes a group represented by Formula Z.

Furthermore, from the viewpoint of printing durability, receptivity, on-press developability, and suppression of the occurrence of development residues during on-press development, the polymer particles preferably contain a resin having a urea bond, more preferably contain a resin having a structure obtained by reacting at least an isocyanate compound represented by Formula (Iso) with water, and particularly preferably contain a resin that has a structure obtained by reacting at least an isocyanate compound represented by Formula (Iso) with water and has a polyethylene oxide structure and a polypropylene oxide structure as polyoxyalkylene structures. Furthermore, the particles containing the resin having a urea bond are preferably a microgel.

(Iso)

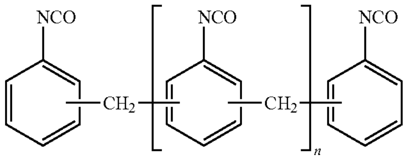

In Formula (Iso), n represents an integer of 0 to 10.

An example of the reaction between the isocyanate compound represented by Formula (Iso) and water is the reaction shown below. In the following example, a 4,4-isomer in which n=0 is used.

As shown below, in a case where the isocyanate compound represented by Formula (Iso) is reacted with water, the isocyanate group is partially hydrolyzed by water and generates an amino group. The generated amino group reacts with the isocyanate group and generates a urea bond, and a dimer is consequently formed. Furthermore, the following reaction is repeated to form a resin having a urea bond.

In the following reaction, by adding a compound (compound having active hydrogen) such as an alcohol compound or an amine compound reactive with an isocyanate group, it is possible to introduce the structure of an alcohol compound, an amine compound, or the like to the resin having a urea bond.

As the compound having active hydrogen, for example, the compounds described above regarding the microgel are preferable.

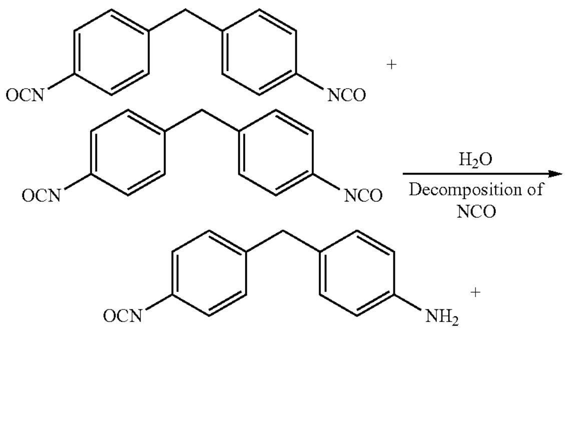

-continued

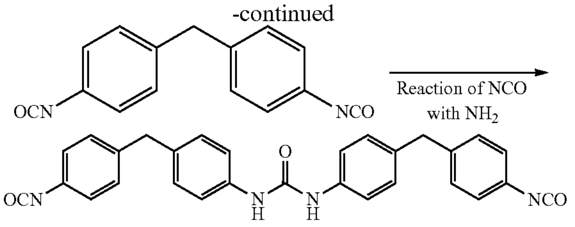

The resin having a urea bond preferably has an ethylenically unsaturated group, and more preferably has a group represented by Formula (PETA).

(PETA)

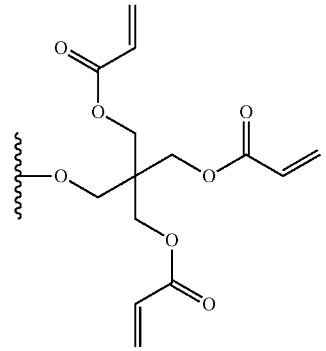

In Formula (PETA), the portion of the wavy line represents a binding position with other structures.

From the viewpoint of UV printing durability and on-press developability, the image-recording layer preferably contains thermoplastic resin particles.

The thermoplastic resin contained in the thermoplastic resin particles is not particularly limited, and examples thereof include polyethylene, polystyrene, polyvinyl chloride, polyvinylidene chloride, polymethyl (meth)acrylate, polyethyl (meth)acrylate, polybutyl (meth)acrylate, polyacrylonitrile, polyvinyl acetate, copolymers of these, and the like. The thermoplastic resin may be in the state of latex.

The thermoplastic resin according to the present disclosure is preferably a thermoplastic resin which melts or softens by heat generated in an exposure step that will be described later and thus forms a part or the entirety of a hydrophobic film forming the recording layer.

From the viewpoints of ink receptivity and UV printing durability, the thermoplastic resin preferably includes a resin A having a structural unit formed of an aromatic vinyl compound and a cyano group-containing structural unit.

The resin A contained in the thermoplastic resin preferably has a structural unit formed of an aromatic vinyl compound.

The aromatic vinyl compound may have a structure composed of an aromatic ring and a vinyl group bonded thereto. Examples of the compound include a styrene compound, a vinylnaphthalene compound, and the like. Among these, a styrene compound is preferable, and styrene is more preferable.

Examples of the styrene compound include styrene, p-methylstyrene, p-methoxystyrene, β-methylstyrene, p-methyl-β-methylstyrene, α-methylstyrene, p-methoxy-β-methylstyrene, and the like. Among these, for example, styrene is preferable.

Examples of the vinylnaphthalene compound include 1-vinylnaphthalene, methyl-1-vinylnaphthalene, β-methyl-1-vinylnaphthalene, 4-methyl-1-vinylnaphthalene, 4-methoxy-1-vinylnaphthalene, and the like. Among these, for example, 1-vinylnaphthalene is preferable.

In addition, preferred examples of the structural unit formed of an aromatic vinyl compound include a structural unit represented by Formula A1.

Formula A1

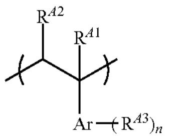

In Formula A1, $R^{A1}$ and $R^{A2}$ each independently represent a hydrogen atom or an alkyl group, Ar represents an aromatic ring group, $R^{A3}$ represents a substituent, and n represents an integer of 0 or greater and equal to or less than the maximum number of substituents of Ar.

In Formula A1, $R^{A1}$ and $R^{A2}$ preferably each independently represent a hydrogen atom or an alkyl group having 1 to 4 carbon atoms, more preferably each independently represent a hydrogen atom or a methyl group, and even more preferably both represent a hydrogen atom.

In Formula A1, Ar is preferably a benzene ring or a naphthalene ring, and more preferably a benzene ring.

In Formula A1, $R^{A3}$ is preferably an alkyl group or an alkoxy group, more preferably an alkyl group having 1 to 4 carbon atoms or an alkoxy group having 1 to 4 carbon atoms, and even more preferably a methyl group or a methoxy group.

In a case where there is a plurality of $R^{A3}$'s in Formula A1, the plurality of $R^{A3}$'s may be the same as or different from each other.

In Formula A1, n is preferably an integer of 0 to 2, more preferably 0 or 1, and even more preferably 0.

In the resin A contained in the thermoplastic resin, from the viewpoint of ink receptivity, the content of the structural unit formed of an aromatic vinyl compound is preferably higher than the content of the cyano group-containing structural unit that will be described later. The content of the structural unit formed of an aromatic vinyl compound with respect to the total mass of the thermoplastic resin is more preferably 15% by mass to 85% by mass, and even more preferably 30% by mass to 70% by mass.

The resin A contained in the thermoplastic resin particles preferably has a cyano group-containing structural unit.

Generally, it is preferable that a cyano group be introduced as a cyano group-containing structural unit into the resin A by using a cyano group-containing compound (monomer). Examples of the compound having a cyano group include acrylonitrile compounds and suitable examples thereof include (meth)acrylonitrile.

The cyano group-containing structural unit is preferably a structural unit formed of an acrylonitrile compound, and more preferably a structural unit formed of (meth)acrylonitrile.

As the structural unit formed of a cyano group-containing compound, for example, a structural unit represented by Formula B1 is preferable.

Formula B1

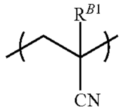

In Formula B1, $R^{B1}$ represents a hydrogen atom or an alkyl group.

In Formula B1, $R^{B1}$ is preferably a hydrogen atom or an alkyl group having 1 to 4 carbon atoms, more preferably a hydrogen atom or a methyl group, and even more preferably a hydrogen atom.

From the viewpoint of ink receptivity, the content of the cyano group-containing structural unit in the resin A is preferably less than the content of the structural unit formed of an aromatic vinyl compound described above. The content of the cyano group-containing structural unit with respect to the total mass of the resin A is preferably 55% by mass to 90% by mass, and more preferably 60% by mass to 85% by mass.

In a case where the resin A included in the thermoplastic resin has the structural unit formed of an aromatic vinyl compound and the cyano group-containing structural unit, the content ratio between the structural unit formed of an aromatic vinyl compound and the cyano group-containing structural unit (structural unit formed of aromatic vinyl compound:cyano group-containing structural unit) is preferably 5:5 to 9:1 and more preferably 6:4 to 8:2 based on mass.

From the viewpoint of UV printing durability and chemical resistance, the resin A contained in the thermoplastic resin particles preferably further has a structural unit formed of a N-vinyl heterocyclic compound.

Examples of the N-vinyl heterocyclic compound include N-vinylpyrrolidone, N-vinylcarbazole, N-vinylpyrrole, N-vinylphenothiazine, N-vinylsuccinic acid imide, N-vinylphthalimide, N-vinylcaprolactam, and N-vinylimidazole. Among these, N-vinylpyrrolidone is preferable.

preferred examples of the structural unit formed of a N-vinyl heterocyclic compound include a structural unit represented by Formula C1.

Formula C1

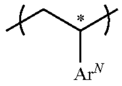

In Formula C1, $Ar^N$ represents a nitrogen atom-containing heterocyclic structure, and the nitrogen atom in $Ar^N$ is bonded to the carbon atom represented by *.

In Formula C1, the heterocyclic structure represented by $Ar^N$ is preferably a pyrrolidone ring, a carbazole ring, a pyrrole ring, a phenothiazine ring, a succinimide ring, a phthalimide ring, a caprolactam ring, or an imidazole ring, and more preferably a pyrrolidone ring.

Furthermore, the heterocyclic structure represented by $Ar^N$ may have a known substituent.

In the resin A, the content of the structural unit formed of a N-vinyl heterocyclic compound with respect to the total mass of the resin A is preferably 5% by mass to 50% by mass, and more preferably 10% by mass to 40% by mass.

The resin A contained in the thermoplastic resin particles may contain an acidic group-containing structural unit. From the viewpoint of on-press developability and ink receptivity, it is preferable that the resin A do not contain an acidic group-containing structural unit.

Specifically, in the thermoplastic resin, the content of the acidic group-containing structural unit is preferably 20% by mass or less, more preferably 10% by mass or less, and even more preferably 5% by mass or less. The lower limit of the content is not particularly limited, and may be 0% by mass.

The acid value of the thermoplastic resin is preferably 160 mg KOH/g or less, more preferably 80 mg KOH/g or less, and even more preferably 40 mg KOH/g or less. The lower limit of the acid value is not particularly limited, and may be 0 mg KOH/g.

In the present disclosure, the acid value is determined by the measurement method based on JIS K0070: 1992.

From the viewpoint of ink receptivity, the resin A contained in the thermoplastic resin particles may contain a hydrophobic group-containing structural unit.

Examples of the hydrophobic group include an alkyl group, an aryl group, an aralkyl group, and the like.

As the hydrophobic group-containing structural unit, a structural unit formed of an alkyl (meth)acrylate compound, an aryl (meth)acrylate compound, or an aralkyl (meth) acrylate compound is preferable, and a structural unit formed of an alkyl (meth)acrylate compound is more preferable.

The alkyl group in the alkyl (meth)acrylate compound preferably has 1 to 10 carbon atoms. The alkyl group may be linear or branched or may have a cyclic structure. Examples of the alkyl (meth)acrylate compound include methyl (meth) acrylate, ethyl (meth)acrylate, propyl (meth)acrylate, cyclohexyl (meth)acrylate, 2-ethylhexyl (meth)acrylate, dicyclopentanyl (meth)acrylate, and the like.

The aryl group in the aryl (meth)acrylate compound preferably has 6 to 20 carbon atoms. The aryl group is more preferably a phenyl group. The aryl group may further have a known substituent. Preferred examples of the aryl (meth) acrylate compound include phenyl (meth)acrylate.

The alkyl group in the aralkyl (meth)acrylate compound preferably has 1 to 10 carbon atoms. The alkyl group may be linear or branched or may have a cyclic structure. The aryl group in the aralkyl (meth)acrylate compound preferably has 6 to 20 carbon atoms. The aryl group is more preferably a phenyl group. Preferred examples of the aralkyl (meth) acrylate compound include benzyl (meth)acrylate.

In the resin A contained in the thermoplastic resin particles, the content of the hydrophobic group-containing structural unit with respect to the total mass of the resin A is preferably 5% by mass to 50% by mass, and more preferably 10% by mass to 30% by mass.

From the viewpoint of UV printing durability and on-press developability, the thermoplastic resin contained in the thermoplastic resin particles preferably has a hydrophilic group.

The hydrophilic group is not particularly limited as long as it has a hydrophilic structure, and examples thereof include an acid group such as a carboxy group, a hydroxy group, an amino group, a cyano group, a polyalkylene oxide structure, and the like.

From the viewpoint of UV printing durability and on-press developability, the hydrophilic group is preferably a group having a polyalkylene oxide structure, a group having a polyester structure, or a sulfonic acid group, more preferably a group having a polyalkylene oxide structure or a sulfonic acid group, and even more preferably a group having a polyalkylene oxide structure.

From the viewpoint of on-press developability, the polyalkylene oxide structure is preferably a polyethylene oxide structure, a polypropylene oxide structure, or a poly(ethylene oxide/propylene oxide) structure.

In addition, from the viewpoint of on-press developability, among the hydrophilic groups, as a polyalkylene oxide structure, groups having a polypropylene oxide structure are preferable, and groups having a polyethylene oxide structure and a polypropylene oxide structure are more preferable.

From the viewpoint of on-press developability, the number of alkylene oxide structures in the polyalkylene oxide structure is preferably 2 or more, more preferably 5 or more, even more preferably 5 to 200, and particularly preferably 8 to 150.

From the viewpoint of on-press developability, the hydrophilic group is preferably a group represented by Formula Z.

From the viewpoint of improving UV printing durability, chemical resistance, and on-press developability, the resin A contained in the thermoplastic resin particles preferably has a hydrophilic group-containing structural unit.

Examples of the hydrophilic group include —OH, —CN, —$CONR^1R^2$, —$NR^2COR^1$ ($R^1$ and $R^2$ each independently represent a hydrogen atom, an alkyl group, an alkenyl group, or an aryl group, $R^1$ and $R^2$ may be bonded to each other to form a ring), —$NR^3R^4$, —$N^+R^3R^4R^5X^-$($R^3$ to $R^5$ each independently represent an alkyl group of 1 to 8 carbon atoms, and $X^-$ represents a counteranion), a group represented by Formula PO, a hydrophilic group that the thermoplastic resin contained in the thermoplastic resin particles preferably has, and the like.

Among these hydrophilic groups, —$CONR^1R^2$ or a group represented by Formula PO is preferable, and a group represented by Formula PO is more preferable.

Formula PO

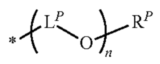

In Formula PO, $L^P$ each independently represent an alkylene group, $R^P$ represents a hydrogen atom or an alkyl group, and n represents an integer of 1 to 100.

In Formula PO, $L^P$ preferably each independently represent an ethylene group, a 1-methylethylene group, or a 2-methylethylene group, and more preferably each independently represent an ethylene group.

In Formula PO, $R^P$ is preferably a hydrogen atom or an alkyl group having a carbon number of 1 to 18, more preferably a hydrogen atom or an alkyl group having a carbon number of 1 to 10, even more preferably a hydrogen atom or an alkyl group having a carbon number of 1 to 4, and particularly preferably a hydrogen atom or a methyl group.

In Formula PO, n is preferably an integer of 1 to 10, and more preferably an integer of 1 to 4.

In the resin A, the content of the hydrophilic group-containing structural unit with respect to the total mass of the resin A is preferably 5% by mass to 60% by mass, and more preferably 10% by mass to 30% by mass.

The resin A contained in the thermoplastic resin particles may further contain other structural units. The resin can contain, as those other structural units, structural units other than the structural units described above without particular limitations. Examples thereof include structural units formed of an acrylamide compound, a vinyl ether compound, and the like.

Examples of the acrylamide compound include (meth) acrylamide, N-methyl (meth)acrylamide, N-ethyl (meth) acrylamide, N-propyl (meth)acrylamide, N-butyl (meth)

acrylamide, N,N'-dimethyl (meth)acrylamide, N,N'-diethyl (meth)acrylamide, N-hydroxyethyl (meth)acrylamide, N-hydroxypropyl (meth)acrylamide, N-hydroxybutyl (meth)acrylamide, and the like.

Examples of the vinyl ether compound include methyl vinyl ether, ethyl vinyl ether, propyl vinyl ether, n-butyl vinyl ether, tert-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether, and the like.

In the thermoplastic resin, the content of those other structural units with respect to the total mass of the thermoplastic resin is preferably 5% by mass to 50% by mass, and more preferably 10% by mass to 30% by mass.

From the viewpoint of UV printing durability and ink receptivity, the glass transition temperature (Tg) of the thermoplastic resin is preferably 60° C. to 150° C., more preferably 80° C. to 140° C., and even more preferably 90° C. to 130° C.

In a case where the thermoplastic resin particles contain two kinds of thermoplastic resins, the value obtained by the FOX equation that will be described later is referred to as the glass transition temperature of the thermoplastic resin.

In the present disclosure, the glass transition temperature of a resin can be measured by differential scanning calorimetry (DSC).

Specifically, the glass transition temperature is measured according to the method described in JIS K 7121 (1987) or JIS K 6240 (2011). As the glass transition temperature in the present specification, an extrapolated glass transition initiation temperature (hereinafter, may be referred to as Tig) is used.

The method of measuring the glass transition temperature will be described in more detail.

In a case of determining the glass transition temperature, the device is kept at a temperature approximately 50° C. lower than the expected Tg of the resin until the device stabilizes. Then, the resin is heated at a heating rate of 20° C./min to a temperature approximately 30° C. higher than the temperature at which the glass transition ends, and a differential thermal analysis (DTA) curve or a DSC curve is created.

The extrapolated glass transition initiation temperature (Tig), that is, the glass transition temperature Tg in the present specification is determined as a temperature at an intersection point between a straight line that is obtained by extending the baseline of a low temperature side in the DTA curve or the DSC curve to a high temperature side and a tangent line that is drawn at a point where the slope of the curve of a portion in which the glass transition changes stepwisely is maximum.

In a case where the thermoplastic resin particles contain two kinds of thermoplastic resins, Tg of the thermoplastic resin particles is determined as follows.

In a case where Tg1 (K) represents Tg of a first thermoplastic resin, W1 represents the mass ratio of the first thermoplastic resin to the total mass of thermoplastic resin components in the thermoplastic resin particles, Tg2 (K) represents Tg of a second thermoplastic resin, and W2 represents the mass ratio of the second resin to the total mass of thermoplastic resin components in the thermoplastic resin particles, Tg0 (K) of the thermoplastic resin particles can be estimated according to the following FOX equation.

$$FOX \text{ equation: } 1/Tg0=(W1/Tg1)+(W2/Tg2)$$

In addition, in a case where the thermoplastic resin particles contain three or more kinds of resins or in a case where three or more kinds of thermoplastic resin particles each containing different types of thermoplastic resins are contained in a pretreatment liquid, similarly to the case described above, in a case where Tgn (K) represents Tg of nth resin and Wn represents the mass ratio of the nth resin to the total mass of resin components in the thermoplastic resin particles, Tg0 (K) of the thermoplastic resin particles can be estimated according to the following equation.

$$FOX \text{ equation: } 1/Tg0=(W1/Tg1)+(W2/Tg2)+(W3/Tg3)\cdots+(Wn/Tgn)$$

In the present specification, Tg is a value measured by a differential scanning calorimeter (DSC). As the differential scanning calorimeter (DSC), for example, EXSTAR 6220 manufactured by SII NanoTechnology Inc. can be used.

From the viewpoint of UV printing durability, the arithmetic mean particle diameter of the thermoplastic resin particles is preferably 1 nm or more and 200 nm or less, more preferably 3 nm or more and less than 80 nm, and even more preferably 10 nm or more and 49 nm or less.

Unless otherwise specified, the arithmetic mean particle diameter of the thermoplastic resin particles in the present disclosure refers to a value measured by a dynamic light scattering method (DLS). The measurement of the arithmetic mean particle diameter of the thermoplastic resin particles by DLS is carried out using Brookhaven BI-90 (manufactured by Brookhaven Instruments) according to the manual of the instrument.

The weight-average molecular weight of the thermoplastic resin contained in the thermoplastic resin particles is preferably 3,000 to 300,000, and more preferably 5,000 to 100,000.

The manufacturing method of the thermoplastic resin contained in the thermoplastic resin particles is not particularly limited, and the thermoplastic resin can be manufactured by known methods.

For example, the polymer is obtained by polymerizing a styrene compound, an acrylonitrile compound, and at least one kind of optional compound selected from the group consisting of the aforementioned N-vinyl heterocyclic compound, a compound used for forming the aforementioned ethylenically unsaturated group-containing structural unit, a compound used for forming the aforementioned acidic group-containing structural unit, a compound used for forming the aforementioned hydrophobic group-containing structural unit, and a compound used for forming the aforementioned other structural units by known methods.

Specific examples of the thermoplastic resin contained in the thermoplastic resin particles will be shown as follows, but the thermoplastic resin used in the present disclosure is not limited thereto.

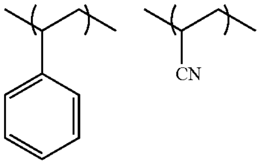
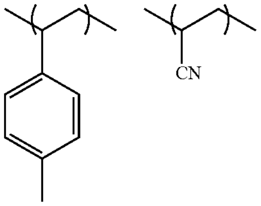
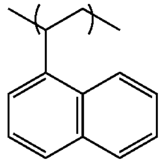
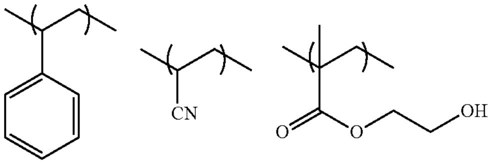
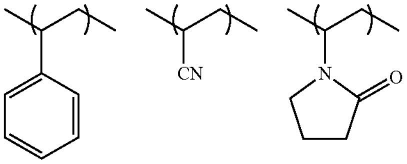
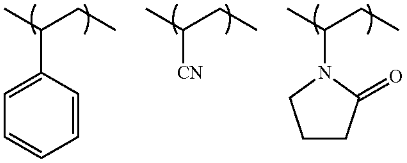
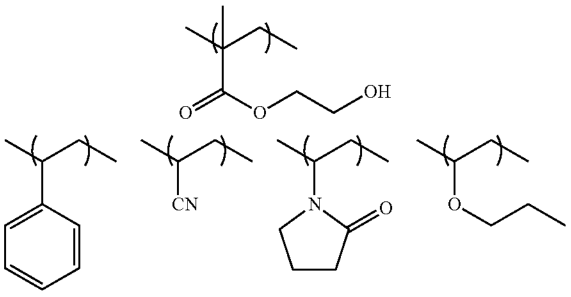
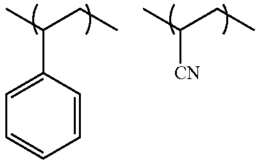
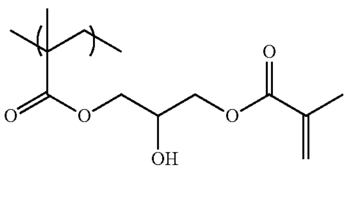
-continued
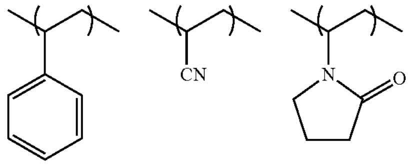
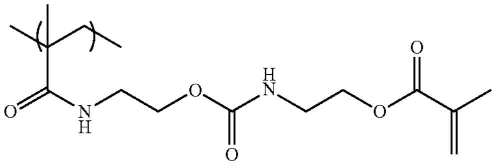
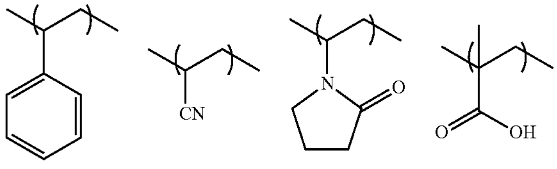
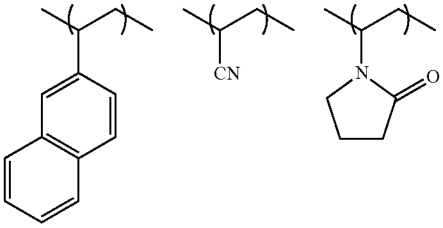
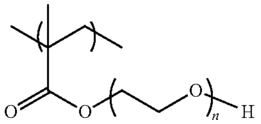
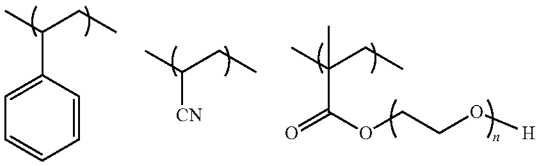
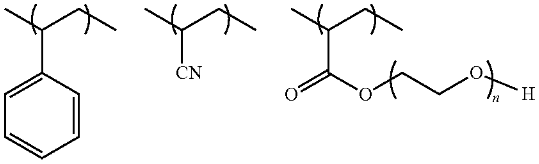
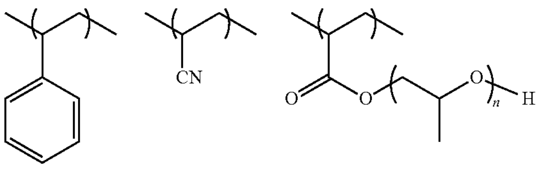
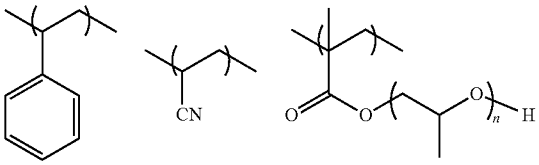
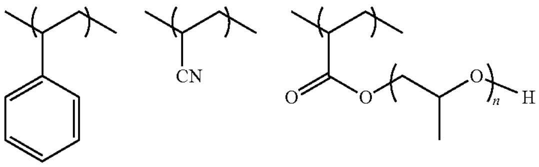

-continued

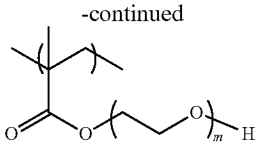

The content ratio of the structural units in the above specific examples can be appropriately changed according to the preferred range of the content of each of the structural units described above.

Furthermore, the weight-average molecular weight of each of the compounds shown in the above specific examples can be appropriately changed according to the preferred range of the weight-average molecular weight of the thermoplastic resin described above.

The average particle diameter of the particles is preferably 0.01 μm to 3.0 μm, more preferably 0.03 μm to 2.0 μm, and even more preferably 0.10 μm to 1.0 μm. In a case where the average particle diameter is in this range, excellent resolution and excellent temporal stability are obtained.

The average primary particle diameter of the particles in the present disclosure is obtained by measuring with a light scattering method or by imaging an electron micrograph of the particles, measuring the particle diameter of a total of 5,000 particles in the photograph, and calculating the average value thereof. For non-spherical particles, the value of particle diameter of spherical particles having the same area as the area of the particles on the photograph is adopted as the particle diameter.

Unless otherwise specified, the average particle diameter in the present disclosure means a volume average particle diameter.

The image-recording layer may contain only one kind of particles, particularly, one kind of polymer particles or two or more kinds of polymer particles.

From the viewpoint of on-press developability and UV printing durability, the content of particles, particularly, the content of polymer particles in the image-recording layer with respect to the total mass of the image-recording layer is preferably 5% by mass to 90% by mass, more preferably 10% by mass to 90% by mass, even more preferably 20% by mass to 90% by mass, and particularly preferably 50% by mass to 90% by mass.

Furthermore, from the viewpoint of on-press developability and UV printing durability, the content of the polymer particles in the image-recording layer with respect to the total mass of components having a molecular weight of 3,000 or more in the image-recording layer is preferably 20% by mass to 100% by mass, more preferably 35% by mass to 100% by mass, even more preferably 50% by mass to 100% by mass, and particularly preferably 80% by mass to 100% by mass.

Binder Polymer

The image-recording layer may contain a binder polymer. As the binder polymer, binder polymers that can be used in an image-recording layer of on-press development type lithographic printing plate precursors can be used. Specifically, as the binder polymer, the binder polymer described in paragraphs "0288" to "0317" of WO2022/019217A can be suitably used.

In the image-recording layer used in the present disclosure, one binder polymer may be used alone, or two or more binder polymers may be used in combination.

The content of the binder polymer to be contained in the image-recording layer can be optionally set, and the content of the binder polymer with respect to the total mass of the image-recording layer is preferably 1% by mass to 90% by mass and more preferably 5% by mass to 80% by mass.

In a case where the image-recording layer of the present disclosure contains other binder polymers, the content of those other binder polymers with respect to the total mass of the aforementioned thermoplastic resin particles and those other binder polymers is preferably more than 0% by mass and 99% by mass or less, more preferably 20% by mass to 95% by mass, and even more preferably 40% by mass to 90% by mass.

Color Forming Agent

The image-recording layer preferably contains a color forming agent, and more preferably contains an acid color forming agent.

"Color forming agent" used in the present disclosure means a compound that forms or removes color by a stimulus such as light or acid and thus changes the color of the image-recording layer. Furthermore, "acid color forming agent" means a compound that forms or removes color by being heated in a state of accepting an electron accepting compound (for example, a proton of an acid or the like) and thus changes the color of the image-recording layer. The acid color forming agent is particularly preferably a colorless compound which has a partial skeleton such as lactone, lactam, sultone, spiropyran, an ester, or an amide and allows such a partial skeleton to rapidly open the ring or to be cleaved when coming into contact with an electron-accepting compound.

Examples of such an acid color forming agent include phthalides such as 3,3-bis(4-dimethylaminophenyl)-6-dimethylaminophthalide (referred to as "crystal violet lactone"), 3,3-bis(4-dimethylaminophenyl)phthalide, 3-(4-dimethylaminophenyl)-3-(4-diethylamino-2-methylphenyl)-6-dimethylaminophthalide, 3-(4-dimethylaminophenyl)-3-(1,2-dimethylindol-3-yl)phthalide, 3-(4-dimethylaminophenyl)-3-(2-methylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-6-dimethylaminophthalide, 3,3-bis(2-phenylindol-3-yl)-6-dimethylaminophthalide, and 3-(4-dimethylaminophenyl)-3-(1-methylpyrrol-3-yl)-6-dimethylaminophthalide, 3,3-bis[1,1-bis(4-dimethylaminophenyl)ethylene-2-yl]-4,5,6,7-tetrachlorophthalide, 3,3-bis[1,1-bis(4-pyrrolidinophenyl)ethylene-2-yl]-4,5,6,7-tetrabromophthalide, 3,3-bis[1-(4-dimethylaminophenyl)-1-(4-methoxyphenyl)ethylene-2-yl]-4,5,6,7-tetrachlorophthalide, 3,3-bis[1-(4-pyrrolidinophenyl)-1-(4-methoxyphenyl)ethylene-2-yl]4,5,6,7-tetrachlorophthalide, 3-[1,1-di(1-ethyl-2-methylindol-3-yl)ethylene-2-yl]-3-(4-diethylaminophenyl)phthalide, 3-[1,1-di(1-ethyl-2-methylindol-3-yl)ethylene-2-yl]-3-(4-N-ethyl-N-phenylaminophenyl)phthalide, 3-(2-ethoxy-4-diethylaminophenyl)-3-(1-n-octyl-2-methylindol-3-yl)-phthalide, 3,3-bis(1-n-octyl-2-methylindol-3-yl)-phthalide, and 3-(2-methyl-4-diethylaminophenyl)-3-(1-n-octyl-2-methylindol-3-yl)-phthalide, 4,4-bis-dimethylaminobenzhydrinbenzylether, N-halophenyl-leucoauramine, N-2,4,5-trichlorophenyl leucoauramine, rhodamine-B-anilinolactam, rhodamine-(4-nitroanilino)lactam, rhodamine-B-(4-chloroanilino) lactam, 3,7-bis(diethylamino)-10-benzoylphenoxazine, benzoyl leucomethylene blue, and 4-nitrobenzoyl methylene blue, fluorans such as 3,6-dimethoxyfluoran, 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-N-cyclohexyl-N-n-butylamino-7-methylfluoran, 3-diethylamino-7-dibenzylaminofluoran, 3-diethylamino-7-octylaminofluoran, 3-diethylamino-7-di-n-hexylaminofluoran, 3-diethylamino-7-anilinofluoran, 3-diethylamino-7-(2'-fluorophenylamino)fluoran, 3-diethylamino-7-(2'-chlorophenylamino)fluoran, 3-diethylamino-7-(3'-chlorophenylamino)fluoran, 3-diethylamino-7-(2',3'-dichlorophenylamino)fluoran, 3-diethylamino-7-(3'-trifluoromethylphenylamino)fluoran, 3-di-n-butylamino-7-(2'-fluorophenylamino)fluoran, 3-di-n-butylamino-7-(2'chlorophenylamino)fluoran, 3-N-isopentyl-N-ethylamino-7-(2'-chlorophenylamino)fluoran, 3-N-n-hexyl-N-ethylamino-7-(2'-chlorophenylamino) fluoran, 3-diethylamino-6-chloro-7-anilinofluoran, 3-di-n-butylamino-6-chloro-7-anilinofluoran, 3-diethylamino-6-methoxy-7-anilinofluoran, 3-di-n-butylamino-6-ethoxy-7-anilinofluoran, 3-pyrrolidino-6-methyl-7-anilinofluoran, 3-piperidino-6-methyl-7-anilinofluoran, 3-morpholino-6-methyl-7-anilinofluoran, 3-dimethylamino-6-methyl-7-anilinofluoran, 3-diethylamino-6-methyl-7-anilinofluoran, 3-di-n-butylamino-6-methyl-7-anilinofluoran, 3-di-n-pentylamino-6-methyl-7-anilinofluoran, 3-N-ethyl-N-methylamino-6-methyl-7-anilinofluoran, 3-N-n-propyl-N-methylamino-6-methyl-7-anilinofluoran, 3-N-n-propyl-N-ethylamino-6-methyl-7-anilinofluoran, 3-N-n-butyl-N-methylamino-6-methyl-7-anilinofluoran, 3-N-n-butyl-N-ethylamino-6-methyl-7-anilinofluoran, 3-N-isobutyl-N-methylamino-6-methyl-7-anilinofluoran, 3-N-isobutyl-N-ethylamino-6-methyl-7-anilinofluoran, 3-N-isopentyl-N-ethylamino-6-methyl-7-anilinofluoran, 3-N-n-hexyl-N-methylamino-6-methyl-7-anilinofluoran, 3-N-cyclohexyl-N-ethylamino-6-methyl-7-anilinofluoran, 3-N-cyclohexyl-N-n-propylamino-6-methyl-7-anilinofluoran, 3-N-cyclohexyl-N-n-butylamino-6-methyl-7-anilinofluoran, 3-N-cyclohexyl-N-n-hexylamino-6-methyl-7-anilinofluoran, 3-N-cyclohexyl-N-n-octylamino-6-methyl-7-anilinofluoran, 3-N-(2'-methoxyethyl)-N-methylamino-6-methyl-7-anilinofluoran, 3-N-(2'-methoxyethyl)-N-ethylamino-6-methyl-7-anilinofluoran, 3-N-(2'-methoxyethyl)-N-isobutylamino-6-methyl-7-anilinofluoran, 3-N-(2'-ethoxyethyl)-N-methylamino-6-methyl-7-anilinofluoran, 3-N-(2'-ethoxyethyl)-N-ethylamino-6-methyl-7-anilinofluoran, 3-N-(3'-methoxypropyl)-N-methylamino-6-methyl-7-anilinofluoran, 3-N-(3'methoxypropyl)-N-ethylamino-6-methyl-7-anilinofluoran, 3-N-(3'-ethoxypropyl)-N-methylamino-6-methyl-7-anilinofluoran, 3-N-(3'ethoxypropyl)-N-ethylamino-6-methyl-7-anilinofluoran, 3-N-(2'-tetrahydrofurfuryl)-N-ethylamino-6-methyl-7-anilinofluoran, 3-N-(4'-methylphenyl)-N-ethylamino-6-methyl-7-anilinofluoran, 3-diethylamino-6-ethyl-7-anilinofluoran, 3-diethylamino-6-methyl-7-(3'-methylphenylamino)fluoran, 3-diethylamino-6-methyl-7-(2',6'-dimethylphenylamino)fluoran, 3-di-n-butylamino-6-methyl-7-(2',6'-dimethylphenylamino) fluoran, 3-di-n-butylamino-7-(2',6'-dimethylphenylamino)fluoran, 2,2-bis[4'-(3-N-cyclohexyl-N-methylamino-6-methylfluoran)-7-ylaminophenyl]propane, 3-[4'-(4-phenylaminophenyl) aminophenyl]amino-6-methyl-7-chlorofluoran, and 3-[4'(dimethylaminophenyl)]amino-5,7-dimethylfluoran, phthalides such as 3-(2-methyl-4-diethylaminophenyl)-3-(1-ethyl-2-methylindol-3-yl)-4-azaphthalide, 3-(2-n-propoxycarbonylamino-4-di-n-propylaminophenyl)-3-(1-ethyl-2-methylindol-3-yl)-4-azaphthalide, 3-(2-methylamino-4-di-n-propylaminophenyl)-3-(1-ethyl-2-methylindol-3-yl)-4-azaphthalide, 3-(2-methyl-4-di-n-hexylaminophenyl)-3-(1-n-octyl-2-methylindol-3-yl)-4,7-diazaphthalide, 3,3-bis(2-ethoxy-4-diethylaminophenyl)-4-azaphthalide, 3,3-bis(1-n-octyl-2-methylindol-3-yl)-4-azaphthalide, 3-(2-ethoxy-4-diethylaminophenyl)-3-(1-ethyl-2-methylindol-3-yl)-4-azaphthalide, 3-(2-ethoxy-4-diethylaminophenyl)-3-(1-octyl-2-methylindol-3-yl)-4 or 7-azaphthalide, 3-(2-ethoxy-4-diethylaminophenyl)-3-(1-ethyl-2-methylindol-3-yl)-4 or 7-azaphthalide, 3-(2-hexyloxy-4-diethylaminophenyl)-3-(1-ethyl-2-methylindol-3-yl)-4 or 7-azaphthalide, 3-(2-ethoxy-4-diethylaminophenyl)-3-(1-ethyl-2-phenylindol-3-yl)-4 or 7-azaphthalide, 3-(2-butoxy-4-diethylaminophenyl)-3-(1-ethyl-2-phenylindol-3-yl)-4 or 7-azaphthalide, 3-methyl-spiro-dinaphthopyran, 3-ethyl-spiro-dinaphthopyran, 3-phenyl-spiro-dinaphthopyran, 3-benzyl-spiro-dinaphthopyran, 3-methyl-naphtho-(3-methoxy-benzo)spiropyran, 3-propyl-spiro-dibenzopyran-3,6-bis(dimethylamino)fluorene-9-spiro-3'-(6'-dimethylamino)phthalide, and 3,6-bis(diethylamino) fluorene-9-spiro-3'-(6'-dimethylamino)phthalide, 2'-anilino-6'-(N-ethyl-N-isopentyl)amino-3'-methylspiro [isobenzofuran-1(3H), 9'-(9H)xanthen-3-one, 2'-anilino-6'-(N-ethyl-N-(4-methylphenyl))amino-3'-methylspiro[isobenzofuran-1(3H), 9'-(9H)xanthen]-3-one, 3'-N,N-dibenzylamino-6'-N,N-diethylaminospiro [isobenzofuran-1(3H), 9'-(9H)xanthen]-3-one, 2'-(N-methyl-N-phenyl)amino-6'-(N-ethyl-N-(4-methylphenyl))aminospiro[isobenzofuran-1(3H), 9'-(9H) xanthen]-3-one, and the like.

Particularly, from the viewpoint of color formability, the color forming agent used in the present disclosure is preferably at least one kind of compound selected from the group consisting of a spiropyran compound, a spirooxazine compound, a spirolactone compound, and a spirolactam compound.

From the viewpoint of visibility, the hue of the colorant after color forming is preferably green, blue, or black.

From the viewpoint of color formability and visibility of exposed portions, the acid color forming agent is preferably a leuco colorant. However, the leuco colorant does not include the compound represented by Formula (1) and the compound represented by Formula (2) described above. That is, in the image-recording layer of the on-press development type lithographic printing plate precursor according to the embodiment of the present disclosure, other leuco colorants which do not correspond to the compound represented by Formula (1) and the compound represented by Formula (2) may be used in combination.

The aforementioned leuco colorant is not particularly limited as long as it has a leuco structure. The leuco colorant preferably has a spiro structure, and more preferably has a spirolactone ring structure.

From the viewpoint of color formability and visibility of exposed portions, the leuco colorant is preferably a leuco colorant having a phthalide structure or a fluoran structure.

Furthermore, from the viewpoint of color formability and visibility of exposed portions, the leuco colorant having a phthalide structure or a fluoran structure is preferably a compound represented by any of Formula (Le-1) to Formula (Le-3), and more preferably a compound represented by Formula (Le-2).

(Le-1)

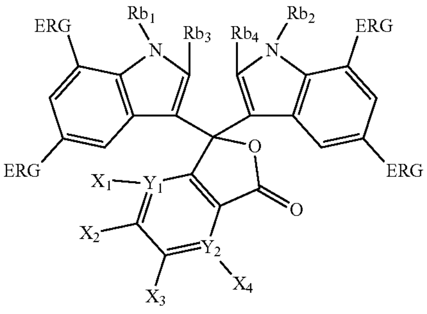

(Le-2)

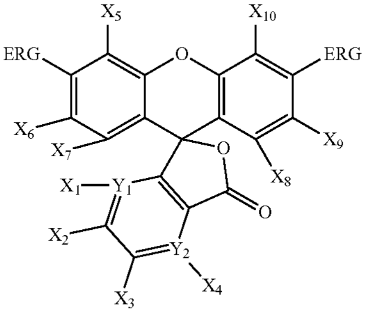

(Le-3)

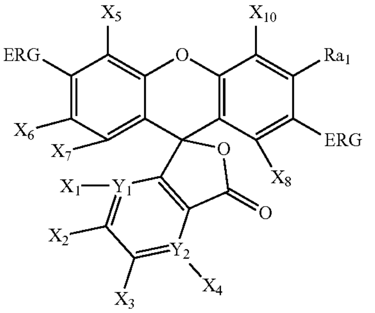

In Formula (Le-1) to Formula (Le-3), ERG's independently represent an electron-donating group, $X_1$ to $X_4$ each independently represent a hydrogen atom, a halogen atom, or dialkylanilino group, $X_5$ to $X_{10}$ each independently represent a hydrogen atom, a halogen atom, or a monovalent organic group, $Y_1$ and $Y_2$ each independently represent C or N, $X_1$ does not exist in a case where $Y_1$ is N, $X_4$ does not exist in a case where $Y_2$ is N, $Ra_1$ represents a hydrogen atom, an alkyl group, or an alkoxy group, and $Rb_1$ to $Rb_4$ each independently represent a hydrogen atom, an alkyl group, an aryl group, or a heteroaryl group.

From the viewpoint of color formability and visibility of exposed portions, the electron-donating group represented by ERG in Formula (Le-1) to Formula (Le-3) is preferably an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, an alkoxy group, an aryloxy group, a heteroaryloxy group, or an alkyl group, more preferably an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, an alkoxy group, or an aryloxy group, even more preferably a monoalkyl monoarylamino group, a diarylamino group, a diheteroarylamino group, or a monoaryl monoheteroarylamino group, and particularly preferably a monoalkyl monoarylamino group.

From the viewpoints of color formability and visibility of exposed portions, the electron-donating group represented by ERG is preferably a disubstituted amino group having an aryl group that has a substituent on at least one ortho position or a heteroaryl group that has a substituent on at least one ortho position, more preferably a disubstituted amino group having a phenyl group having a substituent on at least one ortho position and an electron-donating group at a para position, even more preferably an amino group having a phenyl group having a substituent on at least one ortho position and an electron-donating group at a para position, and an aryl group or a heteroaryl group, and particularly preferably an amino group having a phenyl group having a substituent on at least one ortho position and an electron-donating group at a para position, and an aryl group having an electron-donating group or a heteroaryl group having an electron-donating group.

In the present disclosure, in a case where a bonding position of an aryl group or a heteroaryl group with other structures is defined as position 1, the ortho position in the aryl group or heteroaryl group other than a phenyl group is called a bonding position (for example, position 2 or the like) adjacent to the position 1.

Furthermore, from the viewpoints of color formability and visibility of exposed portions, the electron-donating group that the aryl group or heteroaryl group has is preferably an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, an alkoxy group, an aryloxy group, a heteroaryloxy group, or an alkyl group, more preferably an alkoxy group, an aryloxy group, a heteroaryloxy group, or an alkyl group, and particularly preferably an alkoxy group.

From the viewpoints of color formability and visibility of exposed portions, $X_1$ to $X_4$ in Formula (Le-1) to Formula (Le-3) each independently are preferably a hydrogen atom or a chlorine atom, and more preferably each independently represent a hydrogen atom.

From the viewpoints of color formability and visibility of exposed portions, $X_5$ to $X_{10}$ in Formula (Le-2) or Formula (Le-3) each independently are preferably a hydrogen atom, a halogen atom, an alkyl group, an aryl group, an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, a hydroxy group, an alkoxy group, an aryloxy group, a heteroaryloxy group, an acyl group, an alkoxycarbonyl group, an aryloxycarbonyl group, a heteroaryloxycarbonyl group, or a cyano group, more preferably a hydrogen atom, a halogen atom, an alkyl group, an aryl group, an alkoxy group, or an aryloxy group, even more preferably a hydrogen atom, a halogen atom, an alkyl group, or an aryl group, and particularly preferably a hydrogen atom.

From the viewpoints of color formability and visibility of exposed portions, it is preferable that at least one of $Y_1$ or $Y_2$ in Formula (Le-1) to Formula (Le-3) be C, and it is more preferable that both of $Y_1$ and $Y_2$ be C.

From the viewpoints of color formability and visibility of exposed portions, $Ra_1$ in Formula (Le-1) to Formula (Le-3) is preferably an alkyl group or an alkoxy group, more preferably an alkoxy group, and particularly preferably a methoxy group.

From the viewpoints of color formability and visibility of exposed portions, $Rb_1$ to $Rb_4$ in Formula (Le-1) to Formula (Le-3) preferably each independently represent a hydrogen atom or an alkyl group, more preferably each independently represent an alkyl group, and particularly preferably each independently represent a methyl group.

In addition, from the viewpoints of color formability and visibility of exposed portions, the leuco colorant having a phthalide structure or a fluoran structure is more preferably a compound represented by any of Formula (Le-4) to Formula (Le-6), and even more preferably a compound represented by Formula (Le-5).

(Le-4)

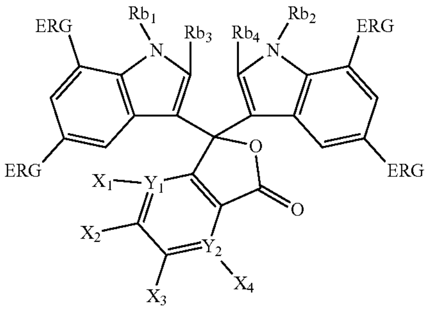

(Le-5)

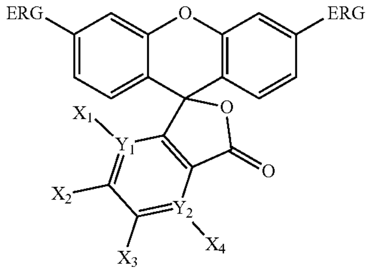

(Le-6)

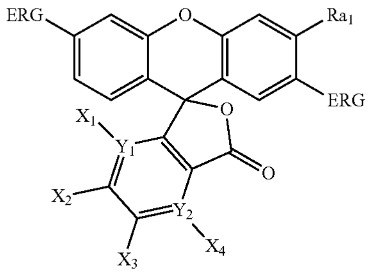

In Formula (Le-4) to Formula (Le-6), ERG's each independently represent an electron-donating group, $X_1$ to $X_4$ each independently represent a hydrogen atom, a halogen atom, or a dialkylanilino group, $Y_1$ and $Y_2$ each independently represent C or N, $X_1$ does not exist in a case where $Y_1$ is N, $X_4$ does not exist in a case where $Y_2$ is N, $Ra_1$ represents a hydrogen atom, an alkyl group, or an alkoxy group, and $Rb_1$ to $Rb_4$ each independently represent a hydrogen atom, an alkyl group, an aryl group, or a heteroaryl group.

ERG, $X_1$ to $X_4$, $Y_1$, $Y_2$, $Ra_1$, and $Rb_1$ to $Rb_4$ in Formula (Le-4) to Formula (Le-6) have the same definitions as ERG, $X_1$ to $X_4$, $Y_1$, $Y_2$, $Ra_1$, and $Rb_1$ to $Rb_4$ in Formula (Le-1) to Formula (Le-3) respectively, and preferred aspects thereof are also the same.

Furthermore, from the viewpoints of color formability and visibility of exposed portions, the leuco colorant having a phthalide structure or a fluoran structure is even more preferably a compound represented by any of Formula (Le-7) to Formula (Le-9), and particularly preferably a compound represented by Formula (Le-8).

(Le-7)

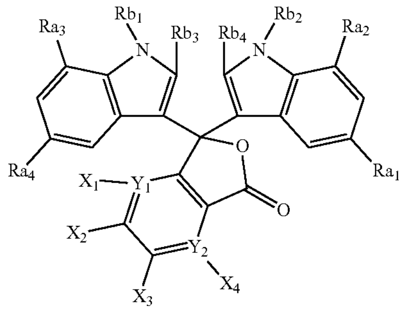

(Le-8)

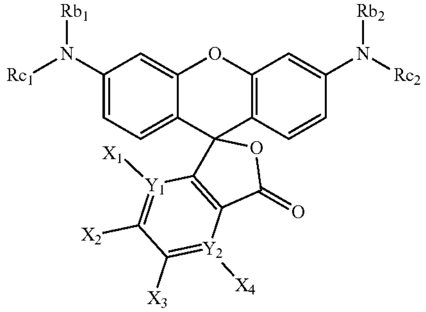

(Le-9)

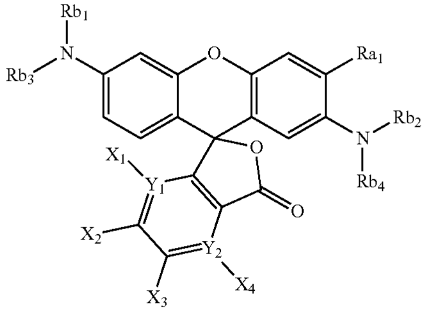

In Formula (Le-7) to Formula (Le-9), $X_1$ to $X_4$ each independently represent a hydrogen atom, a halogen atom, or a dialkylanilino group, $Y_1$ and $Y_2$ each independently represent C or N, $X_1$ does not exist in a case where $Y_1$ is N, $X_4$ does not exist in a case where $Y_2$ is N, $Ra_1$ to $Ra_4$ each independently represent a hydrogen atom, an alkyl group, or an alkoxy group, $Rb_1$ to $Rb_4$ each independently represent a hydrogen atom, an alkyl group, an aryl group, or a heteroaryl group, and $Rc_1$ and $Rc_2$ each independently represent an aryl group or a heteroaryl group.

$X_1$ to $X_4$, $Y_1$, and $Y_2$ in Formula (Le-7) to Formula (Le-9) have the same definition as $X_1$ to $X_4$, $Y_1$, and $Y_2$ in Formula (Le-1) to Formula (Le-3) respectively, and preferred aspects thereof are also the same.

From the viewpoints of color formability and visibility of exposed portions, $Ra_1$ to $Ra_4$ in Formula (Le-7) or Formula (Le-9) each independently are preferably an alkyl group or an alkoxy group, more preferably an alkoxy group, and particularly preferably represent a methoxy group.

From the viewpoints of color formability and visibility of exposed portions, $Rb_1$ to $Rb_4$ in Formula (Le-7) to Formula (Le-9) each independently are preferably a hydrogen atom, an alkyl group, or an aryl group substituted with an alkoxy group, more preferably an alkyl group, and particularly preferably a methyl group.

From the viewpoints of color formability and visibility of exposed portions, $Rc_1$ and $Rc_2$ in Formula (Le-8) each independently are preferably a phenyl group or an alkylphenyl group, and more preferably a phenyl group.

From the viewpoints of color formability and visibility of exposed portions, $Rc_1$ and $Rc_2$ in Formula (Le-8) each independently are preferably an aryl group having a substituent on at least one ortho position or a heteroaryl group having a substituent on at least one ortho position, more preferably an aryl group having a substituent on at least one ortho position, even more preferably a phenyl group having a substituent on at least one ortho position, and particularly preferably a phenyl group having a substituent on at least one ortho position and having an electron-donating group at the para position. Examples of the substituent in $Rc_1$ and $Rc_2$ include substituents that will be described later.

In Formula (Le-8), from the viewpoints of color formability and visibility of exposed portions, it is preferable that $X_1$ to $X_4$ are a hydrogen atom, and $Y_1$ and $Y_2$ are C. Furthermore, from the viewpoints of color formability and visibility of exposed portions, in Formula (Le-8), $Rb_1$ and $Rb_2$ each independently are preferably an alkyl group or an aryl group substituted with an alkoxy group.

Moreover, from the viewpoints of color formability and visibility of exposed portions, in Formula (Le-8), $Rb_1$ and $Rb_2$ each independently are preferably an aryl group or a heteroaryl group, more preferably an aryl group, even more preferably an aryl group having an electron-donating group, and particularly preferably a phenyl group having an electron-donating group at the para position.

From the viewpoints of color formability and visibility of exposed portions, the electron-donating group in $Rb_1$, $Rb_2$, $Rc_1$, and $Rc_2$ is preferably an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, an alkoxy group, an aryloxy group, a heteroaryloxy group, or an alkyl group, more preferably an alkoxy group, an aryloxy group, a heteroaryloxy group, or an alkyl group, and particularly preferably an alkoxy group.

In addition, from the viewpoints of the color formability and the visibility of the exposed portion, it is also preferable that the acid color forming agent includes one or more compounds selected from the group consisting of a compound represented by Formula (Le-10) and a compound represented by Formula (Z-4).

That is, it is preferable that the image-recording layer in the lithographic printing plate precursor according to the present disclosure further contains one or more compounds selected from the group consisting of a compound represented by Formula (Le-10) and a compound represented by Formula (Z-4).

(Le-10)

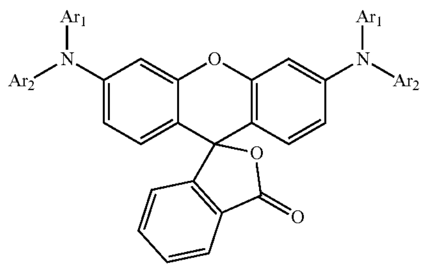

In Formula (Le-10), $Ar_1$'s each independently represent an aryl group or a heteroaryl group, and $Ar_2$'s each independently represent an aryl group having a substituent on at least one ortho position or a heteroaryl group having a substituent on at least one ortho position.

$Ar_1$ in Formula (Le-10) has the same definition as $Rb_1$ and $Rb_2$ in Formula (Le-7) to Formula (Le-9), and preferred aspects thereof are also the same.

$Ar_2$ in Formula (Le-10) has the same definition as $Rc_1$ and $Rc_2$ in Formula (Le-7) to Formula (Le-9), and preferred aspects thereof are also the same.

The alkyl group in Formula (Le-1) to Formula (Le-9) may be linear or branched or may have a ring structure.

The carbon number of the alkyl group in Formula (Le-1) to Formula (Le-9) is preferably 1 to 20, more preferably 1 to 8, even more preferably 1 to 4, and particularly preferably 1 or 2.

The carbon number of the aryl group in Formula (Le-1) to Formula (Le-10) is preferably 6 to 20, more preferably 6 to 10, and particularly preferably 6 to 8.

Specific examples of the aryl group in Formula (Le-1) to Formula (Le-10) include a phenyl group, a naphthyl group, an anthracenyl group, a phenanthrenyl group, and the like which may have a substituent.

Specific examples of the heteroaryl group in Formula (Le-1) to Formula (Le-10) include a furyl group, a pyridyl group, a pyrimidyl group, a pyrazoyl group, a thiophenyl group, and the like which may have a substituent.

Each of the groups in Formula (Le-1) to Formula (Le-10), such as a monovalent organic group, an alkyl group, an aryl group, a heteroaryl group, a dialkylanilino group, an alkylamino group, and an alkoxy group, may have a substituent. Examples of the substituent include an alkyl group, an aryl group, a heteroaryl group, a halogen atom, an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, a hydroxy group, an alkoxy group, an aryloxy group, a heteroaryloxy group, an acyl group, an alkoxycarbonyl group, an aryloxycarbonyl group, a heteroaryloxycarbonyl group, a cyano group, and the like. In addition, these substituents may be further substituted with these substituents.

(Z-4)

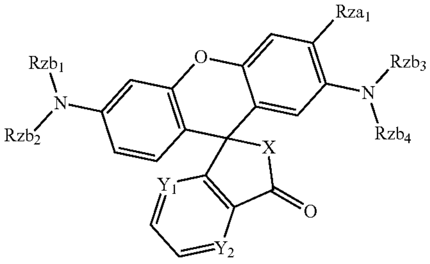

In Formula (Z-4), $Rza_1$ represents a hydrogen atom, an alkyl group, or an alkoxy group, $Rzb_1$ to $Rzb_4$ each independently represent a hydrogen atom, an alkyl group, or an aryl group, $Rzb_1$ and $Rzb_2$, and $Rzb_3$ and $Rzb_4$ may be linked to each other to form a ring structure, X represents O or NR, R represents a hydrogen atom, an alkyl group, an aryl group, or a heteroaryl group, and $Y_1$ and $Y_2$ each independently represent CH or N.

$Rza_1$ in Formula (Z-4) is preferably an alkyl group or an alkoxy group.

$Rzb_1$ and $Rzb_2$ in Formula (Z-4) are each independently preferably an alkyl group.

$Rzb_3$ and $Rzb_4$ in Formula (Z-4) each independently represent a hydrogen atom, an alkyl group, or an aryl group, and it is preferable that one of them represents an aryl group.

X in Formula (Z-4) is preferably O, and $Y_1$ and $Y_2$ are preferably CH.

The alkyl group in Formula (Z-4) may be linear or branched or may have a ring structure.

The number of carbon atoms in the alkyl group in Formula (Z-4) is preferably 1 to 20, more preferably 1 to 8, and even more preferably 1 to 5.

The number of carbon atoms in the aryl group in Formula (Z-4) is preferably 6 to 20, more preferably 6 to 10, and particularly preferably 6 to 8.

Each of the groups such as the alkyl group and the aryl group in Formula (Z-4) may have a substituent. Examples of the substituent include an alkyl group, an aryl group, a halogen atom, an amino group, an alkylamino group, an arylamino group, a dialkylamino group, a monoalkyl monoarylamino group, a diarylamino group, a hydroxy group, an alkoxy group, an aryloxy group, an acyl group, an alkoxycarbonyl group, an aryloxycarbonyl group, a cyano group, and the like. In addition, these substituents may be further substituted with these substituents.

Examples of the leuco colorant having the phthalide structure or the fluoran structure that are suitably used include the following compounds. In addition, Me represents a methyl group.

S-1

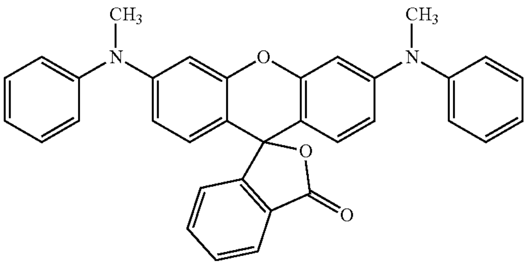

-continued

S-2

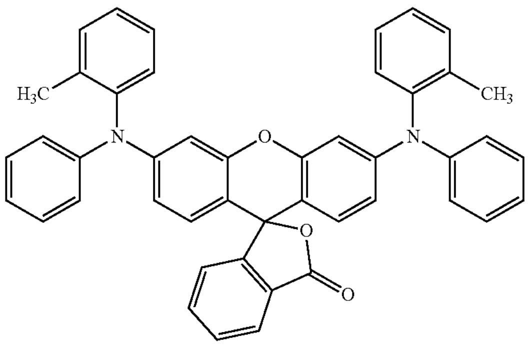

S-3

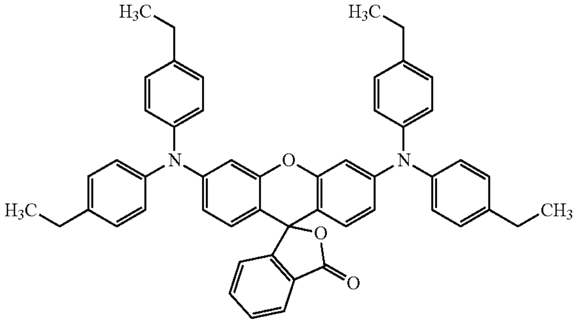

S-4

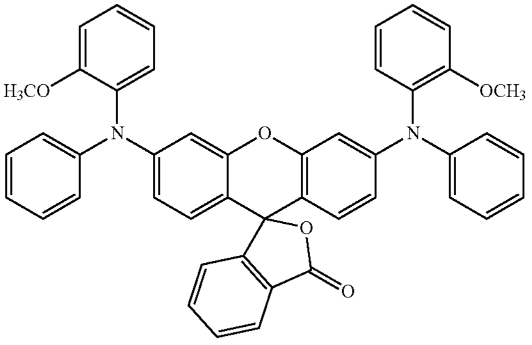

S-5

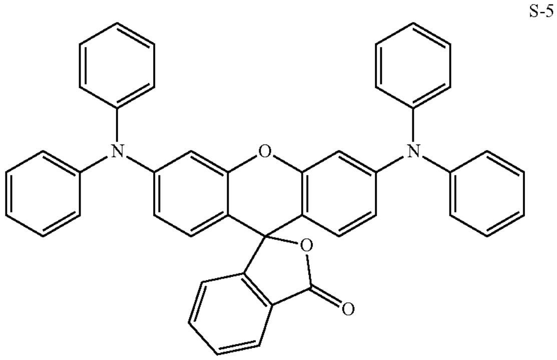

-continued
S-6
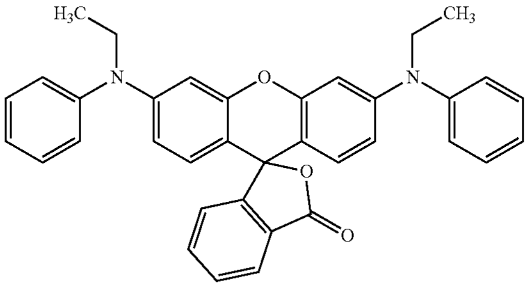
S-7
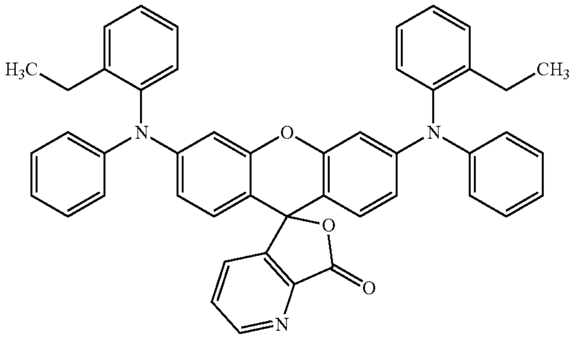
S-8
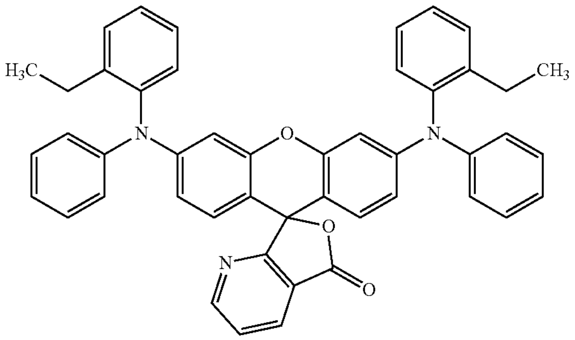
S-9
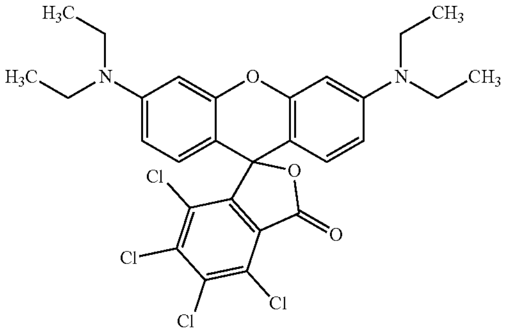
S-10
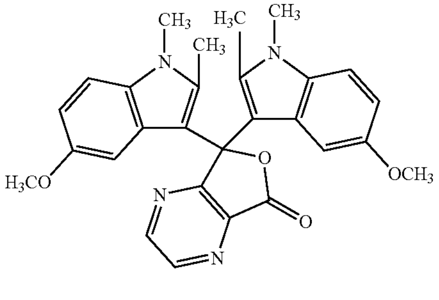
-continued
S-11
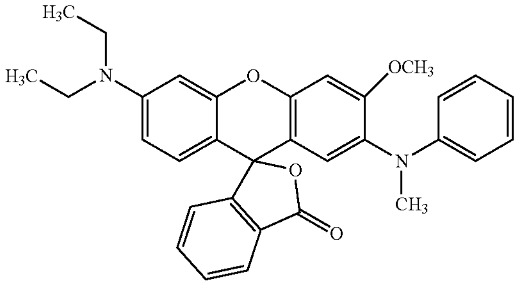
S-12
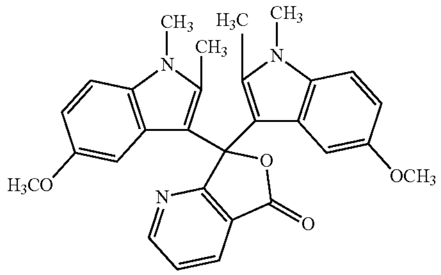
S-13
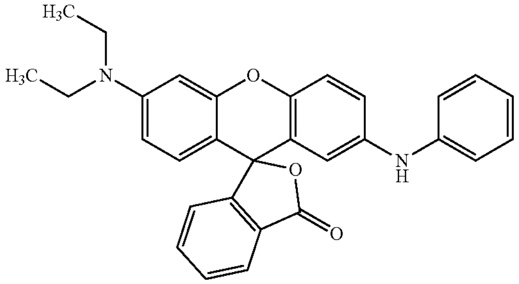
S-14
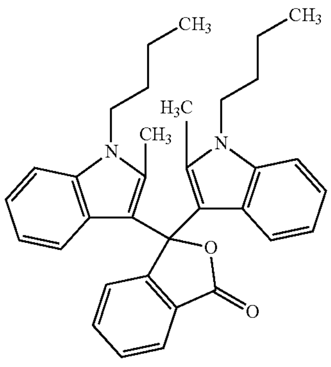
S-15
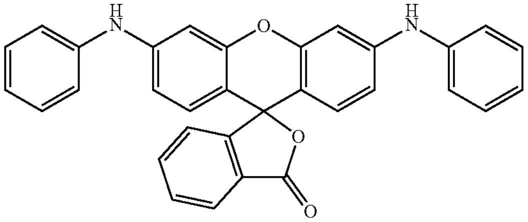

-continued

S-16

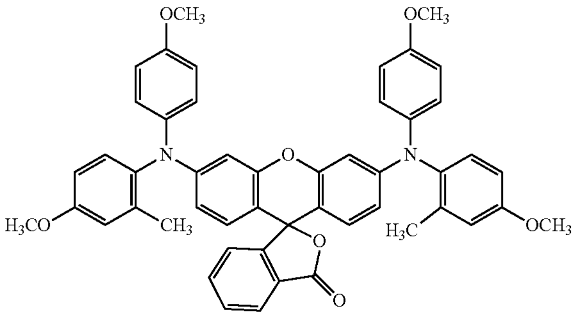

S-17

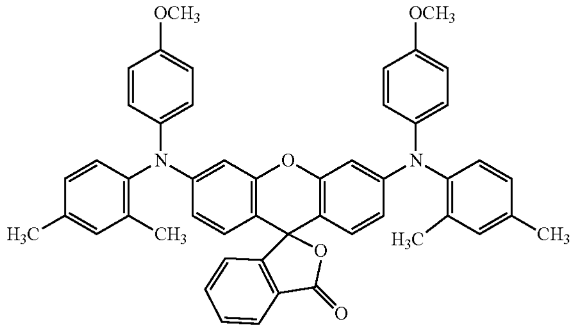

S-18

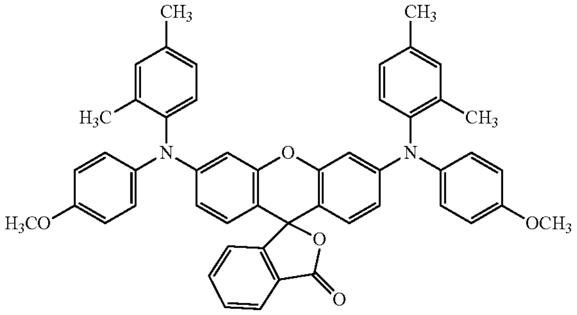

S-19

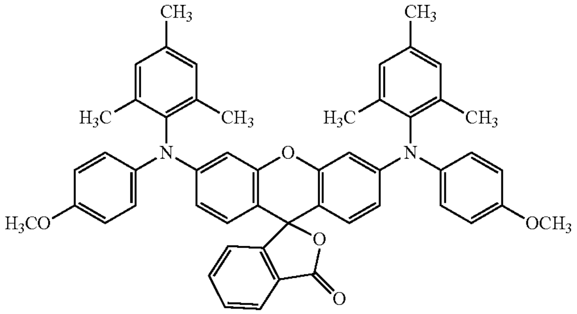

-continued

S-20

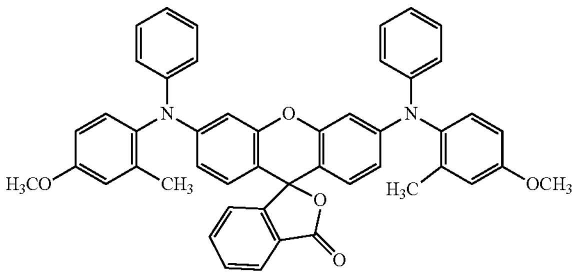

S-21

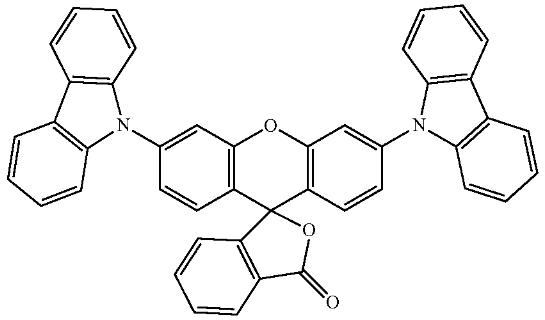

S-22

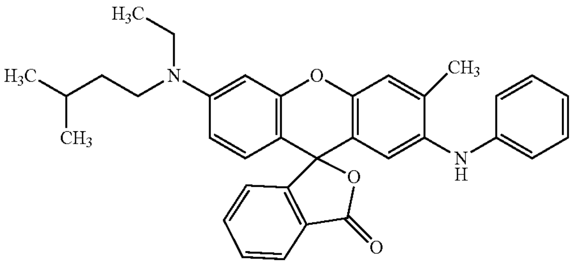

As the color forming agent, a commercially available product can be used, and examples thereof include ETAC, RED500, RED520, CVL, S-205, BLACK305, BLACK400, BLACK100, BLACK500, H-7001, GREEN300, NIR-BLACK78, BLUE220, H-3035, BLUE203, ATP, H-1046, and H-2114 (all manufactured by Fukui Yamada Chemical Co., Ltd.), ORANGE-DCF, Vermilion-DCF, PINK-DCF, RED-DCF, BLMB, CVL, GREEN-DCF, and TH-107 (all manufactured by HODOGAYA CHEMICAL CO., LTD.), ODB, ODB-2, ODB-4, ODB-250, ODB-BlackXV, Blue-63, Blue-502, GN-169, GN-2, Green-118, Red-40, and Red-8 (all manufactured by Yamamoto Chemicals Inc.), and Crystal Violet Lactone (manufactured by Tokyo Chemical Industry Co., Ltd.), and the like. Among these commercially available products, ETAC, S-205, BLACK305, BLACK400, BLACK100, BLACK500, H-7001, GREEN300, NIR-BLACK78, H-3035, ATP, H-1046, H-2114, GREEN-DCF, Blue-63, GN-169, and crystal violet lactone are preferable because these form a film having excellent visible light absorbance.

Each of these color forming agents may be used alone. Alternatively, two or more components can be used in combination.

The content of the color forming agent with respect to the total mass of the image-recording layer is preferably 0.5% by mass to 10% by mass, and more preferably 1% by mass to 5% by mass.

Chain Transfer Agent

The image-recording layer may contain a chain transfer agent. As the chain transfer agent, a chain transfer agent used for an image-recording layer of an on-press development type lithographic printing plate precursor can be used. Specifically, as the chain transfer agent, the chain transfer agents described in paragraphs “0388” to “0393” of WO2022/019217A can be suitably used.

Only one chain transfer agent may be added to the image-recording layer, or two or more chain transfer agents may be used in combination.

The content of the chain transfer agent with respect to the total mass of the image-recording layer is preferably 0.01% by mass to 50% by mass, more preferably 0.05% by mass to 40% by mass, and even more preferably 0.1% by mass to 30% by mass.

Oil Sensitizing Agent

In order to improve the ink receptivity, the image-recording layer may contain an oil sensitizing agent. As the oil sensitizing agent, an oil sensitizing agent used for an image-recording layer of an on-press development type lithographic printing plate precursor can be used. Specifically, as the oil sensitizing agent, the oil sensitizing agents described in paragraphs “0395” to “0404” of WO2022/019217A can be suitably used.

The content of the oil sensitizing agent with respect to the total mass of the image-recording layer is preferably 1% by mass to 40.0% by mass, more preferably 2% by mass to 25.0% by mass, and even more preferably 3% by mass to 20.0% by mass.

The image-recording layer may contain only one oil sensitizing agent, or two or more oil sensitizing agents may be used in combination.

One of the preferred aspects of the image-recording layer used in the present disclosure is an aspect in which the image-recording layer contains two or more compounds as an oil sensitizing agent.

Specifically, from the viewpoint of satisfying both the on-press developability and receptivity, the image-recording layer used in the present disclosure preferably uses all the phosphonium compound, the nitrogen-containing low-molecular-weight compound, and the ammonium group-containing polymer as an oil sensitizing agent, and more preferably uses all the phosphonium compound, the quaternary ammonium salts, and the ammonium group-containing polymer as an oil sensitizing agent.

Development Accelerator

The image-recording layer used in the present disclosure preferably further contains a development accelerator.

The value of polarity element as an SP value of the development accelerator is preferably 6.0 to 26.0, more preferably 6.2 to 24.0, even more preferably 6.3 to 23.5, and particularly preferably 6.4 to 22.0.

In the present disclosure, as the value of polarity element as an SP value (solubility parameter, unit: $(cal/cm^3)^{1/2}$), the value of polarity element $\delta p$ in the Hansen solubility parameters is used. The Hansen solubility parameters are obtained by dividing the solubility parameters introduced by Hildebrand into three components, a dispersion element $\delta d$, a polarity element $\delta p$, and a hydrogen bond element $\delta h$, and expressing the parameters in a three-dimensional space. In the present disclosure, the polarity element $\delta p$ is used. $\delta p$ [$cal/cm^3$] is a dipole-dipole force element in the Hansen solubility parameters, V [$cal/cm^3$] is a molar volume, and $\mu$[D] is a dipole moment. As $\delta p$, the following equation simplified by Hansen and Beerbower is generally used.

$$\delta_p = \frac{37.4\mu}{V^{1/2}}$$

The development accelerator is preferably a hydrophilic polymer compound or a hydrophilic low-molecular-weight compound.

In the present disclosure, “hydrophilic” means that the value of polarity element as an SP value is 6.0 to 26.0, the hydrophilic polymer compound refers to a compound having a molecular weight (weight-average molecular weight in a case where the compound has molecular weight distribution) of 3,000 or more, and the hydrophilic low-molecular-weight compound refers to a compound having a molecular weight (weight-average molecular weight in a case where the compound has molecular weight distribution) of less than 3,000.

Examples of the hydrophilic polymer compound include a cellulose compound and the like. Among these, a cellulose compound is preferable.

Examples of the cellulose compound include cellulose or a compound obtained by modifying at least a part of cellulose (modified cellulose compound). Among these, a modified cellulose compound is preferable.

Preferred examples of the modified cellulose compound include a compound which is obtained by substituting at least some of hydroxy groups of cellulose with at least one kind of group selected from the group consisting of an alkyl group and a hydroxyalkyl group.

The degree of substitution of the compound, which is obtained by substituting at least some of hydroxy groups of cellulose with at least one kind of group selected from the group consisting of an alkyl group and a hydroxyalkyl group, is preferably 0.1 to 6.0, and more preferably 1 to 4.

As the modified cellulose compound, an alkyl cellulose compound or a hydroxyalkyl cellulose compound is preferable, and a hydroxyalkyl cellulose compound is more preferable.

Preferred examples of the alkyl cellulose compound include methyl cellulose.

Preferred examples of the hydroxyalkyl cellulose compound include hydroxypropyl cellulose.

The molecular weight of the hydrophilic polymer compound (weight-average molecular weight in a case where the compound has molecular weight distribution) is preferably 3,000 to 5,000,000, and more preferably 5,000 to 200,000.

Examples of the hydrophilic low-molecular-weight compound include a glycol compound, a polyol compound, an organic amine compound, an organic sulfonic acid compound, an organic sulfamine compound, an organic sulfuric acid compound, an organic phosphonic acid compound, an organic carboxylic acid compound, a betaine compound, and the like. Among these, a polyol compound, an organic sulfonic acid compound, or a betaine compound is preferable.

Examples of the glycol compound include glycols such as ethylene glycol, diethylene glycol, triethylene glycol, propylene glycol, dipropylene glycol, and tripropylene glycol, and ether or ester derivatives of these compounds.

Examples of the polyol compound include glycerin, pentaerythritol, tris(2-hydroxyethyl) isocyanurate, and the like.

Examples of the organic amine compound include triethanolamine, diethanolamine, monoethanolamine, salts of these, and the like.

Examples of the organic sulfonic acid compound include alkyl sulfonic acid, toluene sulfonic acid, benzene sulfonic acid, salts of these, and the like. Among these, for example, alkyl sulfonic acid having an alkyl group having 1 to 10 carbon atoms is preferable.

Examples of the organic sulfamine compound include alkylsulfamic acid, salts thereof, and the like.

Examples of the organic sulfuric acid compound include alkyl sulfate, alkyl ether sulfuric acid, salts of these, and the like.

Examples of the organic phosphonic acid compound include phenylphosphonic acid, salts thereof, and the like.

Examples of the organic carboxylic acid compound include tartaric acid, oxalic acid, citric acid, malic acid, lactic acid, gluconic acid, salts of these, and the like.

Examples of the betaine compound include a phosphobetaine compound, a sulfobetaine compound, a carboxybetaine compound, and the like. Among these, for example, trimethylglycine is preferable.

The molecular weight of the hydrophilic low-molecular-weight compound (weight-average molecular weight in a case where the compound has molecular weight distribution) is preferably 100 or more and less than 3,000, and more preferably 300 to 2,500.

The development accelerator is preferably a compound having a cyclic structure.

The cyclic structure is not particularly limited. Examples thereof include a glucose ring in which at least some of hydroxy groups may be substituted, an isocyanuric ring, an aromatic ring which may have a heteroatom, an aliphatic ring which may have a heteroatom, and the like. Among these, for example, a glucose ring or an isocyanuric ring is preferable.

Examples of the compound having a glucose ring include the aforementioned cellulose compound.

Examples of the compound having an isocyanuric ring include the aforementioned tris(2-hydroxyethyl) isocyanurate and the like.

Examples of the compound having an aromatic ring include the toluene sulfonic acid and benzene sulfonic acid described above, and the like.

Examples of the compound having an aliphatic ring include a compound which is the aforementioned alkyl sulfate and has an alkyl group having a ring structure, and the like.

The compound having a cyclic structure preferably has a hydroxy group.

Preferred examples of the compound having a hydroxy group and a cyclic structure include the aforementioned cellulose compound and the aforementioned tris(2-hydroxyethyl) isocyanurate.

The development accelerator is preferably an onium salt compound.

Examples of the onium salt compound include an ammonium compound, a sulfonium compound, and the like. Among these, an ammonium compound is preferable.

Examples of the development accelerator which is an onium salt compound include trimethylglycine and the like.

The value of polarity element as an SP value of the onium salt compound in the electron-accepting polymerization initiator is not in a range of 6.0 to 26.0. This onium salt compound is not included in the development accelerator.

The image-recording layer may contain only one kind of development accelerator, or two or more kinds of development accelerators may be used in combination.

One of the preferred aspects of the image-recording layer used in the present disclosure is an aspect in which the image-recording layer contains two or more kinds of compounds as a development accelerator.

Specifically, from the viewpoint of on-press developability and receptivity, the image-recording layer used in the present disclosure preferably contains, as a development accelerator, the polyol compound and the betaine compound described above, the betaine compound and the organic sulfonic acid compound described above, or the polyol compound and the organic sulfonic acid compound described above.

The content of the development accelerator with respect to the total mass of the image-recording layer is preferably 0.1% by mass or more and 20% by mass or less, more preferably 0.5% by mass or more and 15% by mass or less, and even more preferably 1% by mass or more and 10% by mass or less.

Other Components

As other components, a surfactant, a polymerization inhibitor, a higher fatty acid derivative, a plasticizer, inorganic particles, an inorganic lamellar compound, and the like can be incorporated into the image-recording layer. Specifically, the description in paragraphs "0114" to "0159" of JP2008-284817A can be referred to.

Formation of Image-Recording Layer

The image-recording layer in the lithographic printing plate precursor according to the present disclosure can be formed, for example, by preparing a coating liquid by dispersing or dissolving the necessary components described above in a known solvent, coating a support with the coating liquid by a known method such as bar coating, and drying the coating liquid, as described in paragraphs "0142" and "0143" of JP2008-195018A. The coating amount (solid content) of the image-recording layer after coating and drying varies with uses, but is preferably 0.3 $g/m^2$ to 3.0 $g/m^2$. In a case where the coating amount is in this range, excellent sensitivity and excellent film characteristics of the image-recording layer are obtained.

As the solvent, known solvents can be used. Specific examples thereof include water, acetone, methyl ethyl ketone (2-butanone), cyclohexane, ethyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetylacetone, cyclohexanone, diacetone alcohol, ethylene glycol monomethyl ether acetate, ethylene glycol ethyl ether acetate, ethylene glycol monoisopropyl ether, ethylene glycol monobutyl ether acetate, 1-methoxy-2-propanol, 3-methoxy-1-propanol, methoxy methoxyethanol, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 3-methoxypropyl acetate, N,N-dimethylformamide, dimethyl sulfoxide, γ-butyrolactone, methyl lactate, ethyl lactate, and the like. Only one solvent may be used, or two or more solvents may be used in combination. The concentration of solid contents in the coating liquid is preferably 1% by mass to 50% by mass.

The coating amount (solid content) of the image-recording layer after coating and drying varies with uses. However, from the viewpoint of obtaining excellent sensitivity and excellent film characteristics of the image-recording layer, the coating amount is preferably 0.3 $g/m^2$ to 3.0 $g/m^2$.

The film thickness of the image-recording layer in the lithographic printing plate precursor according to the present disclosure is preferably 0.1 μm to 3.0 μm, and more preferably 0.3 μm to 2.0 μm.

In the present disclosure, the film thickness of each layer in the lithographic printing plate precursor is checked by preparing a slice by cutting the lithographic printing plate precursor in a direction perpendicular to the surface of the precursor and observing the cross section of the slice with a scanning electron microscope (SEM).

Support

The lithographic printing plate precursor according to the present disclosure has a support.

The support to be used can be appropriately selected from known supports for a lithographic printing plate precursor.

The support is preferably a support having a hydrophilic surface (hereinafter, also called "hydrophilic support").

As the support in the present disclosure, an aluminum plate is preferable which has been roughened using a known method and has undergone an anodization treatment. That is, the support in the present disclosure preferably has an aluminum plate and an aluminum anodic oxide film disposed on the aluminum plate.

In addition, it is preferable that the support has an aluminum plate and an anodic oxide film of aluminum disposed on the aluminum plate, the anodic oxide film is at a position closer to the image-recording layer than the aluminum plate is and has micropores extending in a depth direction from the surface of the anodic oxide film on the image-recording layer side, and the average diameter of the micropores within the surface of the anodic oxide film is more than 10 nm and 100 nm or less.

Furthermore, it is preferable that the micropores are each configured with a large diameter portion that extends to a position at a depth of 10 nm to 1,000 nm from the surface of the anodic oxide film and a small diameter portion that is in communication with a bottom portion of the large diameter portion and extends to a position at a depth of 20 nm to 2,000 nm from a communicate position, an average diameter of the large diameter portion within the surface of the anodic oxide film is preferably 15 nm to 100 nm, and an average diameter of the small diameter portion at the communicate position is preferably 13 nm or less.

FIG. 1 is a schematic cross-sectional view of an embodiment of an aluminum support 12*a*.

The aluminum support 12*a* has a laminated structure in which an aluminum plate 18 and an anodic oxide film 20*a* of aluminum (hereinafter, also simply called "anodic oxide film 20*a*") are laminated in this order. The anodic oxide film 20*a* in the aluminum support 12*a* is positioned such that the anodic oxide film 20*a* is closer to the image-recording layer side than the aluminum plate 18. That is, it is preferable that the lithographic printing plate precursor according to the present disclosure have at least an anodic oxide film, an image-recording layer, and a water-soluble resin layer in this order on an aluminum plate.

Anodic Oxide Film

Hereinafter, preferred aspects of the anodic oxide film 20*a* will be described.

The anodic oxide film 20*a* is a film prepared on a surface of the aluminum plate 18 by an anodization treatment. This film has uniformly distributed ultrafine micropores 22*a* approximately perpendicular to the surface of the film. The micropores 22*a* extend from a surface of the anodic oxide film 20*a* on the image-recording layer side (a surface of the anodic oxide film 20*a* opposite to the aluminum plate 18 side) along the thickness direction (toward the aluminum plate 18 side).

The average diameter (average opening diameter) of the micropores 22*a* on the surface of the anodic oxide film 20*a* is preferably more than 10 nm and 100 nm or less. Particularly, from the viewpoint of balance between printing durability, antifouling properties, and image visibility, the average diameter of the micropores 22*a* is more preferably 15 nm to 60 nm, even more preferably 20 nm to 50 nm, and particularly preferably 25 nm to 40 nm. The internal diameter of the pores may be larger or smaller than the pore diameter within the surface layer.

In a case where the average diameter is more than 10 nm, printing durability and image visibility are excellent. In addition, in a case where the average diameter is 100 nm or less, printing durability is excellent.

The average diameter of the micropores 22*a* is a value determined by observing the surface of the anodic oxide film 20*a* with a field emission scanning electron microscope (FE-SEM) at 150,000× magnification (N=4), measuring the size (diameter) of 50 micropores existing in a range of 400 nm×600 nm in the obtained 4 images, and averaging the measured sizes.

In a case where the shape of the micropores 22*a* is not circular, the equivalent circular diameter is used. "Equivalent circular diameter" is a diameter determined on an assumption that the opening portion is in the form of a circle having the same projected area as the projected area of the opening portion.

The shape of the micropores 22*a* is not particularly limited. In FIG. 1, the micropores 22*a* have a substantially straight tubular shape (substantially cylindrical shape). However, the micropores 22*a* may have a conical shape that tapers along the depth direction (thickness direction). In addition, the shape of the bottom portion of the micropores 22*a* is not particularly limited, and may be a curved (convex) or flat surface shape.

In the support, the micropores may be each composed of a large diameter portion that extends to a position at a certain depth from the surface of the anodic oxide film and a small diameter portion that is in communication with a bottom portion of the large diameter portion and extends to a position at a certain depth from the communicate position.

Figure 2:
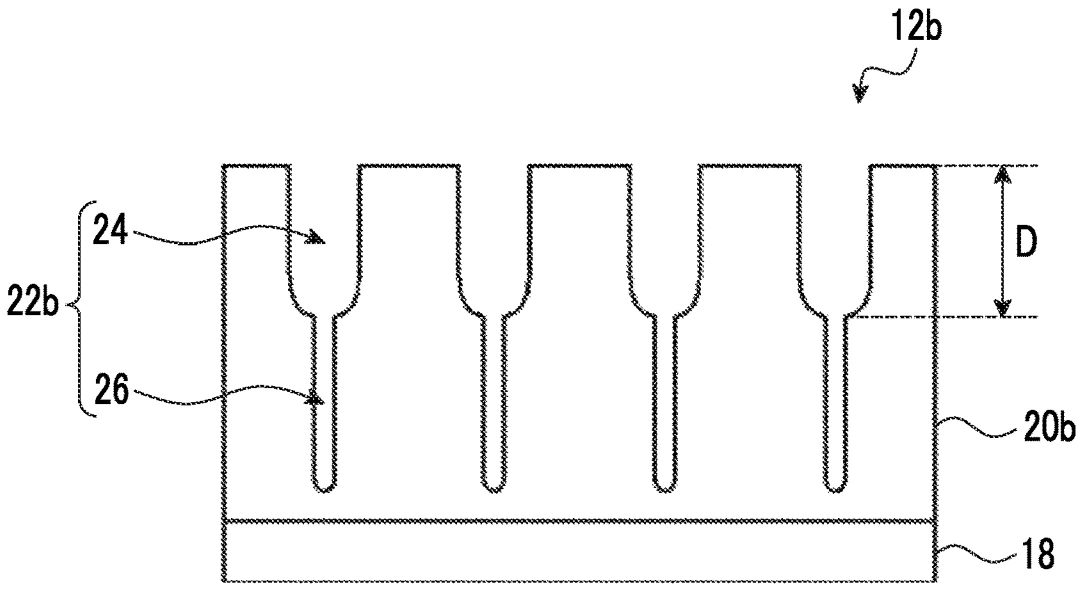
FIG. 2 is a schematic cross-sectional view of another embodiment of a support.

For example, as shown in FIG. 2, an aspect may be adopted in which an aluminum support 12*b* includes an aluminum plate 18 and an anodic oxide film 20*b* having micropores 22*b* each composed of a large diameter portion 24 and a small diameter portion 26.

For example, the micropores 22*b* in the anodic oxide film 20*b* are each composed of the large diameter portion 24 that extends to a position at a depth of 10 nm to 1,000 nm (depth D: see FIG. 2) from the surface of the anodic oxide film and the small diameter portion 26 that is in communication with the bottom portion of the large diameter portion 24 and further extends from the communicate position to a position at a depth of 20 nm to 2,000 nm. Specifically, for example, it is possible to use the aspect described in paragraphs "0107" to "0114" of JP2019-162855A.

Manufacturing Method of Support

As a manufacturing method of the support used in the present disclosure, for example, a manufacturing method is preferable in which the following steps are sequentially performed.

Roughening treatment step: step of performing roughening treatment on aluminum plate Anodization treatment step: step of subjecting aluminum plate having undergone roughening treatment to anodic oxidation Pore widening treatment step: step of bringing aluminum plate having anodic oxide film obtained by anodization treatment step into contact with aqueous acid solution or aqueous alkali solution such that diameter of micropores in anodic oxide film increases Hereinafter, the procedure of each step will be specifically described.

Roughening Treatment Step

The roughening treatment step is a step of performing a roughening treatment including an electrochemical roughening treatment on the surface of the aluminum plate. This step is preferably performed before the anodization treatment step which will be described later. However, in a case where the surface of the aluminum plate already has a preferable shape, the roughening treatment step may not be performed. This step can be carried out by the method described in paragraphs “0086” to “0101” of JP2019-162855A.

Anodization Treatment Step

The procedure of the anodization treatment step is not particularly limited as long as the aforementioned micropores can be obtained. Examples thereof include known methods.

In the anodization treatment step, an aqueous solution of sulfuric acid, phosphoric acid, oxalic acid, or the like can be used as an electrolytic cell. For example, the concentration of sulfuric acid is 100 g/L to 300 g/L.

The conditions of the anodization treatment are appropriately set depending on the electrolytic solution used. For example, the liquid temperature is 5° C. to 70° C. (preferably 10° C. to 60° C.), the current density is 0.5 A/$dm^2$ to 60 A/$dm^2$ (preferably 1 A/$dm^2$ to 60 A/$dm^2$), the voltage is 1 V to 100 V (preferably 5 V to 50 V), the electrolysis time is 1 second to 100 seconds (preferably 5 seconds to 60 seconds), and the film amount is 0.1 g/$m^2$ to 5 g/$m^2$ (preferably 0.2 g/$m^2$ to 3 g/$m^2$).

Pore Widening Treatment

The pore widening treatment is a treatment of enlarging the diameter of micropores (pore diameter) present in the anodic oxide film formed by the aforementioned anodization treatment step (pore diameter enlarging treatment).

The pore widening treatment can be carried out by bringing the aluminum plate obtained by the aforementioned anodization treatment step into contact with an aqueous acid solution or an aqueous alkali solution. The contact method is not particularly limited, and examples thereof include a dipping method and a spraying method.

As necessary, the support may have a backcoat layer on the side opposite to the image-recording layer, the backcoat layer containing the organic polymer compound described in JP1993-045885A (JP-H5-45885A) or the alkoxy compound of silicon described in JP1994-035174A (JP-H6-35174A).

Undercoat Layer

The lithographic printing plate precursor according to the present disclosure preferably has an undercoat layer (also called interlayer in some cases) between the image-recording layer and the support. The undercoat layer enhances the adhesiveness between the support and the image-recording layer in an exposed portion, and enables the image-recording layer to be easily peeled from the support in a non-exposed portion. Therefore, the undercoat layer inhibits the deterioration of printing durability and contributes to the improvement of developability. In addition, in the case of exposure to infrared laser, the undercoat layer functions as a heat insulating layer and thus brings about an effect of preventing sensitivity reduction resulting from the diffusion of heat generated by exposure to the support.

Examples of compounds that are used in the undercoat layer include polymers having adsorbent groups that can be adsorbed onto the surface of the support and hydrophilic groups. In order to improve adhesiveness to the image-recording layer, it is preferable that polymers having adsorbent groups and hydrophilic groups further have crosslinkable groups. The compounds that are used in the undercoat layer may be low-molecular-weight compounds or polymers. As necessary, as the compounds that are used in the undercoat layer, two or more compounds may be used by being mixed together.

In a case where the compound used in the undercoat layer is a polymer, a copolymer of a monomer having an adsorbent group, a monomer having a hydrophilic group, and a monomer having a crosslinkable group is preferable.

As the adsorbent group that can be adsorbed onto the surface of the support, a phenolic hydroxy group, a carboxy group, $—PO_3H_2$, $—OPO_3H_2$, $—CONHSO_2—$, $—SO_2NHSO_2—$, and $—COCH_2COCH_3$ are preferable. As the hydrophilic groups, a sulfo group or salts thereof and salts of a carboxy group are preferable. As the crosslinking groups, an acryl group, a methacryl group, an acrylamide group, a methacrylamide group, an allyl group, and the like are preferable. The polymer may have a crosslinking group introduced by the formation of a salt of a polar substituent of the polymer and a compound that has a substituent having charge opposite to that of the polar substituent and an ethylenically unsaturated bond, or may be further copolymerized with monomers other than the monomers described above and preferably with hydrophilic monomers.

Specifically, for example, silane coupling agents having addition polymerizable ethylenic double bond reactive groups described in JP1998-282679A (JP-H10-282679A) and phosphorus compounds having ethylenic double bond reactive groups described in JP1990-304441A (JP-H02-304441A) are suitable. The low-molecular-weight compounds or polymer compounds having crosslinking groups (preferably ethylenically unsaturated bonding groups), functional groups that interact with the surface of the support, and hydrophilic groups described in JP2005-238816A, JP2005-125749A, JP2006-239867A, and JP2006-215263A are also preferably used.

For example, the high-molecular-weight polymers having adsorbent groups that can be adsorbed onto the surface of the support, hydrophilic groups, and crosslinkable groups described in JP2005-125749A and JP2006-188038A are more preferable.

The content of ethylenically unsaturated bonding group in the polymer used in the undercoat layer is preferably 0.1 mmol to 10.0 mmol per gram of the polymer, and more preferably 0.2 mmol to 5.5 mmol per gram of the polymer.

The weight-average molecular weight (Mw) of the polymer used in the undercoat layer is preferably 5,000 or more and more preferably 10,000 to 300,000.

In order to prevent contamination with the passage of time, the undercoat layer may contain, in addition to the compounds for the undercoat layer described above, a chelating agent, a secondary or tertiary amine, a polymerization inhibitor, a compound having an amino group or a functional group capable of inhibiting polymerization and a group that interacts with the surface of the support (for example, 1,4-diazabicyclo[2.2.2]octane (DABCO), 2,3,5,6-tetrahydroxy-p-quinone, chloranil, sulfophthalic acid, hydroxyethyl ethylenediaminetriacetic acid, dihydroxyethyl ethylenediaminediacetic acid, hydroxyethyl iminodiacetic acid, and the like), and the like.

The undercoat layer is formed by known coating methods. The coating amount (solid content) of the undercoat layer is preferably 0.1 mg/$m^2$ to 100 mg/$m^2$ and more preferably 1 mg/$m^2$ to 30 mg/$m^2$.

Outermost Layer

The lithographic printing plate precursor according to the present disclosure may have an outermost layer (also called "protective layer" or "overcoat layer" in some cases) on a surface of the image-recording layer that is opposite to the support side.

It is preferable that the lithographic printing plate precursor according to the present disclosure have a support, an image-recording layer, and an outermost layer in this order.

The outermost layer may have a function of suppressing the reaction inhibiting image formation by blocking oxygen, a function of preventing the damage of the image-recording layer, and a function of preventing ablation during exposure to high-illuminance lasers.

As the outermost layer, a well-known outermost layer ("protective layer" or "overcoat layer") in an on-press development type lithographic printing plate precursor can be used. Specifically, as the outermost layer, the outermost layer described in paragraphs "0444" to "0462" of WO2022/019217A can be suitably used.

The lithographic printing plate precursor according to the present disclosure may have other layers in addition to those mentioned above.

Known layers can be adopted as those other layers without particular limitations. For example, as necessary, a backcoat layer may be provided on a surface of the support that is opposite to the image-recording layer side.

Method of Preparing Lithographic Printing Plate and Lithographic Printing Method It is possible to prepare a lithographic printing plate by performing image exposure and a development treatment on the lithographic printing plate precursor according to the present disclosure.

The method of preparing a lithographic printing plate according to the present disclosure preferably includes a step of exposing the on-press development type lithographic printing plate precursor according to the present disclosure in the shape of an image (hereinafter, this step will be also called "exposure step") and a step of removing the image-recording layer in a non-image area by supplying at least one material selected from the group consisting of a printing ink and dampening water on a printer (hereinafter, this step will be also called "on-press development step").

The lithographic printing method according to the present disclosure preferably includes a step of exposing the on-press development type lithographic printing plate precursor according to the present disclosure in the shape of an image (exposure step), a step of removing the image-recording layer in a non-image area on a printer by supplying at least one material selected from the group consisting of a printing ink and dampening water such that a lithographic printing plate is prepared (on-press development step), and a step of performing printing using the obtained lithographic printing plate (printing step).

The method of preparing a lithographic printing plate according to the present disclosure preferably includes a step of exposing an on-press development type lithographic printing plate precursor to an infrared laser in the shape of an image and a step of removing an image-recording layer in a non-image area by supplying at least one material selected from the group consisting of printing ink and dampening water on a printer, in which the on-press development type lithographic printing plate precursor preferably has a support and an image-recording layer on the support, the image-recording layer preferably contains an infrared absorber capable of donating electrons to the aforementioned initiator and a color forming substance precursor, and in a case where the image-recording layer is exposed to an infrared laser with a wavelength of 830 nm at an energy density of 110 $mJ/cm^2$, a brightness change $\Delta L$ of the image-recording layer before and after the exposure is preferably 3.0 or more.

Furthermore, the method of preparing a lithographic printing plate according to the present disclosure preferably includes a step of exposing an on-press development type lithographic printing plate precursor to an infrared laser in the shape of an image and a step of removing an image-recording layer in a non-image area by supplying at least one material selected from the group consisting of printing ink or dampening water on a printer, in which the on-press development type lithographic printing plate precursor has a support and an image-recording layer on the support, the image-recording layer preferably contains an initiator, an infrared absorber, and a color forming substance precursor, and the image-recording layer preferably satisfies Expression L.

$$2.0 \leq L1-L0 \quad \text{Expression L}$$

In Expression L, L1 represents visibility of the image-recording layer, L0 represents the visibility of the image-recording layer from which the aforementioned color forming substance precursor has been removed.

Furthermore, regarding the lithographic printing method according to the present disclosure, for example, it is preferable that each of the above aspects include an aspect in which the lithographic printing method further includes the printing step described above.

Hereinafter, regarding the method of preparing a lithographic printing plate according to the present disclosure and the lithographic printing method according to the present disclosure, preferred aspects of each step will be described in order. Note that the lithographic printing plate precursor according to the present disclosure can also be developed using a developer.

Hereinafter, the exposure step and the on-press development step in the method of preparing a lithographic printing plate will be described. The exposure step in the method of preparing a lithographic printing plate according to the present disclosure is the same step as the exposure step in the lithographic printing method according to the present disclosure. Furthermore, the on-press development step in the method of preparing a lithographic printing plate according to the present disclosure is the same step as the on-press development step in the lithographic printing method according to the present disclosure.

Exposure Step

The method of preparing a lithographic printing plate according to the present disclosure preferably includes an exposure step of exposing the lithographic printing plate precursor according to the present disclosure in the shape of an image such that an exposed portion and a non-exposed portion are formed. The lithographic printing plate precursor according to the present disclosure is preferably exposed to a laser through a transparent original picture having a linear image, a halftone dot image, or the like or exposed in the shape of an image by laser light scanning according to digital data, or the like.

The wavelength of a light source to be used is preferably 750 nm to 1,400 nm. As the light source having a wavelength of 750 nm to 1,400 nm, a solid-state laser or a semiconductor laser that radiates infrared rays is suitable. In a case where an infrared laser is used, the output is preferably 100 mW or higher, the exposure time per pixel is preferably 20 microseconds or less, and the amount of irradiation energy is preferably 10 $mJ/cm^2$ to 300 $mJ/cm^2$. In addition, in order to shorten the exposure time, a multibeam laser device is preferably used. The exposure mechanism may be any of an inner surface drum method, an external surface drum method, a flat head method, or the like.

The image exposure can be carried out by a common method using a platesetter or the like. In the case of on-press development, image exposure may be carried out on a printer after the lithographic printing plate precursor is mounted on the printer.

On-Press Development Step

The method of preparing a lithographic printing plate according to the present disclosure preferably includes an on-press development step of removing the image-recording layer in a non-image area by supplying at least one selected from the group consisting of printing ink and dampening water on a printer.

Hereinafter, the on-press development method will be described.

On-Press Development Method

In the on-press development method, the lithographic printing plate precursor having undergone image exposure is preferably supplied with an oil-based ink and an aqueous component on a printer such that the image-recording layer in a non-image area is removed and a lithographic printing plate is prepared.

That is, in a case where the lithographic printing plate precursor is subjected to image exposure and then mounted as it is on a printer without being subjected to any development treatment, or the lithographic printing plate precursor is mounted on a printer and then subjected to image exposure on the printer, and then an oil-based ink and an aqueous component are supplied to perform printing, at the initial stage in the middle of printing, in a non-image area, by either or both of the supplied oil-based ink and the aqueous component, a non-cured image-recording layer is dissolved or dispersed to remove, and the hydrophilic surface is exposed in the non-image area. Meanwhile, the image-recording layer cured by exposure forms an oil-based ink-receiving area having a lipophilic surface in the exposed portion. What is supplied first to the precursor surface may be any of the oil-based ink or the aqueous component. However, in view of preventing the plate from being contaminated by the components of the image-recording layer from which aqueous components are removed, it is preferable that the oil-based ink be supplied first. In the manner described above, the lithographic printing plate precursor is subjected to on-press development on a printer and used as it is for printing a number of sheets. As the oil-based ink and the aqueous component, ordinary printing ink and ordinary dampening water for lithographic printing are suitably used.

As the laser used for performing image exposure on the lithographic printing plate precursor according to the present disclosure, a light source having a wavelength of 300 nm to 450 nm or 750 nm to 1,400 nm is preferably used. A light source of 300 nm to 450 nm is preferable for a lithographic printing plate precursor including an image-recording layer containing sensitizing dye having maximum absorption in such a wavelength range. As the light source of 750 nm to 1,400 nm, those described above are preferably used. As the light source of 300 nm to 450 nm, a semiconductor laser is suitable.

Printing Step

The lithographic printing method according to the present disclosure includes a printing step of printing a recording medium by supplying a printing ink to the lithographic printing plate.

The printing ink is not particularly limited, and various known inks can be used as desired. In addition, preferred examples of the printing ink include oil-based ink or ultraviolet-curable ink (UV ink).

In the printing step, as necessary, dampening water may be supplied.

Furthermore, the printing step may be successively carried out after the on-press development step without stopping the printer.

The recording medium is not particularly limited, and a known recording medium can be used as desired.

In the method of preparing a lithographic printing plate from the lithographic printing plate precursor according to the present disclosure and in the lithographic printing method according to the present disclosure, as necessary, the entire surface of the lithographic printing plate precursor may be heated before exposure, in the middle of exposure, or during a period of time from exposure to development. In a case where the lithographic printing plate precursor is heated as above, an image-forming reaction in the image-recording layer is accelerated, which can result in advantages such as improvement of sensitivity and printing durability, stabilization of sensitivity, and the like. Heating before development is preferably carried out under a mild condition of 150° C. or lower. In a case where this aspect is adopted, it is possible to prevent problems such as curing of a non-image area. For heating after development, it is preferable to use an extremely severe condition which is preferably in a range of 100° C. to 500° C. In a case where this aspect is adopted, a sufficient image-strengthening action is obtained, and it is possible to inhibit problems such as the deterioration of the support or the thermal decomposition of the image area.

Compound represented by Formula (1b) and compound represented by Formula (2a) Both the compound represented by Formula (1b) and the compound represented by Formula (2a), which have been described above, are novel compounds and can be suitably used as a color forming agent precursor.

The details and preferred embodiments of the compound represented by Formula (1b) and the compound represented by Formula (2a) as the novel compounds are the same as the details and preferred embodiments of the compound represented by Formula (1b) and the compound represented by Formula (2a) in the color forming composition used for the image-recording layer in the lithographic printing plate precursor according to the present disclosure, which have been described above.

EXAMPLES

Hereinafter, the present disclosure will be described in detail with reference to examples, but the present disclosure is not limited thereto. In the present examples, unless otherwise specified, "%" and "part" mean "% by mass" and "part by mass" respectively. Unless otherwise described, the molecular weight of a high-molecular-weight compound is a weight-average molecular weight (Mw), and the ratio of repeating structural units of a polymer compound is expressed as molar percentage. In addition, the weight-average molecular weight (Mw) is a polystyrene-equivalent molecular weight measured by gel permeation chromatography (GPC).

Synthesis of specific compound Synthesis examples of the specific compound will be shown below. The structure identification of the specific compound and the intermediates until the specific compound was obtained was performed by NMR in all cases.

Synthesis of Compound C-1

Synthesis of Aldehyde Form

First, an aldehyde form was obtained as follows.

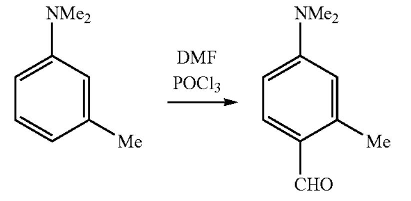 [SMILES: Cc1cccc(N(C)C)c1 ; Cc1cc(N(C)C)ccc1C=O]

12.0 g (88.8 mmol) of N,N-dimethyl-m-toluidine was dissolved in 135 mL of N,N-dimethylformamide, 24.5 g (160 mmol; 1.8 eq.) of phosphorus oxychloride was slowly added dropwise thereto in an ice bath, and the mixture was allowed to react at room temperature overnight. The reaction solution was slowly added to 900 mL of water, stirred at room temperature for 1 hour, and neutralized with a 2 mol/L NaOH aqueous solution to adjust the pH to 9, and the precipitated solid was collected by filtration and washed with water. The mixture was purified by silica gel column chromatography (Hexane-EtOAc; TLC Rf=0.33 (Hexane-EtOAc 4:1)), suspended and washed with hexane, and dried under reduced pressure (70° C.), thereby obtaining a white solid of an aldehyde form (9.1 g). The yield was 63%.

$^{1}$H NMR ($CDCl_3$) δ: 2.62 (s, 3H), 3.07 (s, 6H), 6.43 (d, J=2.4 Hz, 1H), 6.57 (dd, J=2.4 and 8.8 Hz, 1H), 7.66 (d, J=8.8 Hz, 1H), 9.98 (s, 1H).

$^{13}$C NMR ($CDCl_3$) δ: 20.37, 39.97, 108.78, 113.36, 123.33, 134.56, 142.80, 153.47, 190.42.

Synthesis of Phthalide Form

Subsequently, phthalide form was obtained in the following manner.

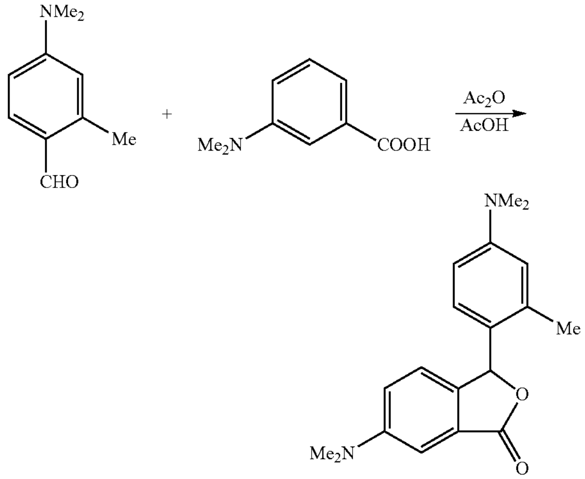

6.0 g (36.8 mmol) of an aldehyde form, 6.07 g (36.8 mmol) of 3-dimethylaminobenzoic acid, 6.0 mL of acetic anhydride, and 2 mL of acetic acid were mixed and reacted at 120° C. for 5 hours. The reaction solution was slowly added to 100 mL of water, and 5.0 g of a white solid of phthalide form was obtained by being extracted with ethyl acetate (EtOAc), washed with brine (salt water), dried over $MgSO_4$, concentrated under reduced pressure, purified with silica gel column chromatography (Hexane-EtOAc; TLC $R_f$=0.44 (Hexane-EtOAc 2:1)), suspended and washed with hexane, and dried under reduced pressure (70° C.). The yield was 44%.

$^{1}$H NMR ($CDCl_3$) δ: 2.42 (s, 3H), 2.94 (s, 3H), 3.04 (s, 3H), 6.43 (dd, J=2.4 and 8.8 Hz, 1H), 6.55 (s, 1H), 6.57 (d, J=2.4 Hz, 1H), 6.78 (d, J=8.8 Hz, 1H), 7.02 (dd, J=2.4 and 8.8 Hz, 1H), 7.16-7.18 (m, 2H).

$^{13}$C NMR ($CDCl_3$) δ: 19.81, 40.32, 40.72, 81.13, 106.74, 109.68, 114.36, 118.70, 122.18, 123.45, 127.97, 128.82, 137.02, 138.75, 150.95, 151.23, 171.85.

Synthesis of Benzoyl Benzoate Form

Subsequently, a benzoyl benzoate form was obtained in the following manner.

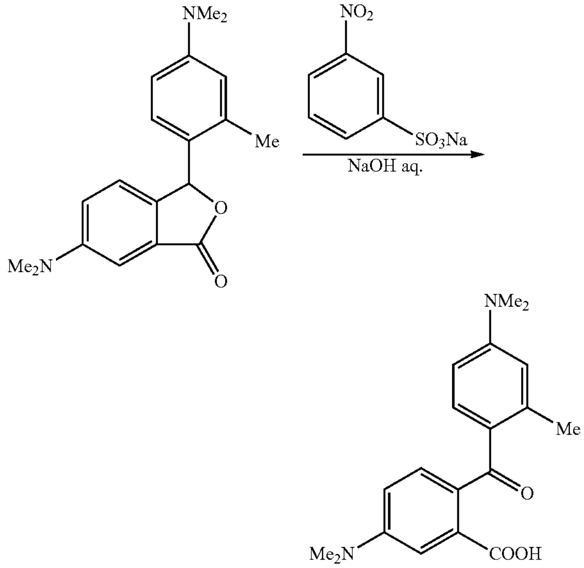

3.0 g (9.7 mmol) of a Phthalide form and 12 mL of a 10% by mass NaOH aqueous solution were mixed and stirred at 90° C. for 1 hour to be completely dissolved. 2.8 g (13 mmol; 1.3 eq.) of sodium 3-nitrobenzenesulfonate was added thereto, and the mixture was allowed to react at 115° C. for 40 hours. After allowing to cool, 6 mL of a 50% by mass acetic acid aqueous solution was added thereto, and the mixture was stirred at room temperature for 45 minutes, and then solids were collected by filtration. The obtained solid was dissolved in 50 mL of a saturated sodium carbonate aqueous solution, insoluble matters were filtered off, and then acetic acid was added to adjust the pH to 5 to 6. The generated solid was collected by filtration and crystallized from MeOH, thereby obtaining 1.34 g of a light yellow solid of a benzoyl benzoate form. The yield was 42%.

$^{1}$H NMR (DMSO-d6) δ: 2.42 (s, 3H), 2.97 (s, 6H), 3.00 (s, 6H), 6.45 (dd, J=2.4 and 8.8 Hz, 1H), 6.56 (d, J=2.4 Hz, 1H), 6.81 (dd, J=2.4 and 8.8 Hz, 1H), 6.95 (d, J=2.8 Hz, 1H), 7.05 (d, J=8.8 Hz, 1H), 7.16 (d, J=8.8 Hz, 1H), 12.64 (s, 1H).

$^{13}$C NMR (DMSO-d6) δ: 22.21, 40.05, 40.26, 108.19, 111.96, 113.13, 114.51, 126.11, 129.62, 130.79, 133.77, 134.61, 140.94, 151.19, 152.24, 169.66, 196.12.

Synthesis of 1-butyl-2-methylindole

Subsequently, 1-butyl-2-methylindole was obtained in the following manner.

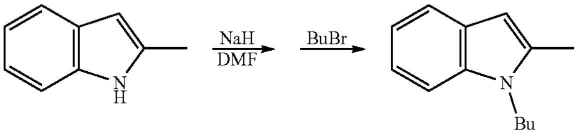

10.0 g (76.2 mmol) of 2-methylindole was dissolved in 191 mL of N,N-dimethylformamide, 3.66 g (91.5 mmol; 1.2 eq.) of hydrogenated sodium (60% in oil) was slowly added thereto in an ice bath, and the mixture was stirred at room temperature for 30 minutes. In an ice bath, 12.5 g (91.5 mmol; 1.2 eq.) of 1-bromobutane was slowly added drop-wise thereto, and the mixture was allowed to react at room temperature for 2 hours. 190 mL of water was slowly added thereto, 190 mL of EtOAc was added thereto, followed by separation, extraction of an aqueous layer with 190 mL of EtOAc, and washing of combined organic layer with 200 mL of water repeated three times. The organic layer was washed with 200 mL of brine, dried over $MgSO_4$, concentrated under reduced pressure, and then purified by silica gel column chromatography (Hexane-EtOAc; TLC $R_f$=0.79 (Hexane-EtOAc 4:1)), thereby obtaining 14.1 g of transparent oil of 1-butyl-2-methylindole. The yield was 99%.

$^1$H NMR ($CDCl_3$) δ: 0.95 (t, J=7.6 Hz, 3H), 1.38 (sextet, J=7.6 Hz, 2H), 1.69-1.76 (m, 2H), 2.42 (d, J=0.8 Hz, 1H), 4.05 (t, J=7.6 Hz, 2H), 6.23 (s, 1H), 7.04 (dt, J=1.2 and 6.8 Hz, 1H), 7.12 (dt, J=1.2 and 6.8 Hz, 1H), 7.25-7.27 (m, 1H), 7.51 (dd, J=0.8 and 8.0 Hz, 1H).

$^{13}$C NMR ($CDCl_3$) δ: 12.79, 13.87, 20.30, 32.33, 42.96, 99.73, 108.98, 119.06, 119.61, 120.25, 128.00, 136.34, 136.58.

Synthesis of Compound C-1

Subsequently, a compound C-1, which was a compound represented by Formula (1), was obtained in the following manner.

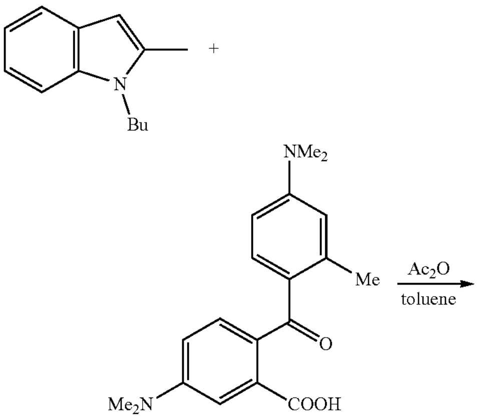

-continued

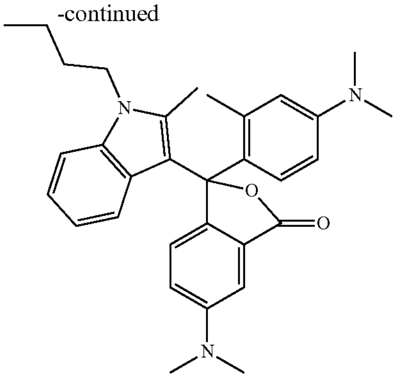

C-1

0.50 g (2.7 mmol) of 1-butyl-2-methylindole and 0.96 g (2.9 mmol; 1.1 eq.) of a benzoyl benzoate form were mixed with 5.0 mL of toluene, and heated to 90° C., 0.38 mL (4.0 mmol; 1.5 eq.) of acetic anhydride was added thereto, and the mixture was allowed to react at 90° C. for 5 hours. The mixture was cooled to 80° C., 1.35 mL of water was added thereto, and the mixture was stirred while being cooled to room temperature. A 1 mol/L NaOH aqueous solution was added thereto to adjust the pH to 12, the organic layer was washed with water, washed with brine, dried over $MgSO_4$, concentrated under reduced pressure, purified by silica gel column chromatography (Hexane-EtOAc; TLC $R_f$=0.31 (Hexane-EtOAc 2:1)), suspended and washed with hexane, and dried under reduced pressure (70° C.), thereby obtaining 0.975 g of a white solid of the compound C-1. The yield was 74%.

The HPLC purity was 99.705 area % (254 nm).

$^1$H NMR (DMSO-d6) δ: 0.86 (t, J=7.2 Hz, 3H), 1.24 (sextet, J=7.6 Hz, 2H), 1.51-1.58 (m, 2H), 2.03 (s, 6H), 2.88 (s, 6H), 2.96 (s, 6H), 4.07 (t, J=7.2 Hz, 2H), 6.45 (dd, J=2.8 and 8.8 Hz, 1H), 6.58 (d, J=2.4 Hz, 1H), 6.80 (t, J=7.2 Hz, 1H), 6.92-7.02 (m, 4H), 7.10 (dd, J=2.4 and 8.8 Hz, 1H), 7.28 (d, J=8.8 Hz, 1H), 7.36 (d, J=8.0 Hz, 1H).

$^{13}$C NMR (DMSO-d6) δ: 10.16, 13.11, 18.82, 20.43, 31.16, 39.18, (39.55), 90.72, 104.71, 107.76, 108.91, 110.85, 115.16, 118.33, 118.35, 118.43, 119.77, 124.09, 124.36, 125.18, 126.37, 127.12, 131.79, 135.05, 138.30, 140.12, 149.64, 150.25, 169.80.

Synthesis of Compound C-2

Synthesis of 1-butyl-5-methoxy-2-methylindole

First, 1-butyl-5-methoxy-2-methylindole was obtained in the following manner.

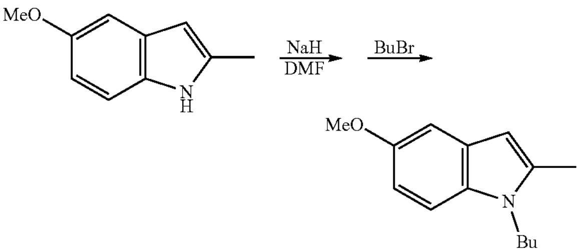

2.0 g (12.4 mmol) of 5-methoxy-2-methylindole was added to 31.0 mL of N,N-dimethylformamide, 0.60 g (14.9 mmol; 1.2 eq.) of hydrogenated sodium (60% in oil) was slowly added thereto in an ice bath, and the mixture was stirred at room temperature for 30 minutes. In an ice bath, 2.04 g (14.9 mmol; 1.2 eq.) of 1-bromobutane was slowly added dropwise thereto, and the mixture was allowed to react at room temperature for 2 hours. 31 mL of water was slowly added thereto, 31 mL of EtOAc was added thereto, followed by separation, extraction of an aqueous layer with 31 mL of EtOAc, and washing of combined organic layer with 31 mL of water repeated three times. The organic layer was washed with 31 mL of brine, dried over $MgSO_4$, concentrated under reduced pressure, and then purified by silica gel column chromatography (Hexane-EtOAc; TLC $R_f$=0.77 (Hexane-EtOAc 4:1)), thereby obtaining 2.23 g of transparent oil of 1-butyl-5-methoxy-2-methylindole. The yield was 83%.

$^1$H NMR ($CDCl_3$) δ: 0.94 (t, J=7.6 Hz, 3H), 1.36 (sextet, J=7.6 Hz, 2H), 1.67-1.74 (m, 2H), 2.39 (d, J=0.4 Hz, 3H), 3.84 (s, 3H), 4.01 (t, J=7.6 Hz, 2H), 6.15 (s, 1H), 6.78 (dd, J=2.4 and 8.8 Hz, 1H), 7.00 (d, J=2.4 Hz, 1H), 7.14 (d, J=8.8 Hz, 1H).

$^{13}$C NMR ($CDCl_3$) δ: 12.83, 13.87, 20.29, 32.39, 43.08, 55.92, 99.42, 101.85, 109.60, 110.09, 128.31, 131.91, 136.96, 153.83.

Synthesis of Compound C-2

Subsequently, a compound C-2, which was a compound represented by Formula (1), was obtained in the following manner.

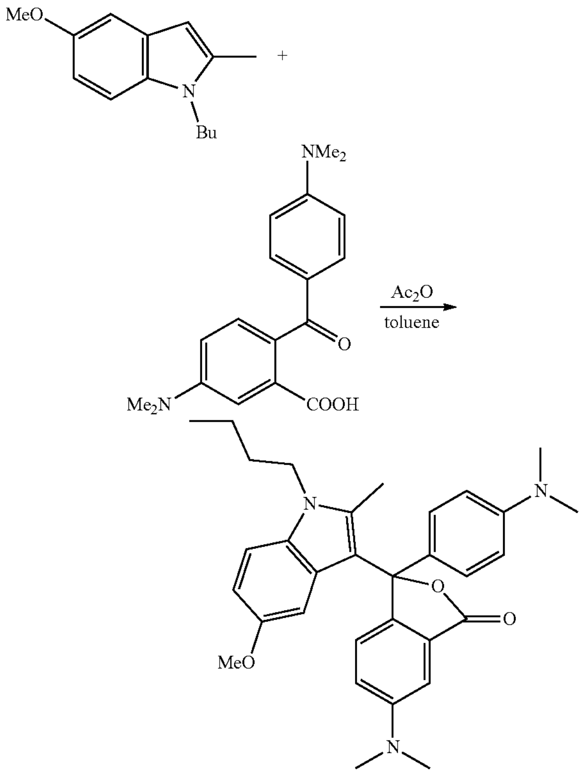

C-2

0.65 g (3.0 mmol) of 1-butyl-5-methoxy-2-methylindole and 1.0 g (3.3 mmol; 1.1 eq.) of 2-[p-(dimethylamino) benzoyl]-5-(dimethylamino)benzoic acid (MH-BCA) were mixed with toluene: 6.5 mL, heated to 90° C., 0.42 mL (4.5 mmol; 1.5 eq.) of acetic anhydride was added thereto, and the mixture was reacted at 90° C. for 100 minutes. The mixture was cooled to 80° C., 1.39 mL of water was added thereto, and the mixture was stirred while being cooled to room temperature. A 1 mol/L NaOH aqueous solution was added thereto to adjust the pH to 12, the organic layer was washed with water, washed with brine, dried over $MgSO_4$, concentrated under reduced pressure, purified by silica gel column chromatography (Hexane-EtOAc; TLC $R_f$=0.22 (Hexane-EtOAc 2:1)), suspended and washed with hexane, and dried under reduced pressure (70° C.), thereby obtaining 1.20 g of a white solid of the compound C-2. The yield was 78%.

The HPLC purity was 99.508 area % (254 nm).

$^1$H NMR (DMSO-d6) δ: 0.87 (t, J=7.2 Hz, 3H), 1.27 (sextet, J=7.2 Hz, 2H), 1.52-1.59 (m, 2H), 1.91 (s, 3H), 2.88 (s, 6H), 2.97 (s, 6H), 3.40 (s, 3H), 4.02 (t, J=7.2 Hz, 2H), 5.82 (d, J=2.4 Hz, 1H), 6.65 (dd, J=2.4 and 8.8 Hz, 1H), 6.71 (d, J=8.8 Hz, 2H), 7.01 (d, J=2.4 Hz, 1H), 7.13 (dd, J=2.4 and 8.8 Hz, 1H), 7.21 (d, J=8.8 Hz, 2H), 7.28 (d, J=9.2 Hz, 1H), 7.39 (d, J=8.4 Hz, 1H).

$^{13}$C NMR (DMSO-d6) δ: 11.04, 13.10, 18.93, 31.16, 39.40, 39.65, 89.49, 101.47, 104.92, 108.98, 109.05, 109.47, 111.48, 118.49, 123.92, 125.07, 125.81, 126.02, 129.27, 130.17, 135.69, 140.59, 149.35, 150.52, 152.27, 169.74.

Synthesis of Compound C-3

Synthesis of 1-butyl-2-methylindole

First, 1-butyl-2-methylindole was obtained in the following manner.

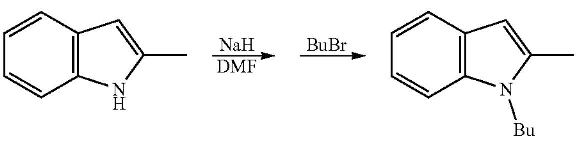

10.0 g (76.2 mmol) of 2-methylindole was dissolved in 191 mL of N,N-dimethylformamide, 3.66 g (91.5 mmol; 1.2 eq.) of hydrogenated sodium (60% in oil) was slowly added thereto in an ice bath, and the mixture was stirred at room temperature for 30 minutes. In an ice bath, 12.5 g (91.5 mmol; 1.2 eq.) of 1-bromobutane was slowly added dropwise thereto, and the mixture was allowed to react at room temperature for 2 hours. 190 mL of water was slowly added thereto, 190 mL of ethyl acetate (EtOAc) was added thereto, followed by separation, extraction of an aqueous layer with 190 mL of EtOAc, and washing of combined organic layer with 200 mL of water repeated three times. The organic layer was washed with 200 mL of brine (salt water), dried over $MgSO_4$, concentrated under reduced pressure, and then purified by silica gel column chromatography (Hexane-EtOAc; TLC $R_f$=0.79 (Hexane-EtOAc 4:1)), thereby obtaining 14.1 g of transparent oil of 1-butyl-2-methylindole. The yield was 99%.

$^1$H NMR ($CDCl_3$) δ: 0.95 (t, J=7.6 Hz, 3H), 1.38 (sextet, J=7.6 Hz, 2H), 1.69-1.76 (m, 2H), 2.42 (d, J=0.8 Hz, 1H), 4.05 (t, J=7.6 Hz, 2H), 6.23 (s, 1H), 7.04 (dt, J=1.2 and 6.8 Hz, 1H), 7.12 (dt, J=1.2 and 6.8 Hz, 1H), 7.25-7.27 (m, 1H), 7.51 (dd, J=0.8 and 8.0 Hz, 1H).

$^{13}C$ NMR ($CDCl_3$) δ: 12.79, 13.87, 20.30, 32.33, 42.96, 99.73, 108.98, 119.06, 119.61, 120.25, 128.00, 136.34, 136.58.

Synthesis of methyl 5-dimethylamino-2-formylbenzoate

Subsequently, methyl 5-dimethylamino-2-formylbenzoic acid was obtained in the following manner.

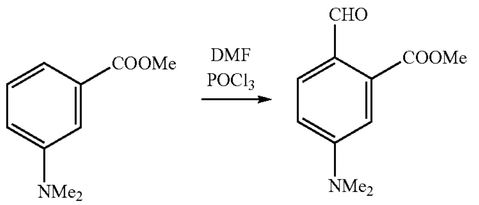 [SMILES: COC(=O)c1cccc(N(C)C)c1 ; COC(=O)c1cc(N(C)C)ccc1C=O]

In an ice bath, 9.44 g (91.5 mmol; 1.1 eq.) of phosphorus oxychloride was slowly added to 8.53 mL of N,N-dimethylformamide at an inner temperature of 12° C. or lower, 10.0 g (55.8 mmol) of methyl 3-dimethylaminobenzoate was added thereto over 15 minutes at an inner temperature of 4° C. or lower, and the mixture was allowed to react at room temperature for 21 hours. The reaction solution was slowly added to 50 mL of water, the pH was adjusted to 7 with aqueous ammonia, EtOAc was added thereto, the resultant mixture was subjected to liquid separation, followed by brine washing and drying over $Na_2SO_4$, and concentration under reduced pressure, and the resultant product was purified by silica gel column chromatography (Hexane-EtOAc; TLC $R_f$=0.33 (Hexane-EtOAc 2:1)) to obtain 5.0 g of a cream-colored solid of methyl 5-dimethylamino-2-formylbenzoate. The yield was 43%.

$^1H$ NMR ($CDCl_3$) δ: 3.11 (s, 6H), 3.96 (s, 3H), 6.79 (dd, J=2.8 and 8.8 Hz, 1H), 7.03 (d, J=2.8 Hz, 1H), 7.90 (d, J=8.8 Hz, 1H), 10.27 (s, 1H).

Synthesis of Triarylmethane Ester (A)

Subsequently, triarylmethane ester (A) was obtained in the following manner.

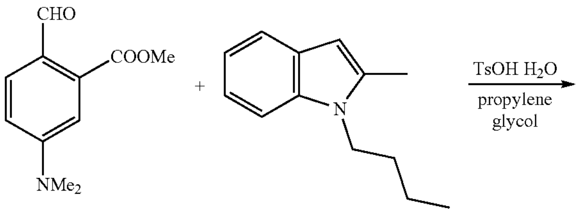

-continued

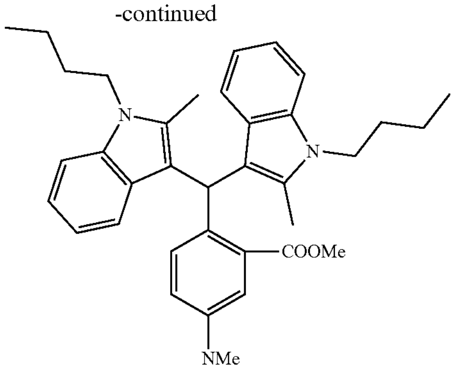

(A)

1.0 g (4.83 mmol) of methyl 5-dimethylamino-2-formylbenzoate and 1.81 g (9.65 mmol; 2.0 eq.) of 1-butyl-2-methylindole were suspended in 9.65 mL of propylene glycol, and the mixture was stirred in an oil bath at 100° C. for 3 hours, and then 2 mg of p-toluenesulfonic acid monohydrate was added thereto and allowed to react for 10 minutes. The mixture was left to stand for cooling, water was added thereto, EtOAc was added thereto, the mixture was subjected to liquid separation, the organic layer was washed with brine, dried over $Na_2SO_4$, concentrated under reduced pressure, and purified by silica gel column chromatography (Hexane-EtOAc; TLC $R_f$=0.73 (Hexane-EtOAc 2:1)), thereby obtaining 2.17 g of light pink cream-colored solids of triarylmethane ester (A). The yield was 80%.

$^1H$ NMR ($CDCl_3$) δ: 0.92 (t, J=7.2 Hz, 6H), 1.34 (sextet, J=7.6 Hz, 4H), 1.63-1.71 (m, 4H), 2.11 (s, 6H), 2.93 (s, 6H), 3.31 (s, 3H), 4.03 (t, J=7.6 Hz, 4H), 6.65 (dd, J=2.8 and 8.4 Hz, 1H), 6.76-6.82 (m, 3H), 6.95 (d, J=7.6 Hz, 2H), 6.99-7.03 (m, 3H), 7.08 (d, J=2.8 Hz, 1H), 7.20 (d, J=8.0 Hz, 2H).

$^{13}C$ NMR ($CDCl_3$) δ: 10.55, 13.91, 20.22, 32.33, 35.58, 40.63, 42.73, 51.52, 108.42, 113.45, 114.23, 114.92, 118.33, 119.33, 119.69, 128.41, 130.52, 132.04, 132.37, 133.19, 135.86, 148.57, 169.80.

Synthesis of Triarylmethane Ester (B)

Subsequently, triarylmethane ester (B) was obtained in the following manner.

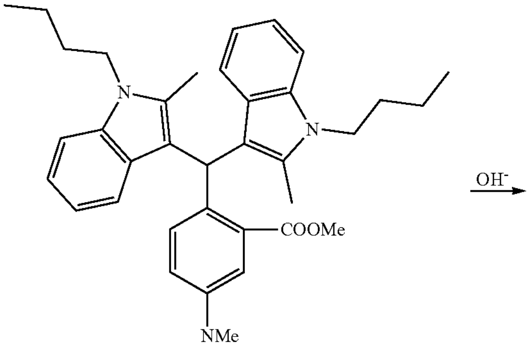

(A)

-continued

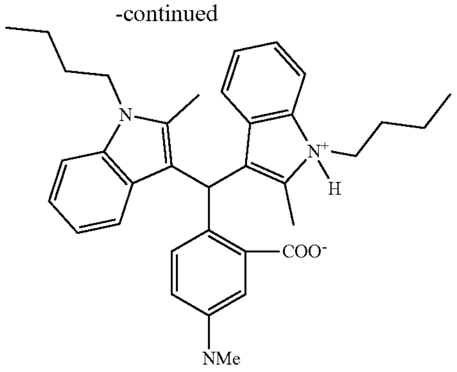

(B)

2.0 g (3.55 mmol) of triarylmethane ester (A) was dissolved in 60 mL of methanol, 0.3 g (7.4 mmol; 2.1 eq) of sodium hydroxide and 0.2 mL of water were added thereto, and the mixture was stirred at room temperature and in a water bath at 50° C. for 3 hours. The solvent was distilled off, the resultant was suspended in tetrahydrofuran (THF), and the mixture was stirred at 60° C. in a water bath for 2 hours. The mixture was concentrated under reduced pressure and purified by silica gel column chromatography (hexane-EtOAc; TLC $R_f$=0.78 ($CHCl_3$-MeOH 4:1)), thereby obtaining 1.80 g of red solids of triarylmethane carboxylic acid (B). The yield was 92%.

$^1$H NMR ($CDCl_3$) δ: 0.89 (t, J=7.2 Hz, 6H), 1.28 (sextet, J=7.2 Hz, 4H), 1.61-1.69 (m, 4H), 2.07 (s, 6H), 2.94 (s, 6H), 4.01 (t, J=7.2 Hz, 4H), 6.71 (dd, J=2.8 and 8.4 Hz, 1H), 6.75-6.84 (m, 5H), 6.95 (m, 2H), 7.11 (d, J=8.8 Hz, 1H), 7.19-7.21 (m, 3H).

$^{13}$C NMR ($CDCl_3$) δ: 10.42, 13.89, 20.17, 32.28, 35.77, 40.64, 42.73, 108.48, 113.42, 115.00, 115.96, 118.38, 119.50, 119.62, 128.39, 130.17, 131.19, 133.44, 133.86, 135.84, 148.56, 172.94.

$^{13}$C NMR (DMSO-$d_6$) δ: 10.04, 13.68, 19.36, 21.43, 31.83, 34.19, 40.13, 41.80, 108.70, 113.24, 113.74, 117.70, 118.66, 118.84, 119.24, 127.94, 130.01, 130.95, 132.65, 135.40, 148.05, 172.13.

Synthesis of Compound C-3

Subsequently, a compound C-3, which was a compound represented by Formula (2), was obtained in the following manner.

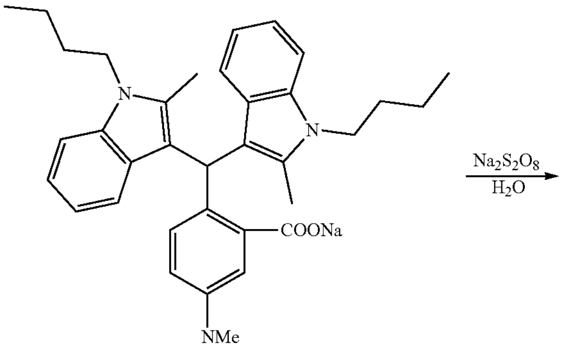

(B)

-continued

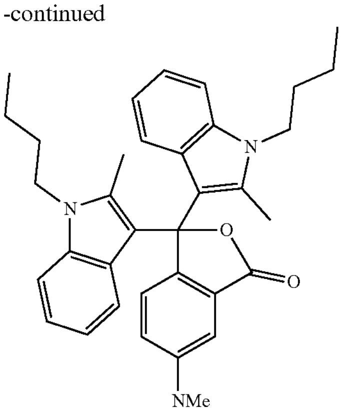

C-3

1.50 g (2.7 mmol) of triarylmethane carboxylic acid (B) and 0.405 g (10.1 mmol; 3.75 eq.) of sodium hydroxide were mixed with 20 mL of water and 5 mL of methanol, and the mixture was heated to 80° C. 0.89 g (3.3 mmol; 1.2 eq.) of potassium persulfate dissolved in 20 mL of water was added thereto, and the mixture was allowed to react at 80° C. for 5 hours. The mixture was cooled in a water bath, the pH was adjusted to 7 with dilute hydrochloric acid, the solid was collected by filtration, washed with water, dried under reduced pressure, and purified by silica gel column chromatography (Hexane-EtOAc; TLC $R_f$=0.53 (EtOAc)), the resultant was suspended and washed in hexane, and dried under reduced pressure (60° C.), thereby obtaining 0.70 g of a light pink powder of a compound C-3. The yield was 47%.

The HPLC purity was 95.649 area % (254 nm), and $\lambda_{max}$ was 524 nm.

$^1$H NMR (DMSO-$d_6$) δ: 0.87 (t, J=7.2 Hz, 6H), 1.23-1.28 (m, 4H), 1.56-1.59 (m, 4H), 1.99-2.09 (m, 6H), 2.99 (s, 6H), 4.11 (t, J=6.8 Hz, 4H), 6.65-6.86 (m, 4H), 7.00-7.04 (m, 3H), 7.09-7.12 (m, 1H), 7.37-7.43 (m, 3H).

$^{13}$C NMR (DMSO-$d_6$) δ: 11.13, 13.63, 19.33, 31.66, 40.08, 88.42, 105.15, 109.53, 111.69, 118.81, 118.85, 120.29, 124.33, 125.13, 125.61, 134.64, 135.47, 141.22, 151.01, 170.51.

Synthesis of Compounds C-4 to C-10

The compounds C-4 to C-10 were synthesized with reference to the synthesis methods of the compounds C-1 to C-3.

Examples A1 to A11 and Comparative Examples A1 to A4

Preparation of Support

An aluminum plate that had been subjected to electrolytic roughening treatment in a hydrochloric acid solution in order to obtain an average roughness (Ra) of 0.4 μm was prepared. Then, the aluminum plate was subjected to anodization treatment in an aqueous phosphoric acid solution to form a 1.1 g/m$^2$ oxide film, and subsequently a coating film having a dry thickness of 0.03 g/m$^2$ was obtained using a post-treatment aqueous solution of poly(acrylic acid).

In this manner, the support was obtained.

Formation of Image-Recording Layer

Next, an image-recording layer coating liquid (1) having the following composition was applied onto the surface of the support using a bar coater. Then, the coating liquid was dried at 250° C. for 60 seconds to obtain an image-recording layer having a dry film thickness of 0.9 g/m$^2$.

In this manner, on-press development type lithographic printing plates of Examples A1 to A11 and Comparative Examples A1 to A4 were obtained.

Image-Recording Layer Coating Liquid (1)

- Specific compound or comparative compound (compound shown in Table 1 below): amount shown in Table 1 below
- Polymer dispersion liquid: 0.675 parts
- 5% by mass hydroxypropyl methyl cellulose aqueous solution (hydroxypropyl methyl cellulose: 30% methoxylation, 10% hydroxypropoxylation, viscosity of 5 mPa·s (2% by mass aqueous solution at 20° C.)): 0.400 parts
- Monomer 1: 0.333 parts
- Monomer 2: 0.167 parts
- Infrared absorber 1: 0.020 parts
- Surfactant 1: 0.045 parts
- Polymerization initiator (iodonium salt compound 1): 0.06 parts
- 1-Propanol: 2.6 parts
- 2-Butanone: 3.5 parts
- 1-Methoxy-2-propanol: 0.92 parts
- δ-butyrolactone: 0.10 parts
- Water: 1.16 parts Details of each component used in the image-recording layer coating liquid (1) are as follows.

- Polymer dispersion liquid: a polymer dispersion liquid prepared according to Example 10 of EP1765593B (including 23.5% by mass of polymer in n-propanol/water (weight ratio of 80:20))
- Monomer 1: DESMODUR (registered trademark) N100 manufactured by Bayer (40% by mass 2-butanone solution of urethane acrylate:hydroxyethyl acrylate:pentaerythritol triacrylate=1:1.5:1.5 (molar ratio))
- Monomer 2: 40% by mass 2-butanone solution of acrylate form of bisphenol A ethylene oxide 10 mol adduct
- Infrared absorber 1: the following structure
- Surfactant 1: BYK302 manufactured by BYK-Chemie GmbH (25% by mass solution of 1-methoxy-2-propanol)
- Iodonium salt compound 1: the following structure Infrared absorber 1

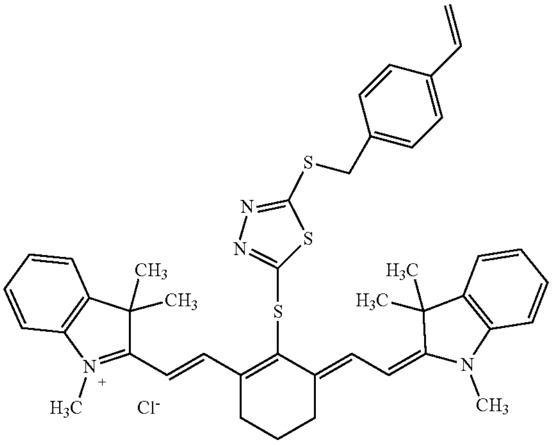

-continued

Iodonium salt compound 1

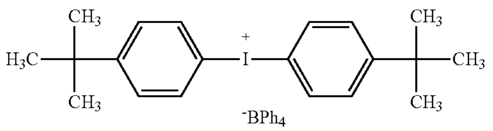

The specific compounds and comparative compounds shown in Table 1 will be described in detail below.

C-1

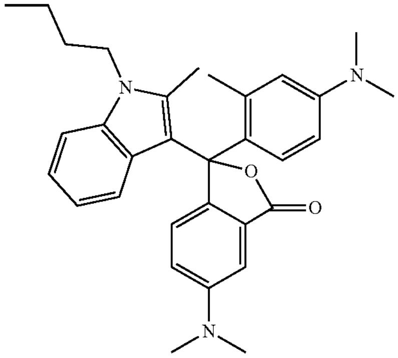

C-2

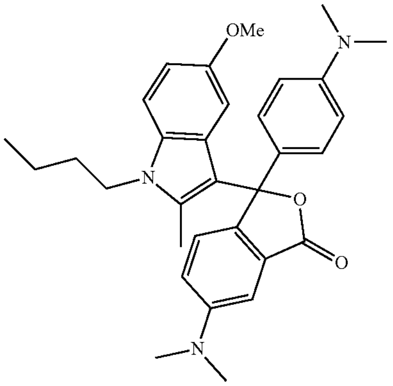

C-3

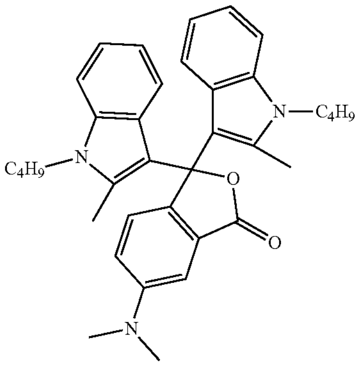

-continued
C-4
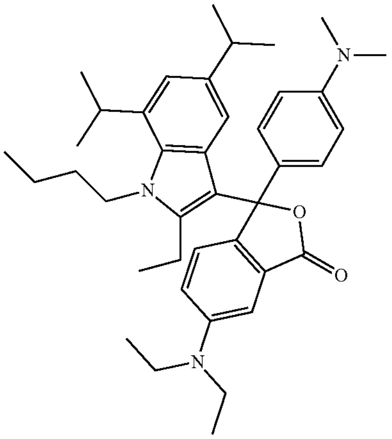
C-5
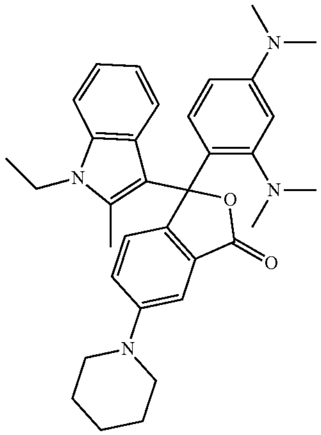
C-6
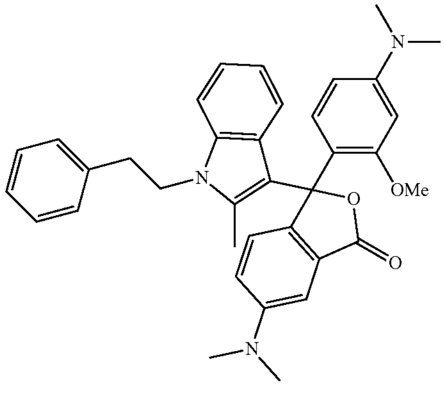
-continued
C-7
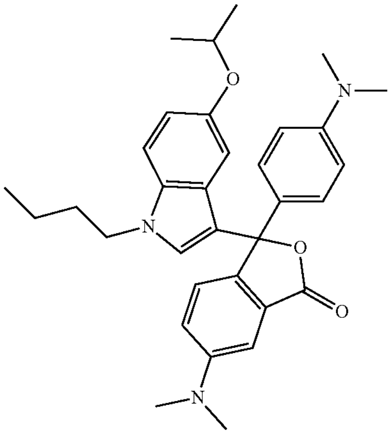
C-8
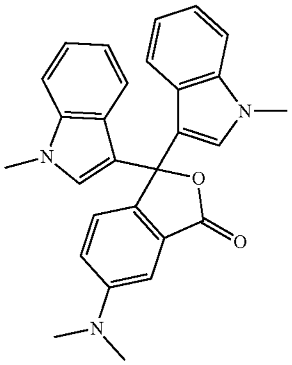
C-9
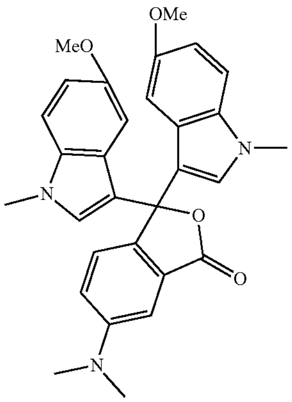
C-10
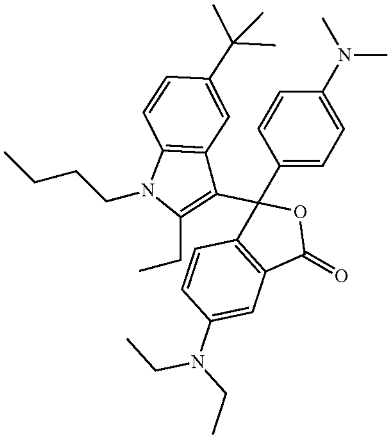

-continued

CR-1

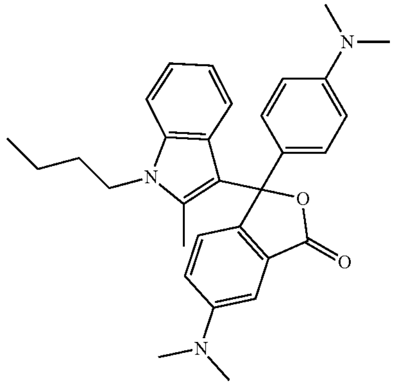

CR-2

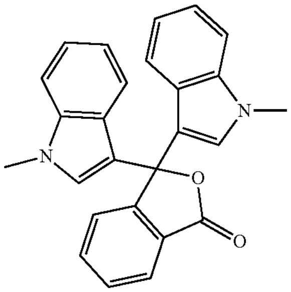

CR-3

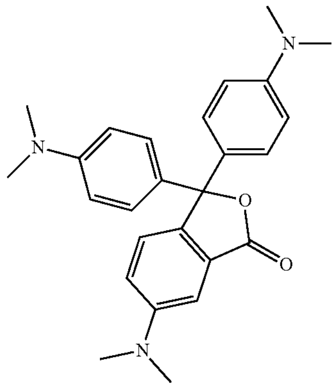

Example A12

An on-press development type lithographic printing plate precursor was obtained in the same manner as in Example A2 except that in the image-recording layer coating liquid (1), the amount of the iodonium salt compound 1 was changed to 0.025 parts and 0.025 parts of an iodonium salt compound 2 having the following structure was further added.

Iodonium salt compound 2

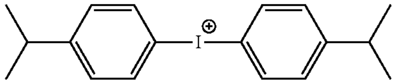

-continued

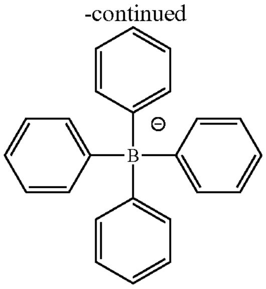

Example A13

An on-press development type lithographic printing plate precursor was obtained in the same manner as in Example A2 except that in the image-recording layer coating liquid (1), the infrared absorber 1 was changed to an infrared absorber 2 having the following structure.

Infrared absorber 2

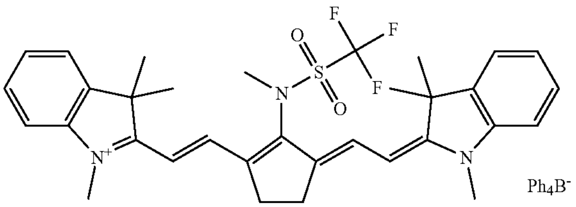

Example A14

An on-press development type lithographic printing plate precursor was obtained in the same manner as in Example A2 except that in the image-recording layer coating liquid (1), the infrared absorber 1 was changed to an infrared absorber 3 having the following structure.

Infrared absorber 3

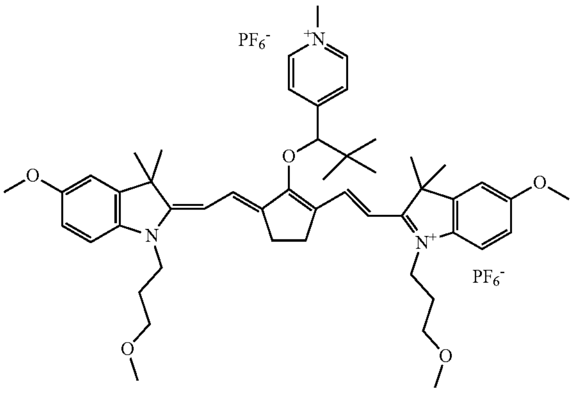

Example A15

An on-press development type lithographic printing plate precursor was obtained in the same manner as in Example A2 except that in the image-recording layer coating liquid (1), 0.010 parts of a color forming agent (leuco colorant 1) having the following structure, which is a compound represented by Formula (Le-10), was further added.

Leuco colorant 1

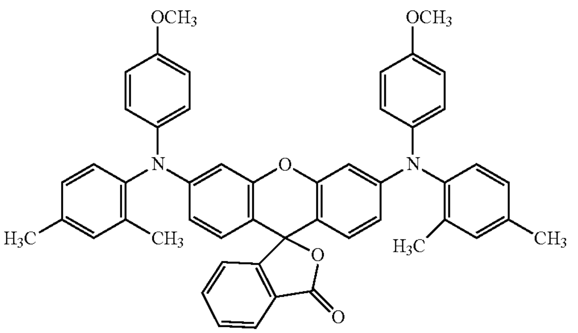

Example A16

An on-press development type lithographic printing plate precursor was obtained in the same manner as in Example A2 except that in the image-recording layer coating liquid (1), 0.025 parts of phenothiazine having the following structure, which is a compound represented by Formula (Ph), was further added.

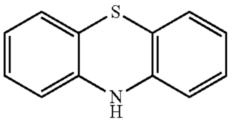 [SMILES: c1ccc2c(c1)Nc1ccccc1S2]

Evaluation

1. Evaluation of Color Formability (Visibility)

In Trendsetter 3244VX manufactured by Creo that was equipped with a water cooling-type 40 W infrared semiconductor laser, each of the obtained on-press development type lithographic printing plate precursors was exposed under the conditions of an output of 11.5 W, an outer drum rotation speed of 220 rpm, and a resolution of 2,400 dpi (dots per inch, 1 inch=25.4 mm). The exposure was carried out in an environment of 25° C. and 50% RH.

Immediately after exposure, the color formation of the lithographic printing plate precursor was measured. The measurement was performed by the specular component excluded (SCE) method by using a spectrocolorimeter CM2600d and operation software CM-S100W manufactured by Konica Minolta, Inc. The visibility (color formability) was evaluated by a difference ΔL' between an L* value of the exposed portion and an L* value of the non-exposed portion by using L* values (brightness) of the L*a*b* color space. It can be said that the higher the value of ΔL', the better the color formability. The evaluation results are shown in Table 1.

2. Evaluation of Streak-Like Unevenness

By using an exposure machine (PlateRite HD 8900N series, manufactured by SCREEN Graphic Solutions Co., Ltd.) equipped with an exposure head adopting the grating light valve (GLV) technique, the obtained on-press development type lithographic printing plate precursor was subjected to exposure at an exposure energy of 110 mJ/cm$^2$. The exposed image included a chart of lines of AM screen 200 lines and screen tint of a frequency modulation screen (FM screen) 20 μm.

The obtained exposed lithographic printing plate precursor was mounted on a monochromatic SOR-M printer (manufactured by Heidelberger Druckmaschinen AG) without being developed, and by using ink: Fusion-G MK red N (manufactured by DIC Corporation), dampening water: with S-S2 diluted at 2% (manufactured by FUJIFILM Corporation), blanket: DAY blanket D 3000 (manufactured by T & K TOKA CO., LTD.), and paper: TOKUBISHI ART 127.9 gsm (manufactured by Mitsubishi Paper Mills Limited), 1,000 sheets were printed. Then, the surface of the 1,000th printing paper was visually observed to assess the extent of occurrence of streak-like unevenness by sensory evaluation. It can be said that the lesser the streak-like unevenness is seen, the better the GLV suitability. The evaluation results are shown in Table 1.

Evaluation Criteria

A: No streak-like unevenness is seen in both the FM screen and the AM screen.

B: The streak-like unevenness is slightly seen in only the FM screen.

C: The streak-like unevenness is slightly seen in both the FM screen and the AMV screen.

D: The streak-like unevenness is seen in both the FM screen and the AMV screen.

TABLE 1

| | Specific compound or comparative compound | | | Evaluation | |
|---|---|---|---|---|---|
| | Type | Amount [part] | Change in image-recording layer coating liquid (1) | Color formability ΔL | Streak-like unevenness |
| Example A1 | C-1 | 0.025 | — | 6.1 | B |
| Example A2 | C-2 | 0.025 | — | 7.2 | A |
| Example A3 | C-3 | 0.025 | — | 7.5 | A |
| Example A4 | C-4 | 0.025 | — | 5.9 | B |
| Example A5 | C-5 | 0.025 | — | 5.5 | B |
| Example A6 | C-6 | 0.025 | — | 5.3 | B |
| Example A7 | C-7 | 0.025 | — | 5.0 | B |
| Example A8 | C-8 | 0.025 | — | 4.0 | C |
| Example A9 | C-9 | 0.025 | — | 5.0 | C |
| Example A10 | C-10 | 0.025 | — | 6.3 | B |
| Example A11 | C-2/C-3 | 0.02/0.02 | — | 6.3 | B |
| Example A12 | C-2 | 0.025 | Addition of iodonium salt compound 2 | 7.5 | A |
| Example A13 | C-2 | 0.025 | Change to infrared absorber 2 | 9.9 | A |

TABLE 1-continued

| | Specific compound or comparative compound | | | Evaluation | |
|---|---|---|---|---|---|
| | Type | Amount [part] | Change in image-recording layer coating liquid (1) | Color formability ΔL | Streak-like unevenness |
| Example A14 | C-2 | 0.025 | Change to infrared absorber 3 | 10.2 | A |
| Example A15 | C-2 | 0.025 | Addition of leuco colorant | 8.9 | A |
| Example A16 | C-2 | 0.025 | Addition of phenothiazine | 8.0 | A |
| Comparative Example A1 | CR-1 | 0.025 | — | 4.9 | D |
| Comparative Example A2 | CR-2 | 0.025 | — | 2.2 | D |
| Comparative Example A3 | CR-3 | 0.025 | — | 1.0 | D |
| Comparative Example A4 | None | — | — | 0.5 | D |

Examples B1 to B13 and Comparative Examples B1 to B4

Preparation of Support (a) Alkaline Etching Treatment

An aqueous solution of caustic soda having a caustic soda concentration of 260% by mass and an aluminum ion concentration of 6.5% by mass was sprayed onto the aluminum plate at a temperature of 70° C., thereby performing an etching treatment. Then, rinsing was performed by means of spraying. The amount of dissolved aluminum within the surface to be subjected to the electrochemical roughening treatment later was 5 g/m$^2$.

(b) Desmutting Treatment Using Aqueous Acidic Solution (First Desmutting Treatment)

Next, a desmutting treatment was performed using an acidic aqueous solution. In the desmutting treatment, a 150 g/L aqueous sulfuric acid solution was used as the aqueous acidic solution. The liquid temperature was 30° C. The desmutting treatment was performed for 3 seconds by spraying the acidic aqueous solution onto the aluminum plate. Then, a water washing treatment was performed.

(c) Electrochemical Roughening Treatment

Next, an electrochemical roughening treatment was performed using alternating current and an electrolytic solution having a hydrochloric acid concentration of 14 g/L, an aluminum ion concentration of 13 g/L, and a sulfuric acid concentration of 3 g/L. The liquid temperature of the electrolytic solution was 30° C. The aluminum ion concentration was adjusted by adding aluminum chloride.

The waveform of the alternating current was a sine wave in which positive and negative waveforms are symmetrical, the frequency was 50 Hz, the ratio of the anodic reaction time and the cathodic reaction time in one cycle of the alternating current was 1:1, and the current density was 75 A/dm$^2$ in terms of the peak current value of the alternating current waveform. In addition, the quantity of electricity was 450 C/dm$^2$ which was the total quantity of electricity used for the aluminum plate to have an anodic reaction, and the electrolysis treatment was performed 4 times by conducting electricity of 112.5 C/dm$^2$ for 4 seconds at each treatment session. A carbon electrode was used as the counter electrode of the aluminum plate. Then, a water washing treatment was performed.

(d) Alkaline Etching Treatment

An aqueous solution of caustic soda having a caustic soda concentration of 5% by mass and an aluminum ion concentration of 0.5% by mass was sprayed onto the aluminum plate having undergone the electrochemical roughening treatment at a temperature of 45° C., thereby performing an etching treatment. The amount of dissolved aluminum within the surface having undergone the electrochemical roughening treatment was 0.2 g/m$^2$. Then, a water washing treatment was performed.

(e) Desmutting Treatment Using Aqueous Acidic Solution

Next, a desmutting treatment was performed using an acidic aqueous solution. Specifically, the desmutting treatment was performed for 3 seconds by spraying the aqueous acidic solution onto the aluminum plate. In the desmutting treatment, an aqueous solution having a sulfuric acid concentration of 170 g/L and an aluminum ion concentration of 5 g/L was used as aqueous acidic solution. The liquid temperature was 30° C.

(f) First-Stage Anodization Treatment

Figure 3:
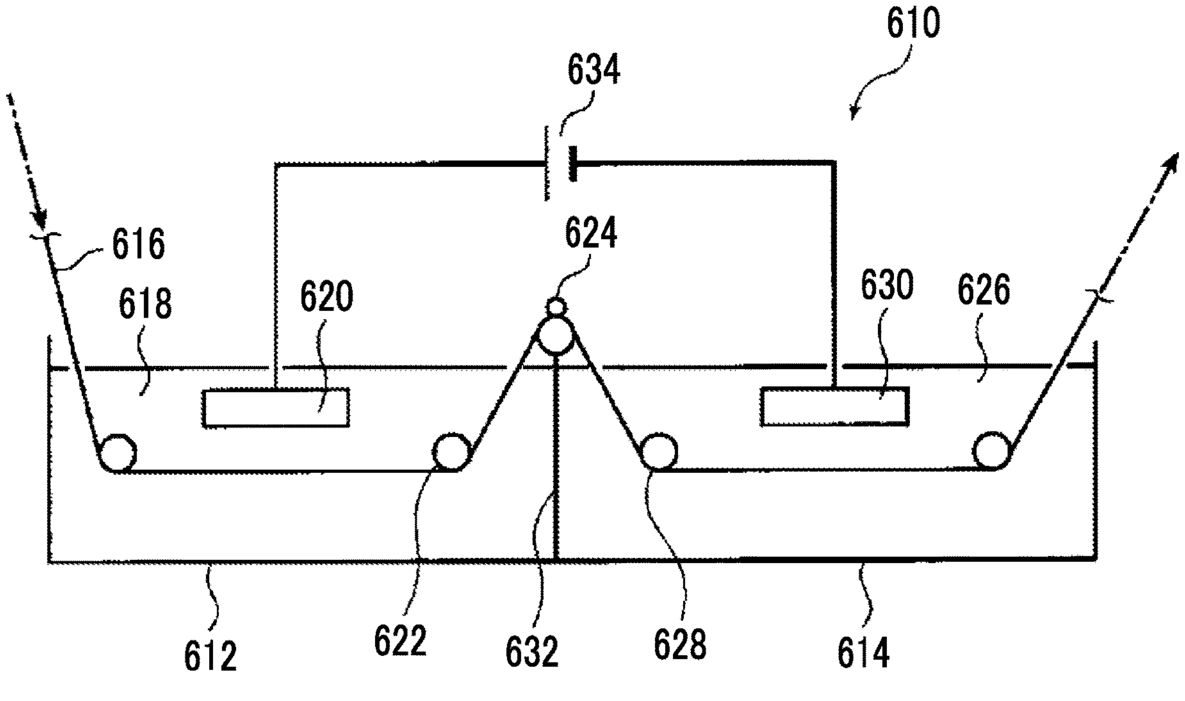
FIG. 3 is a schematic view of an anodization treatment device used for an anodization treatment in a manufacturing method of a support having an anodic oxide film.

By using an anodization treatment device 610 for direct current electrolysis having the structure shown in FIG. 3, a first-stage anodization treatment (also called first anodization treatment) was performed. Specifically, the first anodization treatment was performed under the conditions described in the column of "First anodization treatment" shown in the following Table 2, thereby forming an anodic oxide film having a predetermined film amount.

Hereinafter, the anodization treatment device 610 shown in FIG. 3 will be described.

In the anodization treatment device 610 shown in FIG. 3, an aluminum plate 616 is transported as indicated by the arrow in FIG. 3. In a power supply tank 612 storing an electrolytic solution 618, the aluminum plate 616 is positively (+) charged by a power supply electrode 620. Further, the aluminum plate 616 is transported upward by a roller 622 in the power supply tank 612, redirected downward by a nip roller 624, transported toward an electrolytic treatment tank 614 in which an electrolytic solution 626 is stored, and redirected to the horizontal direction by a roller 628. Next, the aluminum plate 616 is negatively (−) charged by an electrolysis electrode 630 so that an anodic oxide film is formed on the surface thereof, and the aluminum plate 616 coming out of the electrolytic treatment tank 614 is transported to the next step. In the anodization treatment device 610, the roller 622, the nip roller 624, and the roller 628 constitute a direction change unit. Furthermore, in the inter-tank portion between the power supply tank 612 and the electrolytic treatment tank 614, the aluminum plate 616 is transported in a ridge shape and an inverted U shape by the rollers 622, 624, and 628. The power supply electrode 620 and the electrolysis electrode 630 are connected to a direct current power source 634.

(g) Pore Widening Treatment

Under the conditions shown in the following Table 2, the aluminum plate having undergone the above anodization treatment was immersed in an aqueous solution of caustic soda at a temperature of 40° C. and having a caustic soda concentration of 5% by mass and an aluminum ion concentration of 0.5% by mass, thereby performing a pore widening treatment. Then, rinsing was performed by means of spraying.

(h) Second Anodization Treatment

By using the anodization treatment device 610 for direct current electrolysis having the structure shown in FIG. 3, a second-stage anodization treatment (also called second anodization treatment) was performed. Specifically, the second anodization treatment was performed under the conditions described in the column of "Second anodization treatment" shown in the following Table 2, thereby forming an anodic oxide film having a predetermined film amount.

By the above method, a support was prepared.

For the obtained support, Table 3 shows the brightness L* of the micropores within the surface of the anodic oxide film in the L*a*b* color system, the average diameter and depth of the large diameter portion of the micropores within the surface of the oxide film, the average diameter (nm) and depth of the small diameter portion of the micropores at a communicate position, the depth (nm) of the large diameter portion and the small diameter portion, the micropore density, and the thicknesses of the anodic oxide film (also called film thicknesses) from the bottom portion of the small diameter portion to the surface of the aluminum plate.

In Table 1, film amount (AD) in the column of the first anodization treatment and film amount (AD) in the column of second anodization treatment represent the amount of film obtained by each treatment. As electrolytic solutions, the aqueous solutions containing the components in Table 2 were used.

TABLE 2

| | First anodization treatment | | | | | | |
|---|---|---|---|---|---|---|---|
| | Liquid type | Liquid component | Component concentration (g/L) | Temperature (° C.) | Current density (A/$dm^2$) | Time (s) | Film amount (g/$m^2$) |
| Support | Phosphoric acid | $H_3PO_4$ | 15 | 35 | 4.5 | 12 | 1 |

| Pore widening treatment | | |
|---|---|---|
| Liquid component | Temperature (° C.) | Time (s) |
| NaOH5%/Al0.5% | 40° C. | 3S |

| Second anodization treatment | | | | | | |
|---|---|---|---|---|---|---|
| Liquid type | Liquid component | Component concentration (g/L) | Temperature (° C.) | Current density (A/$dm^2$) | Time (s) | Film amount (g/$m^2$) |
| Sulfuric acid | $H_2SO_4$/Al | 170/5 | 50 | 15 | 10.5 | 1.4 |

TABLE 3

| | Large diameter portion | | | | Small diameter portion | | | | | |
|---|---|---|---|---|---|---|---|---|---|---|
| | Average diameter (nm) | Average diameter of bottom portion (nm) | Shape | Depth (nm) | Average diameter of communicate position (nm) | Shape | Depth (nm) | Micropore density (pieces/μ$m^2$) | Film thickness (nm) | Brightness L* |
| Support | 35 | 35 | straight tubular shape | 100 | 10 | straight tubular shape | 570 | 320 | 1,000 | 80 |

Formation of Undercoat Layer

The obtained support was coated with the coating liquid for an undercoat layer having the following composition such that the dry coating amount was 0.1 g/m$^2$. In this way, an undercoat layer was formed.

Undercoat Layer Coating Liquid

- Compound for undercoat layer (the following U-1, 11% aqueous solution): 0.10502 parts
- Sodium gluconate: 0.0700 parts
- Surfactant (EMALEX (registered trademark) 710, NIHON EMULSION Co., Ltd.): 0.00159 parts
- Preservative (BIOHOPE L, manufactured by K•I Chemical Industry Co., LTD.): 0.00149 parts
- Water: 3.29000 parts (D-1)

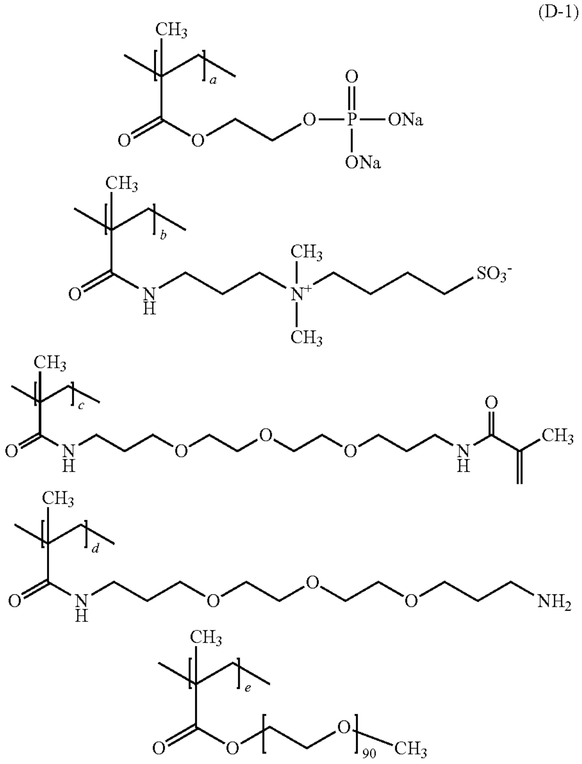

a/b/c/d/e = 14.2/71.8/8.9/0.1/5.0 (wt %)
a/b/c/d/e = 19.0/72.8/7.7/0.1/0.4 (mol %)
Mw = 200,000

Formation of Image-Recording Layer

The undercoat layer was bar-coated with an image-recording layer coating solution (2) described below and dried in an oven at 120° for 40 seconds, thereby forming an image-recording layer having a dry coating amount of 1.0 g/m$^2$.

Image-Recording Layer Coating Liquid (2)

- Specific compound or comparative compound (compound shown in Table 4 below): amount shown in Table 4 below
- Infrared absorber 4: 0.0175 parts
- Color forming agent (S-22): 0.0120 parts
- Electron-accepting polymerization initiator (IA-1): 0.0981 parts
- Electron-donating polymerization initiator (TPB): 0.0270 parts
- Polymerizable compound (M-1): 0.3536 parts
- Tricresyl phosphate (tricresyl phosphate): 0.0450 parts
- Anionic surfactant (A-1): 0.0162 parts
- Fluorine-based surfactant (W-1): 0.0042 parts
- 2-Butanone: 5.3155 parts
- 1-Methoxy-2-propanol: 2.8825 parts
- Methanol: 2.3391 parts
- Microgel liquid 1: 2.8779 parts Details of components used in the image-recording layer coating liquid (2) are as follows.

- Infrared absorber 4: non-decomposition-type infrared absorber, compound having the following structure, λmax=794 nm
- Infrared absorber 5: non-decomposition-type infrared absorber, compound having the following structure, λmax=819 nm Infrared absorber 4

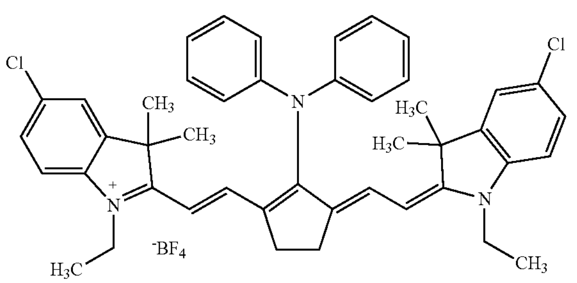

Infrared absorber 5

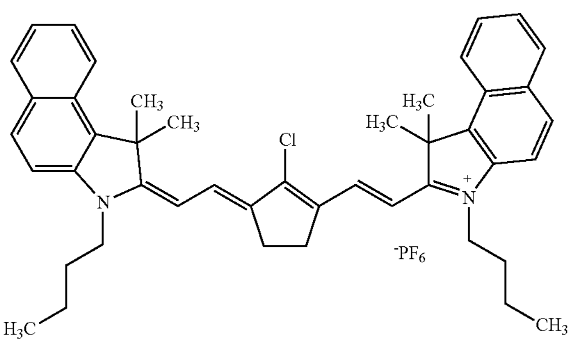

- Color forming agent (S-22): Color forming agent (S-22) described above
- Color forming agent (S-16): Color forming agent (S-16) described above
- Electron-accepting polymerization initiator (IA-1): the following compound, LUMO=−3.02 eV
- Electron-donating polymerization initiator (TPB): sodium tetraphenylborate, HOMO=−5.90 eV

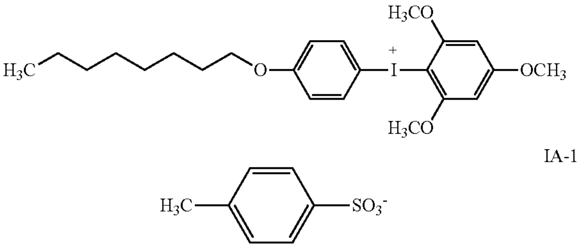

IA-1

Synthesis Method of Polymerizable Compound (M-1)

A mixed solution of TAKENATE D-160N (polyisocyanate trimethylolpropane adduct, manufactured by Mitsui Chemicals, Inc., 4.7 parts), ARONIX M-403 (manufactured by TOAGOSEI CO., LTD., amount yielding the ratio of NCO value of TAKENATE D-160N:hydroxyl number of ARONIX M-403=1:1), t-butylbenzoquinone (0.02 parts), and methyl ethyl ketone (11.5 parts) was heated at 65° C. NEOSTAN U-600 (bismuth-based polycondensation catalyst, manufactured by NITTO KASEI CO., LTD., 0.11 parts) was added to the reaction solution, and the reaction solution was heated at 65° C. for 4 hours. The reaction solution was cooled to room temperature (25° C.), and methyl ethyl ketone was added thereto, thereby synthesizing a urethane acrylate (M-1) solution having a solid content of 50% by mass. By using recycling GPC (instrument: LC908-C60, column: JAIGEL-1H-40 and 2H-40 (manufactured by Japan Analytical Industry Co., Ltd.)) and tetrahydrofuran (THF) as an eluent, molecular weight fractionation of the urethane acrylate solution was performed. The weight-average molecular weight was 20,000.

Anionic surfactant (A-1): the following compound

Fluorine-based surfactant (W-1): the following compound

A-1

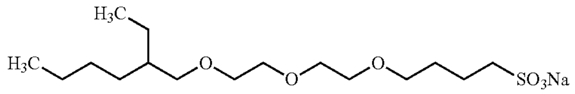

W-1

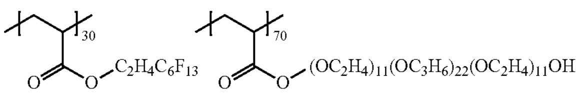

Mw = 13,000

Synthesis Method of Microgel Liquid 1

Preparation of Oil-Phase Component

A polyfunctional isocyanate compound (PM-200: manufactured by Wanhua Chemical Group Co., Ltd.: 6.66 g, a 50% by mass ethyl acetate solution of "TAKENATE (registered trademark) D-116N (adduct of trimethylolpropane (TMP), m-xylylene diisocyanate (XDI), and polyethylene glycol monomethyl ether (EO90) (following structure)" manufactured by Mitsui Chemicals, Inc.: 5.46 g, a 65% by mass ethyl acetate solution of dipentaerythritol pentaacrylate (SR-399, manufactured by Sartomer Company Inc.): 11.24 g, ethyl acetate: 14.47 g, and PIONIN (registered trademark) A-41-C manufactured by TAKEMOTO OIL & FAT Co., Ltd.: 0.45 g were mixed together and stirred at room temperature (25° C.) for 15 minutes, thereby obtaining an oil-phase component.

D-116N

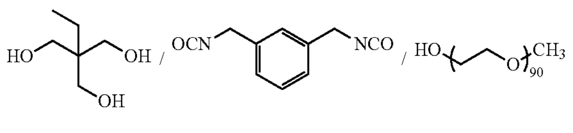

Preparation of Water-Phase Component

As a water-phase component, 47.2 g of distilled water was prepared.

Microcapsule Forming Step

The oil-phase component and the water-phase component were mixed together, and the obtained mixture was emulsified at 12,000 rpm for 16 minutes by using a homogenizer, thereby obtaining an emulsion.

Distilled water (16.8 g) was added to the obtained emulsion, and the obtained liquid was stirred at room temperature for 10 minutes.

After stirring, the liquid was heated at 45° C., and stirred for 4 hours in a state of being kept at 45° C. such that ethyl acetate was distilled away from the liquid. Then, a 10% by mass aqueous solution of 5.12 g of 1,8-diazabicyclo[5.4.0]undec-7-ene-octylate (U-CAT SA102, manufactured by San-Apro Ltd.) was added thereto, and the solution was stirred at room temperature for 30 minutes and left to stand at 45° C. for 24 hours. Distilled water was added thereto such that the concentration of solid contents was adjusted to 20% by mass, thereby obtaining an aqueous dispersion of a microgel 1. The microgel 1 had a volume average particle diameter of 165 nm that was measured using a laser diffraction/scattering-type particle diameter distribution analyzer LA-920 (manufactured by HORIBA, Ltd.).

Formation of Outermost Layer

The image-recording layer was bar-coated with an outermost layer coating liquid and then dried in an oven at 120° C. for 60 seconds, thereby forming an outermost layer having a dry coating amount of 0.41 $g/m^2$.

By the above step, an on-press development type lithographic printing plate precursor was obtained.

Outermost Layer Coating Liquid

The following components were dissolved or dispersed in deionized water, the solid content was adjusted to 20% by mass, thereby preparing an outermost layer coating liquid.

Water-soluble polymer (polyvinyl alcohol, Mowiol 4-88 manufactured by KURARAY CO., LTD.): 250 parts by mass Hydrophobic polymer (aqueous polyvinylidene chloride dispersion, Diofan (registered trademark) A50 manufactured by Solvin S.A.): 250 parts by mass Surfactant (nonionic surfactant, Lutensol (registered trademark) A8 manufactured by BASF SE): 10 parts by mass

Examples B14 to B16

An on-press development type lithographic printing plate precursor was obtained in the same manner as in each of Examples B1 to B3, except that in the image-recording layer coating liquid (2) of each of Examples B1 to B3, the fluorine-based surfactant (W-1) was changed to a polymer (W-2) having the following structure, which was a polymer having a structural unit represented by Formula (I).

W-2

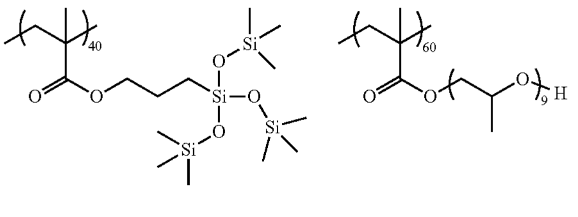

Example B17

An on-press development type lithographic printing plate precursor was obtained in the same manner as in Example B1 except that in the image-recording layer coating liquid (2), 0.0013 parts of the infrared absorber 5 having the above structure was further added.

Evaluation

1. Evaluation of color formability (visibility) and 2. Evaluation of streak-like unevenness were performed in the same manner as in Example A1. The evaluation results are shown in Table 4.

3. Evaluation of Surface State

The obtained on-press development type lithographic printing plate precursor was processed into 40 cm×62 cm. A surface of the obtained sample on the outermost layer side was visually observed under white lamp irradiation of 750 to 1,500 Lux, and the surface state was evaluated according to the following criteria. The evaluation results are shown in Table 4.

Evaluation Criteria

A: No unevenness of surface state is visually observed entirely.

B: Unevenness of surface state is visually observed partially.

C: Unevenness of surface state is visually observed partially in a region wider than that in B.

TABLE 4

| | Specific compound or comparative compound | | | Evaluation | | |
|---|---|---|---|---|---|---|
| | Type | Amount [part] | Change in image-recording layer coating liquid (2) | Color formability ΔL | Streak-like unevenness | Surface state |
| Example B1 | C-1 | 0.045 | — | 6.3 | B | B |
| Example B2 | C-2 | 0.045 | — | 9.0 | A | B |
| Example B3 | C-3 | 0.060 | — | 10.0 | A | B |
| Example B4 | C-4 | 0.045 | — | 6.5 | B | B |
| Example B5 | C-5 | 0.045 | — | 6.3 | B | B |
| Example B6 | C-6 | 0.045 | — | 6.3 | B | B |
| Example B7 | C-7 | 0.045 | — | 5.5 | B | B |
| Example B8 | C-8 | 0.045 | — | 4.5 | C | C |
| Example B9 | C-9 | 0.045 | — | 5.0 | C | B |
| Example B10 | C-10 | 0.045 | — | 5.8 | B | B |
| Example B11 | C-2/C-3 | 0.020/0.025 | — | 5.9 | B | B |
| Example B12 | C-2 | 0.080 | — | 8.0 | B | C |
| Example B13 | C-2 | 0.010 | — | 4.0 | C | A |
| Example B14 | C-1 | 0.045 | Change to polymer (W-2) | 6.3 | A | A |
| Example B15 | C-2 | 0.045 | Change to polymer (W-2) | 8.7 | A | A |
| Example B16 | C-3 | 0.060 | Change to polymer (W-2) | 9.1 | A | A |
| Example B17 | C-1 | 0.045 | Addition of infrared absorber 5 | 7.0 | B | B |
| Comparative Example B1 | CR-1 | 0.045 | | 3.0 | D | B |
| Comparative Example B2 | CR-2 | 0.045 | | 2.9 | D | B |
| Comparative Example B3 | CR-3 | 0.045 | | 1.2 | D | B |
| Comparative Example B4 | None | — | | 0.9 | D | B |

As clearly shown in Tables 1 and 4, it can be seen that the lithographic printing plates obtained from the lithographic printing plate precursors according to Examples have excellent color formability and are suppressed from streak-like unevenness.

As clearly shown in Table 4, it can be seen that the lithographic printing plates obtained from the lithographic printing plate precursors according to examples have excellent surface state.

What is claimed is:

1. An on-press development type lithographic printing plate precursor comprising:

a support; and an image-recording layer on the support, wherein the image-recording layer comprises an infrared absorber, a polymerization initiator, a polymerizable compound, and one or more compounds selected from the group consisting of a compound represented by Formula (1) and a compound represented by Formula (2):

Formula (1)

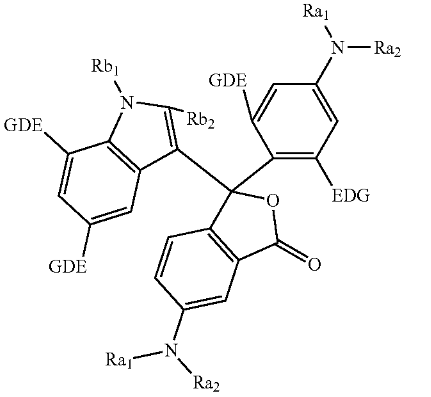

Formula (2)

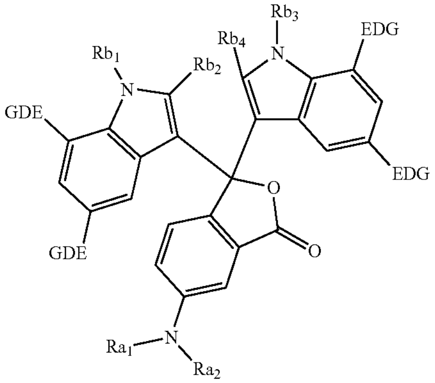

wherein, in Formula (1), $Ra_1$ and $Ra_2$ each independently represent a hydrogen atom or a substituted or unsubstituted alkyl group; $Ra_1$ and $Ra_2$ may be linked to each other to form a ring structure; $Rb_1$ and $Rb_3$ each independently represent a substituted or unsubstituted alkyl group; $Rb_2$ and $Rb_4$ each independently represent a hydrogen atom or a substituted or unsubstituted alkyl group; and EDG's each independently represent a hydrogen atom or an electron-donating group, provided that at least one of the four EDG's in Formula (1) represents an electron-donating group, and wherein, in Formula (2), Raj and Raz each independently represent a hydrogen atom or a substituted or unsubstituted alkyl group; $Ra_1$ and $Ra_2$ may be linked to each other to form a ring structure; $Rb_1$ and $Rb_3$ each independently represent a substituted alkyl group having 2 or more carbon atoms, wherein a substituent in the substituted alkyl group includes an aryl group, a heteroaryl group, a halogen atom, an amino group, an alkylamino group, an arylamino group, a heteroarylamino group, a dialkylamino group, a monoalkyl monoarylamino group, a monoalkyl monoheteroarylamino group, a diarylamino group, a diheteroarylamino group, a monoaryl monoheteroarylamino group, a hydroxy group, an alkoxy group, an aryloxy group, a heteroaryloxy group, an acyl group, an alkoxycarbonyl group, an aryloxycarbonyl group, a heteroaryloxycarbonyl group, or a cyano group; $Rb_2$ and $Rb_4$ each independently represent a hydrogen atom or a substituted or unsubstituted alkyl group; and EDG's each independently represent a hydrogen atom or an electron-donating group.

2. The lithographic printing plate precursor according to claim 1, wherein the compound represented by Formula (1) is represented by Formula (1a):

Formula (1a)

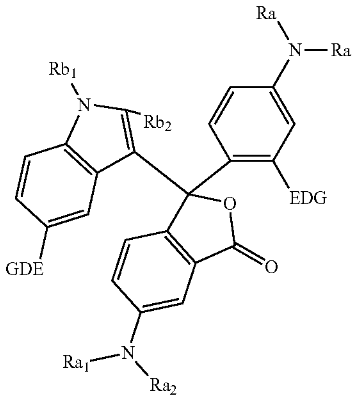

wherein in Formula (1a), $Ra_1$ and $Ra_2$ each independently represent a hydrogen atom or a substituted or unsubstituted alkyl group; $Ra_1$ and $Ra_2$ may be linked to each other to form a ring structure; $Rb_1$ represents a substituted or unsubstituted alkyl group; $Rb_2$ represents a hydrogen atom or a substituted or unsubstituted alkyl group; and EDG's each independently represent a hydrogen atom or an electron-donating group, provided that at least one of the two EDG's in Formula (1a) represents an electron-donating group.

3. The lithographic printing plate precursor according to claim 1, wherein the electron-donating group in Formula (1) and Formula (2) is a methoxy group.

4. The lithographic printing plate precursor according to claim 1, wherein the compound represented by Formula (1) is represented by Formula (1b):

Formula (1b)

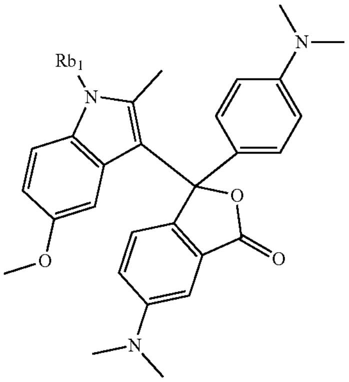

wherein in Formula (1b), $Rb_1$ represents a substituted or unsubstituted alkyl group.

5. The lithographic printing plate precursor according to claim 1, wherein the compound represented by Formula (2) is represented by Formula (2a):

Formula (2a)

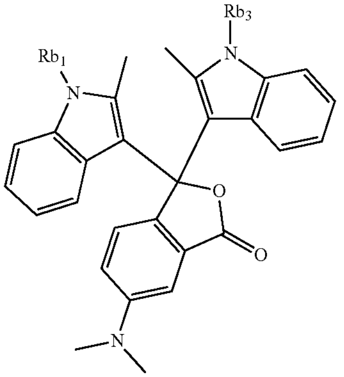

wherein in Formula (2a), $Rb_1$ and $Rb_3$ each independently represent a substituted alkyl group having 2 or more carbon atoms.

6. The lithographic printing plate precursor according to claim 1, wherein the polymerization initiator comprises a compound A represented by Formula (Ia) and one or more compounds B selected from the group consisting of a compound represented by Formula (Ib) and a compound represented by Formula (Ic):

Formula (Ia)

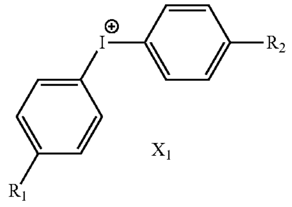

Formula (Ib)

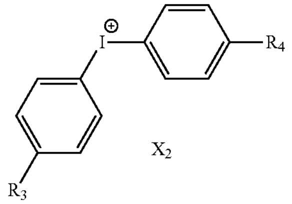

Formula (Ic)

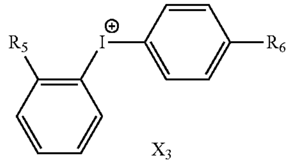

wherein in Formulae (Ia) to (Ic), $R_1$, $R_2$, $R_3$, $R_4$, $R_5$, and $R_6$ are each independently a substituted or unsubstituted alkyl group having 2 to 9 carbon atoms or a substituted or unsubstituted alkoxy group having 2 to 9 carbon atoms; at least one selected from the group consisting of $R_3$ and $R_4$ is different from $R_1$ or $R_2$; a difference between a total number of carbon atoms in $R_1$ and $R_2$ and a total number of carbon atoms in $R_3$ and $R_4$ is 0 to 4; a difference between the total number of carbon atoms in $R_1$ and $R_2$ and a total number of carbon atoms in $R_5$ and $R_6$ is 0 to 4; and $X_1$, $X_2$, and $X_3$ are each independently a counter anion.

7. The lithographic printing plate precursor according to claim 1, wherein the infrared absorber comprises a compound represented by Formula (X):

Formula (X)

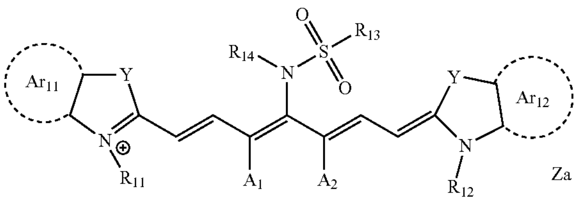

wherein in Formula (X), $Ar_{11}$ and $Ar_{12}$ each independently represent an atomic group necessary for forming a substituted or unsubstituted aromatic ring or for forming a substituted or unsubstituted heteroaromatic ring; $R_{11}$ and $R_{12}$ each independently represent a substituted or unsubstituted alkyl group; $R_{13}$ represents a substituted or unsubstituted alkyl group, a substituted or unsubstituted aryl group, or a substituted or unsubstituted heteroaryl group; $R_{14}$ represents a hydrogen atom, a substituted or unsubstituted alkyl group, a substituted or unsubstituted aryl group, or a substituted or unsubstituted heteroaryl group; Y's each independently represent an oxygen atom, a sulfur atom, or a dialkylmethylene group represented by $>C(R_{15}R_{16})$; $R_{15}$ and $R_{16}$ each independently represent a substituted or unsubstituted alkyl group having 1 to 4 carbon atoms, $A_1$ and $A_2$ each independently represent a substituted or unsubstituted alkyl group or an atomic group including 2 or 3 carbon atoms necessary for forming a substituted or unsubstituted 5- or 6-membered non-aromatic carbon ring by linking to each other; and Za represents a counter ion that neutralizes an electric charge.

8. The lithographic printing plate precursor according to claim 1, wherein the image-recording layer further comprises one or more compounds selected from the group consisting of a compound represented by Formula (Le-10) and a compound represented by Formula (Z-4):

(Le-10)

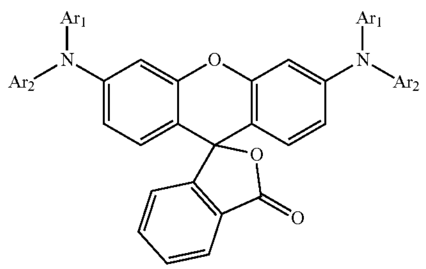

wherein in Formula (Le-10), $Ar_1$'s each independently represent an aryl group or a heteroaryl group; and $Ar_2$'s each independently represent an aryl group having a substituent on at least one ortho position or a heteroaryl group having a substituent on at least one ortho position;

(Z-4)

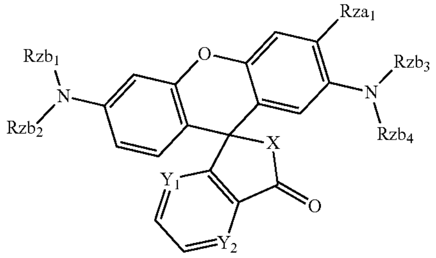

wherein in Formula (Z-4), $Rza_1$ represents a hydrogen atom, an alkyl group, or an alkoxy group; $Rzb_1$ to $Rzb_4$ each independently represent a hydrogen atom, an alkyl group, or an aryl group; $Rzb_1$ and $Rzb_2$ may be linked to each other to form a ring structure; $Rzb_3$ and $Rzb_4$ may be linked to each other to form a ring structure; X represents O or NR; R represents a hydrogen atom, an alkyl group, an aryl group, or a heteroaryl group, and $Y_1$ and $Y_2$ each independently represent CH or N.

9. The lithographic printing plate precursor according to claim 1, wherein the image-recording layer further comprises a compound represented by Formula (Ph):

(Ph)

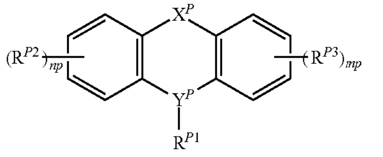

wherein in Formula (Ph), $X^P$ represents O, S, or NH; $Y^P$ represents N or CH; $R^{P1}$ represents a hydrogen atom or an alkyl group; $R^{P2}$ and $R^{P3}$ each independently represent a halogen atom, an alkylthio group, an arylthio group, an alkoxy group, an aryloxy group, an alkyl group, an aryl group, an acylthio group, or an acyl group; and mp and np each independently represent an integer of 0 to 4.

10. The lithographic printing plate precursor according to claim 1, wherein the image-recording layer further comprises a polymer having a structural unit represented by Formula (I):

(I)

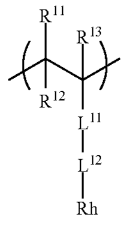

wherein in Formula (I), $R^{11}$ and $R^{12}$ each independently represent a hydrogen atom or an alkyl group; $R^{13}$ represents a hydrogen atom or a monovalent substituent; $L^{11}$ and $L^{12}$ each independently represent a single bond or a divalent linking group; and Rh represents a substituent including two or more silicon atoms.

11. The lithographic printing plate precursor according to claim 1, wherein the polymerizable compound comprises a polymerizable compound having functionalities of 7 or more.

12. The lithographic printing plate precursor according to claim 1, wherein the image-recording layer further comprises an oil agent.

13. The lithographic printing plate precursor according to claim 1, wherein the support has an aluminum plate and an anodic oxide film of aluminum disposed on the aluminum plate, the anodic oxide film is positioned closer to the image-recording layer than the aluminum plate is, the anodic oxide film has micropores extending in a depth direction from a surface of the anodic oxide film on the image-recording layer side, and an average diameter of the micropores within the surface of the anodic oxide film is more than 10 nm and 100 nm or less.

14. The lithographic printing plate precursor according to claim 13, wherein the micropores are each composed of a large diameter portion that extends to a position at a depth of 10 nm to 1,000 nm from the surface of the anodic oxide film and a small diameter portion that is in communication with a bottom portion of the large diameter portion and extends to a position at a depth of 20 nm to 2,000 nm from a communicate position, an average diameter of the large diameter portion within the surface of the anodic oxide film is 15 nm to 100 nm, and an average diameter of the small diameter portion at the communicate position is 13 nm or less.

15. A method of preparing a lithographic printing plate, comprising:

imagewise exposing the lithographic printing plate precursor according to claim 1; and supplying at least one selected from the group consisting of a printing ink and dampening water to the exposed precursor on a printer to remove an image-recording layer in a non-image area.

16. A lithographic printing method comprising:

imagewise exposing the lithographic printing plate precursor according to claim 1;

supplying at least one selected from the group consisting of a printing ink and dampening water to the exposed precursor on a printer to remove an image-recording layer in a non-image area and to prepare a lithographic printing plate; and performing printing using the obtained lithographic printing plate.

17. The lithographic printing plate precursor according to claim 1, wherein the $—NRa_1Ra_2$ in Formula (2) is $—NH_2$, $—N(CH_3)_2$, $—N(C_2H_5)_2$, or a piperidyl group.

18. The lithographic printing plate precursor according to claim 1, wherein the image-recording layer comprises the compound represented by Formula (1).

* * * * *